(12) United States Patent
Li et al.

(10) Patent No.: US 10,366,214 B2
(45) Date of Patent: Jul. 30, 2019

(54) METHOD AND DEVICE FOR ESTABLISHING WIRELESS CONNECTION

(71) Applicant: Huawei Technologies Co., Ltd., Shenzhen (CN)

(72) Inventors: Xiaoxian Li, Shenzhen (CN); Ping Fang, Shenzhen (CN); Zhiming Ding, Shenzhen (CN); Ji Chen, Shenzhen (CN); Wang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 15/607,014

(22) Filed: May 26, 2017

(65) Prior Publication Data

US 2017/0265238 A1  Sep. 14, 2017

Related U.S. Application Data

(63) Continuation of application No. PCT/CN2015/095891, filed on Nov. 28, 2015.

(30) Foreign Application Priority Data

Nov. 28, 2014  (CN) .......................... 2014 1 0709374

(51) Int. Cl.
*G06F 21/30* (2013.01)
*H04W 76/10* (2018.01)
(Continued)

(52) U.S. Cl.
CPC .............. *G06F 21/30* (2013.01); *G06F 21/44* (2013.01); *H04W 12/06* (2013.01); *H04W 48/16* (2013.01);
(Continued)

(58) Field of Classification Search
CPC .......... G06F 21/30; G06F 21/44; G06F 21/70; H04L 63/08; H04L 63/10; H04W 12/06; H04W 76/10; H04W 48/16
See application file for complete search history.

(56) References Cited

U.S. PATENT DOCUMENTS 7,516,325 B2 * 4/2009 Willey ................ H04L 63/0492
                                                    713/168
2008/0298375 A1  12/2008 Agardh et al.
(Continued)

FOREIGN PATENT DOCUMENTS

CN       1691578 A     11/2005
CN     101682842 A      3/2010
(Continued)

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz," IEEE Computer Society, IEEE Std 802.11ac-2013, pp. 1-395, Institute of Electrical and Electronics Engineers, New York, New York (2013).
(Continued)

*Primary Examiner* — Eleni A Shiferaw
*Assistant Examiner* — Sher A Khan
(74) *Attorney, Agent, or Firm* — Leydig, Voit & Mayer, Ltd.

(57) ABSTRACT

A method includes: after receiving an operation instruction of a first user, generating, by a first device, connection information according to the operation instruction, and providing the connection information to a second device near the first device, so that the second device obtains a first identifier through calculation according to a first information portion of the connection information by using a preset algorithm; receiving a first message that is sent by the
(Continued)

second device according to the connection information, where the first message carries the first identifier; determining whether the first identifier matches a second identifier of the first device, where the second identifier is equal to or corresponds to a result that is generated through calculation according to the first information portion; if the first identifier matches the second identifier, sending a second message to the second device; and establishing a wireless connection to the second device.

13 Claims, 22 Drawing Sheets

(51) Int. Cl.
*G06F 21/44* (2013.01)
*H04W 76/14* (2018.01)
*H04W 12/06* (2009.01)
*H04W 48/16* (2009.01)
*H04W 56/00* (2009.01)
*H04W 88/06* (2009.01)
*H04W 92/18* (2009.01)

(52) U.S. Cl.
CPC ......... *H04W 56/002* (2013.01); *H04W 76/10* (2018.02); *H04W 76/14* (2018.02); *H04W 88/06* (2013.01); *H04W 92/18* (2013.01)

(56) References Cited

U.S. PATENT DOCUMENTS

| | | | | |
|---|---|---|---|---|
| 2009/0017755 | A1* | 1/2009 | Tomoda | H04W 12/06 455/41.2 |
| 2009/0070472 | A1* | 3/2009 | Baldus | A61B 5/0028 709/227 |
| 2009/0204457 | A1* | 8/2009 | Buhrmann | G06Q 20/4014 455/410 |
| 2009/0265776 | A1* | 10/2009 | Baentsch | H04L 63/08 726/9 |
| 2010/0278345 | A1 | 11/2010 | Alsina et al. | |
| 2011/0202755 | A1* | 8/2011 | Orsini | H04L 63/029 713/151 |
| 2013/0016710 | A1 | 1/2013 | Shinohara | |
| 2013/0050259 | A1 | 2/2013 | Ann et al. | |
| 2013/0237190 | A1* | 9/2013 | Smith | H04L 63/0492 455/411 |
| 2014/0089378 | A1 | 3/2014 | Forrest et al. | |
| 2014/0172741 | A1* | 6/2014 | Liu | H04L 9/3234 705/342 |
| 2014/0181943 | A1 | 6/2014 | Arashin et al. | |
| 2014/0269646 | A1 | 9/2014 | Ramasamy et al. | |

FOREIGN PATENT DOCUMENTS

| | | | |
|---|---|---|---|
| CN | 102461128 | A | 5/2012 |
| CN | 102955917 | A | 3/2013 |
| CN | 103152735 | A | 6/2013 |
| CN | 103179679 | A * | 6/2013 |
| CN | 103179679 | A | 6/2013 |
| CN | 103609072 | A | 2/2014 |
| CN | 103916978 | A * | 7/2014 |
| CN | 103916978 | A | 7/2014 |
| EP | 2385480 | A1 | 11/2011 |
| EP | 2894931 | A1 | 7/2015 |
| WO | 2014037980 | A1 | 3/2014 |
| WO | 2014114930 | A1 | 7/2014 |
| WO | 2014183404 | A1 | 11/2014 |

OTHER PUBLICATIONS

"Part 11: Wireless LAN Medium Access Control (MAC) and Physical Layer (PHY) specifications: Higher-Speed Physical Layer Extension in the 2.4 GHz Band," IEEE Computer Society, IEEE Std 802.11b-1999, pp. 1-89, Institute of Electrical and Electronics Engineers, New York, New York (Sep. 16, 1999).

"Part 11: Wireless LAN Medium Access Control (MAC) and Physical Layer (PHY) specifications, Amendment 4: Further Higher Data Rate Extension in the 2.4 GHz Band," IEEE Computer Society, IEEE Std 802.11g-2003, pp. 1-67, Institute of Electrical and Electronics Engineers, New York, New York (Jun. 27, 2013).

"Part 11: Wireless LAN Medium Access Control (MAC) and Physical Layer (PHY) Specifications, Amendment 5: Enhancements for Higher Throughput," IEEE Computer Society, IEEE Std 802.11n-2009, pp. 1-502, Institute of Electrical and Electronics Engineers, New York, New York (Oct. 2009).

* cited by examiner

United States Patent US 10,366,214 B2

METHOD AND DEVICE FOR ESTABLISHING WIRELESS CONNECTION

CROSS-REFERENCE TO RELATED APPLICATIONS

This application is a continuation of International Application No. PCT/CN2015/095891, filed on Nov. 28, 2015, which claims priority to Chinese Patent Application No. 201410709374.0, filed on Nov. 28, 2014. The disclosures of the aforementioned applications are hereby incorporated by reference in their entireties.

TECHNICAL FIELD

The present disclosure relates to the communications field, and in particular, to a method and a device for establishing a wireless connection.

BACKGROUND

With development of technologies, more electronic devices, for example, mobile phones, tablet computers, and gateway devices, begin to come into daily life of users. These electronic devices provide richer and more practical functions. For example, currently, many electronic devices have a data transmission function. A wireless connection can be established between two electronic devices, and then data is transmitted by using the wireless connection.

For example, assuming that a first electronic device needs to transmit data to a second electronic device, first, the first electronic device performs a device search, and obtains device search results, where the device search results include an identifier of each device searched out by the first electronic device; then a user corresponding to the first electronic device finds an identifier of the second electronic device from the device search results, and selects the identifier of the second electronic device; the first electronic device establishes a wireless connection to the second electronic device according to the identifier of the second electronic device selected by the user, and after the wireless connection is established, transmits data to the second electronic device by using the wireless connection.

During implementation of the present disclosure, the inventors find that the prior art has at least the following problem:

Device search results sometimes include identifiers of a large quantity of devices, or sometimes include identifiers of multiple devices that are of a same type as the second electronic device, but the identifiers of the multiple devices of the same type seem to be very similar. Consequently, the user corresponding to the first electronic device needs to spend a long time in distinguishing and selecting an appropriate device, that is, a device (namely, the second electronic device) that needs to establish a wireless connection to the first electronic device, a speed of establishing a wireless connection is reduced, and further, efficiency of data transmission is reduced.

SUMMARY

To improve efficiency of establishing a wireless connection, embodiments of the present disclosure provide a method and a device for establishing a wireless connection. The technical solutions are as follows:

According to a first aspect, a method for establishing a wireless connection is provided and used for establishing a wireless connection between a first device and a second device, where the method includes:

after receiving an operation instruction of a first user, generating, by the first device, connection information according to the operation instruction, and providing the connection information to the second device near the first device, so that the second device obtains a first identifier through calculation according to a first information portion of the connection information by using a preset algorithm, where the first user is a user corresponding to the first device, and the first information portion is a portion or all of the connection information;

receiving, by the first device, a first message that is sent by the second device according to the connection information, where the first message carries the first identifier;

determining, by the first device, whether the first identifier matches a second identifier of the first device, where the second identifier is equal to or corresponds to a result that is generated through calculation according to the first information portion;

if the first identifier matches the second identifier, sending, by the first device, a second message to the second device, where the second message is a response message for the first message; and establishing, by the first device, a wireless connection to the second device.

With reference to the first aspect, in a first possible implementation manner of the first aspect, before the determining, by the first device, whether the first identifier matches a second identifier of the first device, the method further includes:

generating the second identifier of the first device through calculation according to the first information portion of the connection information by using the preset algorithm.

With reference to the first possible implementation manner of the first aspect, in a second possible implementation manner of the first aspect, the generating the second identifier through calculation according to the first information portion of the connection information by using the preset algorithm includes:

performing a hash operation on the first information portion of the connection information to obtain a first hash result, and generating the second identifier of the first device according to the first hash result; or adding first preset information to the first information portion of the connection information to obtain first construction information, and generating the second identifier of the first device according to the first construction information.

With reference to the first aspect, or the first possible implementation manner or the second possible implementation manner of the first aspect, in a third possible implementation manner of the first aspect, the providing, by the first device, the connection information to the second device, includes:

displaying or playing, by the first device, the connection information, so that the second device receives the connection information input by a user to the second device; or generating, by the first device according to the connection information, a graphic code including the connection information, and displaying the graphic code, so that the second device scans the graphic code and obtains the connection information; or establishing, by the first device, a short-range communications connection to the second device, and sending the connection information to the second device by using the short-range communications connection.

With reference to any one of the first aspect, or the first to the third possible implementation manners of the first aspect, in a fourth possible implementation manner of the first aspect, the first message is a probe request Probe request message, and a service set identifier SSID field in the Probe request message carries the first identifier, or a reserved field in the Probe request message carries the first identifier; or the first message is a test request Test request message, and an action frame Action Frame in the Test request message carries the first identifier.

With reference to any one of the first aspect, or the first to the fourth possible implementation manners of the first aspect, in a fifth possible implementation manner of the first aspect, the establishing a wireless connection to the second device includes:

verifying whether first authentication information of the second device matches second authentication information of the first device, where the first authentication information is generated by the second device through calculation according to a second information portion of the connection information, the second information portion is a portion or all of the connection information, and the second authentication information is equal to or corresponds to a result generated through calculation according to the second information portion; and if it is verified that the first authentication information matches the second authentication information, sending confirmation information to the second device, and establishing the wireless connection to the second device, where the confirmation information is used by the second device to determine to establish the wireless connection to the first device.

With reference to the fifth possible implementation manner of the first aspect, in a sixth possible implementation manner of the first aspect, the verifying whether first authentication information of the second device matches second authentication information of the first device includes:

determining that the second authentication information of the first device is a pairwise master key PMK of a 4-way handshake authentication mode, and verifying, according to the PMK by using the 4-way handshake authentication mode, whether the first authentication information of the second device matches the second authentication information of the first device; or determining that the second authentication information of the first device is a personal identification number PIN of a Wireless Fidelity protected setup WPS authentication mode, and verifying, according to the PIN by using the WPS authentication mode, whether the first authentication information of the second device matches the second authentication information of the first device.

With reference to the fifth or the sixth possible implementation manner of the first aspect, in a seventh possible implementation manner of the first aspect, before the verifying whether first authentication information of the second device matches second authentication information of the first device, the method further includes:

generating the second authentication information of the first device through calculation according to the second information portion of the connection information.

With reference to the seventh possible implementation manner of the first aspect, in an eighth possible implementation manner of the first aspect, the generating the second authentication information of the first device through calculation according to the second information portion of the connection information includes:

performing a hash operation on the second information portion of the connection information to obtain a second hash result, and generating the second authentication information of the first device according to the second hash result; or adding second preset information to the second information portion of the connection information to obtain second construction information, and generating the second authentication information of the first device according to the second construction information.

With reference to any one of the fifth to the eighth possible implementation manners of the first aspect, in a ninth possible implementation manner of the first aspect, the generating, by the first device, connection information, includes:

generating the first information portion of the connection information according to the second identifier of the first device;

generating the second information portion of the connection information according to the second authentication information of the first device; and obtaining the connection information according to the first information portion and the second information portion.

With reference to any one of the first aspect, or the first to the ninth possible implementation manners of the first aspect, in a tenth possible implementation manner of the first aspect, the wireless connection is a Wireless Fidelity Wi-Fi connection or a Bluetooth connection.

According to a second aspect, a method for establishing a wireless connection is provided and used for establishing a wireless connection between a first device and a second device, where the method includes:

obtaining, by the second device, connection information provided by the first device near the second device, where the connection information is generated by the first device according to an operation instruction of a first user after the first device receives the operation instruction, and the first user is a user corresponding to the first device;

generating, by the second device, a first identifier through calculation according to a first information portion of the connection information, where the first information portion is a portion or all of the connection information;

sending, by the second device, a first message to the first device, where the first message carries the first identifier, so that the first device determines whether the first identifier matches a second identifier, where the second identifier is equal to or corresponds to a result that is generated through calculation according to the first information portion;

receiving, by the second device, a second message sent by the first device when the first identifier matches the second identifier, where the second message is a response message for the first message; and establishing, by the second device, a wireless connection to the first device.

With reference to the second aspect, in a first possible implementation manner of the second aspect, the generating a first identifier through calculation according to a first information portion of the connection information includes:

performing a hash operation on the first information portion of the connection information to obtain a first hash result, and generating the first identifier according to the first hash result; or adding first preset information to the first information portion of the connection information to obtain first construction information, and generating the first identifier according to the first construction information.

With reference to the second aspect, or the first possible implementation manner of the second aspect, in a second possible implementation manner of the second aspect, the establishing a wireless connection to the first device includes:

performing verification with the first device, so that the first device determines whether first authentication information of the second device matches second authentication information of the first device, where the first authentication information is generated through calculation according to a second information portion of the connection information, and the second authentication information is equal to or corresponds to a result generated through calculation according to the second information portion of the connection information;

receiving confirmation information sent by the first device when the first device verifies that the first authentication information matches the second authentication information; and establishing the wireless connection to the first device according to the confirmation information.

With reference to the second aspect, or the first or the second possible implementation manner of the second aspect, in a third possible implementation manner of the second aspect, the performing verification with the first device includes:

determining that the first authentication information is a PMK of a 4-way handshake authentication mode, and performing verification with the first device according to the PMK by using the 4-way handshake authentication mode; or determining that the first authentication information is a PIN of a Wireless Fidelity protected setup WPS authentication mode, and performing verification with the first device according to the PIN by using the WPS authentication mode.

With reference to any one of the second aspect, or the first to the third possible implementation manners of the second aspect, in a fourth possible implementation manner of the second aspect, before the performing verification with the first device, the method further includes:

generating the first authentication information through calculation according to the second information portion of the connection information.

With reference to the fourth possible implementation manner of the second aspect, in a fifth possible implementation manner of the second aspect, the generating the first authentication information through calculation according to the second information portion of the connection information includes:

performing a hash operation on the second information portion of the connection information to obtain a second hash result, and generating the first authentication information according to the second hash result; or adding second preset information to the second information portion of the connection information to obtain second construction information, and generating the first authentication information according to the second construction information.

With reference to any one of the second aspect, or the first to the fifth possible implementation manners of the second aspect, in a sixth possible implementation manner of the second aspect, the obtaining connection information provided by the first device near the second device includes:

receiving the connection information of the first device that is input by a user; or scanning a graphic code displayed by the first device, and obtaining the connection information of the first device that is included in the graphic code; or establishing a short-range communications connection to the first device, and receiving, by using the short-range communications connection, the connection information sent by the first device.

With reference to any one of the second aspect, or the first to the sixth possible implementation manners of the second aspect, in a seventh possible implementation manner of the second aspect, the first message is a probe request Probe request message, and a service set identifier SSID field in the Probe request message carries the first identifier, or a reserved field in the Probe request message carries the first identifier; or the first message is a test request Test request message, and an action frame Action Frame in the Test request message carries the first identifier.

With reference to any one of the second aspect, or the first to the seventh possible implementation manners of the second aspect, in an eighth possible implementation manner of the second aspect, the wireless connection is a Wireless Fidelity Wi-Fi connection or a Bluetooth connection.

According to a third aspect, a device for establishing a wireless connection is provided, where the device is a first device and is configured to establish a wireless connection to a second device, and the first device includes:

a generation module, configured to generate, after an operation instruction of a first user is received, connection information according to the operation instruction, where the first user is a user corresponding to the first device;

a providing module, configured to provide the connection information to the second device near the first device, so that the second device obtains a first identifier through calculation according to a first information portion of the connection information by using a preset algorithm, where the first information portion is a portion or all of the connection information;

a receiving module, configured to receive a first message that is sent by the second device according to the connection information, where the first message carries the first identifier;

a determining module, configured to determine whether the first identifier matches a second identifier of the first device, where the second identifier is equal to or corresponds to a result that is generated through calculation according to the first information portion;

a sending module, configured to send a second message to the second device if the determining module determines that the first identifier matches the second identifier of the first device, where the second message is a response message for the first message; and an establishing module, configured to establish a wireless connection to the second device.

With reference to the third aspect, in a first possible implementation manner of the third aspect, the first device further includes:

a first calculation module, configured to generate the second identifier of the first device through calculation according to the first information portion of the connection information by using the preset algorithm.

With reference to the third aspect, or the first possible implementation manner, in a second possible implementation manner of the third aspect, the first calculation module includes:

a first hash unit, configured to perform a hash operation on the first information portion of the connection information to obtain a first hash result, and generate the second identifier of the first device according to the first hash result; or a first construction unit, configured to add first preset information to the first information portion of the connection information to obtain first construction information, and generate the second identifier of the first device according to the first construction information.

With reference to the third aspect, or the first possible implementation manner or the second possible implementation manner of the third aspect, in a third possible implementation manner of the third aspect, the providing module includes:

a displaying or playing unit, configured to display or play the connection information, so that a user inputs the connection information to the second device; or a displaying unit, configured to generate, according to the connection information, a graphic code including the connection information, and display the graphic code, so that the second device scans the graphic code and obtains the connection information; or a sending unit, configured to establish a short-range communications connection to the second device, and send the connection information to the second device by using the short-range communications connection.

With reference to any one of the third aspect, or the first to the third possible implementation manners of the third aspect, in a fourth possible implementation manner of the third aspect:

the first message is a probe request Probe request message, and a service set identifier SSID field in the Probe request message carries the first identifier, or a reserved field in the Probe request message carries the first identifier; or the first message is a test request Test request message, and an action frame Action Frame in the Test request message carries the first identifier.

With reference to any one of the third aspect, or the first to the fourth possible implementation manners of the third aspect, in a fifth possible implementation manner of the third aspect, the establishing module includes:

a verifying unit, configured to verify whether first authentication information of the second device matches second authentication information of the first device, where the first authentication information is generated by the second device through calculation according to a second information portion of the connection information, the second information portion is a portion or all of the connection information, and the second authentication information is equal to or corresponds to a result generated through calculation according to the second information portion; and an establishing unit, configured to: if it is verified that the first authentication information matches the second authentication information, send confirmation information to the second device, and establish the wireless connection to the second device, where the confirmation information is used by the second device to determine to establish the wireless connection to the first device.

With reference to the fifth possible implementation manner of the third aspect, in a sixth possible implementation manner of the third aspect, the verifying unit includes:

a first verifying subunit, configured to determine that the second authentication information of the first device is a pairwise master key PMK of a 4-way handshake authentication mode, and verify, according to the PMK by using the 4-way handshake authentication mode, whether the first authentication information of the second device matches the second authentication information of the first device; or a second verifying subunit, configured to determine that the second authentication information of the first device is a personal identification number PIN of a Wireless Fidelity protected setup WPS authentication mode, and verify, according to the PIN by using the WPS authentication mode, whether the first authentication information of the second device matches the second authentication information of the first device.

With reference to the fifth or the sixth possible implementation manner of the third aspect, in a seventh possible implementation manner of the third aspect, the first device further includes:

a second calculation module, configured to generate the second authentication information of the first device through calculation according to the second information portion of the connection information.

With reference to the seventh possible implementation manner of the third aspect, in an eighth possible implementation manner of the third aspect, the second calculation module includes:

a second hash unit, configured to perform a hash operation on the second information portion of the connection information to obtain a second hash result, and generate the second authentication information of the first device according to the second hash result; or a second construction unit, configured to add second preset information to the second information portion of the connection information to obtain second construction information, and generate the second authentication information of the first device according to the second construction information.

With reference to any one of the fifth to the eighth possible implementation manners of the third aspect, in a ninth possible implementation manner of the third aspect, the first device further includes:

a first generation module, configured to generate the first information portion of the connection information according to the second identifier of the first device;

a second generation module, configured to generate the second information portion of the connection information according to the second authentication information of the first device; and a construction module, configured to construct the connection information according to the first information portion and the second information portion.

With reference to any one of the third aspect, or the first to the ninth possible implementation manners of the third aspect, in a tenth possible implementation manner of the third aspect, the wireless connection is a Wireless Fidelity Wi-Fi connection or a Bluetooth connection.

According to a fourth aspect, a device for establishing a wireless connection is provided, where the device is a second device and is configured to establish a wireless connection to a first device, and the second device includes:

an obtaining module, configured to obtain connection information provided by the first device near the second device, where the connection information is generated by the first device according to an operation instruction of a first user after the first device receives the operation instruction, and the first user is a user corresponding to the first device;

a calculation module, configured to generate a first identifier through calculation according to a first information portion of the connection information, where the first information portion is a portion or all of the connection information;

a sending module, configured to send a first message to the first device, where the first message carries the first identifier, so that the first device determines whether the first identifier matches a second identifier, where the second identifier is equal to or corresponds to a result that is generated through calculation according to the first information portion;

a receiving module, configured to receive a second message sent by the first device when the first identifier matches the second identifier, where the second message is a response message for the first message; and an establishing module, configured to establish a wireless connection to the first device.

With reference to the fourth aspect, in a first possible implementation manner of the fourth aspect, the calculation module includes:

a first hash unit, configured to perform a hash operation on the first information portion of the connection information to obtain a first hash result, and generate the first identifier according to the first hash result; or a first adding unit, configured to add first preset information to the first information portion of the connection information to obtain first construction information, and generate the first identifier according to the first construction information.

With reference to the fourth aspect, or the first possible implementation manner of the fourth aspect, in a second possible implementation manner of the fourth aspect, the establishing module includes:

a verifying unit, configured to perform verification with the first device, so that the first device determines whether first authentication information of the second device matches second authentication information of the first device, where the first authentication information is generated through calculation according to a second information portion of the connection information, and the second authentication information is equal to or corresponds to a result generated through calculation according to the second information portion of the connection information;

a first receiving unit, configured to receive confirmation information sent by the first device when the first device verifies that the first authentication information matches the second authentication information; and an establishing unit, configured to establish the wireless connection to the first device according to the confirmation information.

With reference to the fourth aspect, or the first or the second possible implementation manner of the fourth aspect, in a third possible implementation manner of the fourth aspect, the verifying unit includes:

a first verifying subunit, configured to determine that the first authentication information is a PMK of a 4-way handshake authentication mode, and perform verification with the first device according to the PMK by using the 4-way handshake authentication mode; or a second verifying subunit, configured to determine that the first authentication information is a PIN of a Wireless Fidelity protected setup WPS authentication mode, and perform verification with the first device according to the PIN by using the WPS authentication mode.

With reference to any one of the fourth aspect, or the first to the third possible implementation manners of the fourth aspect, in a fourth possible implementation manner of the fourth aspect, the second device further includes:

a generation module, configured to generate the first authentication information through calculation according to the second information portion of the connection information.

With reference to the fourth possible implementation manner of the fourth aspect, in a fifth possible implementation manner of the fourth aspect, the generation module includes:

a second hash unit, configured to perform a hash operation on the second information portion of the connection information to obtain a second hash result, and generate the first authentication information according to the second hash result; or a second adding unit, configured to add second preset information to the second information portion of the connection information to obtain second construction information, and generate the first authentication information according to the second construction information.

With reference to any one of the fourth aspect, or the first to the fifth possible implementation manners of the fourth aspect, in a sixth possible implementation manner of the fourth aspect, the obtaining module includes:

a second receiving unit, configured to receive the connection information of the first device that is input by a user; or a scanning unit, configured to scan a graphic code displayed by the first device, and obtain the connection information of the first device that is included in the graphic code; or a third receiving unit, configured to establish a short-range communications connection to the first device, and receive, by using the short-range communications connection, the connection information sent by the first device.

With reference to any one of the fourth aspect, or the first to the sixth possible implementation manners of the fourth aspect, in a seventh possible implementation manner of the fourth aspect, the first message is a probe request Probe request message, and a service set identifier SSID field in the Probe request message carries the first identifier, or a reserved field in the Probe request message carries the first identifier; or the first message is a test request Test request message, and an action frame Action Frame in the Test request message carries the first identifier.

With reference to any one of the fourth aspect, or the first to the seventh possible implementation manners of the fourth aspect, in an eighth possible implementation manner of the fourth aspect, the wireless connection is a Wireless Fidelity Wi-Fi connection or a Bluetooth connection.

According to a fifth aspect, a device is provided, where the device is a first device and is configured to establish a wireless connection to a second device, and the first device includes a receiver, a processor, and a transmitter, where the processor is configured to: after an operation instruction of a first user is received, generate connection information according to the operation instruction, and provide the connection information to the second device near the first device, so that the second device obtains a first identifier through calculation according to a first information portion of the connection information by using a preset algorithm, where the first information portion is a portion or all of the connection information;

the receiver is configured to receive a first message that is sent by the second device according to the connection information, where the first message carries the first identifier;

the processor is further configured to determine whether the first identifier received by the receiver matches a second identifier of the first device, where the second identifier is equal to or corresponds to a result that is generated through calculation according to the first information portion;

the transmitter is configured to send a second message to the second device if a result determined by the processor is a match, where the second message is a response message for the first message; and the processor is further configured to establish a wireless connection to the second device.

With reference to the fifth aspect, in a first possible implementation manner of the fifth aspect, the processor is further configured to generate the second identifier of the first device through calculation according to the first information portion of the connection information by using the preset algorithm.

With reference to the first possible implementation manner of the fifth aspect, in a second possible implementation manner of the fifth aspect, the operation of generating the second identifier of the first device by the processor through calculation according to the first information portion of the connection information includes:

performing, by the processor, a hash operation on the first information portion of the connection information to obtain a first hash result, and generating the second identifier of the first device according to the first hash result; or adding, by the processor, first preset information to the first information portion of the connection information to obtain first construction information, and generating the second identifier of the first device according to the first construction information.

With reference to the fifth aspect, or the first possible implementation manner or the second possible implementation manner of the fifth aspect, in a third possible implementation manner of the fifth aspect, the operation of providing the connection information by the processor to the second device includes:

displaying or playing, by the processor, the connection information, so that a user inputs the connection information to the second device; or generating, by the processor according to the connection information, a graphic code including the connection information, and displaying the graphic code, so that the second device scans the graphic code and obtains the connection information; or establishing, by the processor, a short-range communications connection to the second device, and sending the connection information to the second device by using the short-range communications connection.

With reference to any one of the fifth aspect, or the first to the third possible implementation manners of the fifth aspect, in a fourth possible implementation manner of the fifth aspect, the first message is a probe request Probe request message, and a service set identifier SSID field in the Probe request message carries the first identifier, or a reserved field in the Probe request message carries the first identifier; or the first message is a test request Test request message, and an action frame Action Frame in the Test request message carries the first identifier.

With reference to any one of the fifth aspect, or the first to the fourth possible implementation manners of the fifth aspect, in a fifth possible implementation manner of the fifth aspect, the operation of establishing a wireless connection by the processor to the second device includes:

verifying, by the processor, whether first authentication information of the second device matches second authentication information of the first device, where the first authentication information is generated by the second device through calculation according to a second information portion of the connection information, the second information portion is a portion or all of the connection information, and the second authentication information is equal to or corresponds to a result generated through calculation according to the second information portion; and if it is verified that the first authentication information matches the second authentication information, sending confirmation information to the second device, and establishing the wireless connection to the second device, where the confirmation information is used by the second device to determine to establish the wireless connection to the first device.

With reference to the fifth possible implementation manner of the fifth aspect, in a sixth possible implementation manner of the fifth aspect, the operation of verifying, by the processor, whether first authentication information of the second device matches second authentication information of the first device, includes:

determining, by the processor, that the second authentication information of the first device is a PMK of a 4-way handshake authentication mode, and verifying, according to the PMK by using the 4-way handshake authentication mode, whether the first authentication information of the second device matches the second authentication information of the first device; or determining, by the processor, that the second authentication information of the first device is a PIN of a Wireless Fidelity protected setup WPS authentication mode, and verifying, according to the PIN by using the WPS authentication mode, whether the first authentication information of the second device matches the second authentication information of the first device.

With reference to the fifth or the sixth possible implementation manner of the fifth aspect, in a seventh possible implementation manner of the fifth aspect, the processor is further configured to generate the second authentication information of the first device through calculation according to the second information portion of the connection information.

With reference to the seventh possible implementation manner of the fifth aspect, in an eighth possible implementation manner of the fifth aspect, the operation of generating the second authentication information of the first device by the processor through calculation according to the second information portion of the connection information includes:

performing, by the processor, a hash operation on the second information portion of the connection information to obtain a second hash result, and generating the second authentication information of the first device according to the second hash result; or adding, by the processor, second preset information to the second information portion of the connection information to obtain second construction information, and generating the second authentication information of the first device according to the second construction information.

With reference to any one of the fifth to the eighth possible implementation manners of the fifth aspect, in a ninth possible implementation manner of the fifth aspect, the processor is further configured to: generate the first information portion of the connection information according to the second identifier of the first device; generate the second information portion of the connection information according to the second authentication information of the first device; and construct the connection information according to the first information portion and the second information portion.

With reference to any one of the fifth aspect, or the first to the ninth possible implementation manners of the fifth aspect, in a tenth possible implementation manner of the fifth aspect, the wireless connection is a Wireless Fidelity Wi-Fi connection or a Bluetooth connection.

According to a sixth aspect, a device is provided, where the device is a second device and is configured to establish a wireless connection to a first device, and the second device includes a processor, a transmitter, and a receiver, where the processor is configured to obtain connection information provided by the first device near the second device, where the connection information is generated by the first device according to an operation instruction of a first user after the first device receives the operation instruction, and the first user is a user corresponding to the first device, and generate a first identifier through calculation according to a first information portion of the connection information, where the first information portion is a portion or all of the connection information;

the transmitter is configured to send a first message to the first device, where the first message carries the first identifier generated by the processor, so that the first device determines whether the first identifier matches a second identifier, where the second identifier is equal to or corresponds to a result that is generated through calculation according to the first information portion;

the receiver is configured to receive a second message sent by the first device when the first identifier matches the second identifier, where the second message is a response message for the first message; and the processor is further configured to establish a wireless connection to the first device.

With reference to the sixth aspect, in a first possible implementation manner of the sixth aspect, the operation of generating a first identifier by the processor through calculation according to a first information portion of the connection information includes:

performing, by the processor, a hash operation on the first information portion of the connection information to obtain a first hash result, and generating the first identifier according to the first hash result; or adding, by the processor, first preset information to the first information portion of the connection information to obtain first construction information, and generating the first identifier according to the first construction information.

With reference to the sixth aspect, or the first possible implementation manner of the sixth aspect, in a second possible implementation manner of the sixth aspect, the operation of establishing a wireless connection by the processor to the first device includes:

performing, by the processor, verification with the first device, so that the first device determines whether first authentication information of the second device matches second authentication information of the first device, where the first authentication information is generated through calculation according to a second information portion of the connection information, and the second authentication information is equal to or corresponds to a result generated through calculation according to the second information portion of the connection information;

receiving confirmation information sent by the first device when the first device verifies that the first authentication information matches the second authentication information; and establishing the wireless connection to the first device according to the confirmation information.

With reference to the sixth aspect, or the first or the second possible implementation manner of the sixth aspect, in a third possible implementation manner of the sixth aspect, the operation of performing verification by the processor with the first device includes:

determining, by the processor, that the first authentication information is a PMK of a 4-way handshake authentication mode, and performing verification with the first device according to the PMK by using the 4-way handshake authentication mode; or determining, by the processor, that the first authentication information is a PIN of a Wireless Fidelity protected setup WPS authentication mode, and performing verification with the first device according to the PIN by using the WPS authentication mode.

With reference to any one of the sixth aspect, or the first to the third possible implementation manners of the sixth aspect, in a fourth possible implementation manner of the sixth aspect, the processor is further configured to generate the first authentication information through calculation according to the second information portion of the connection information.

With reference to the fourth possible implementation manner of the sixth aspect, in a fifth possible implementation manner of the sixth aspect, the operation of generating the first authentication information by the processor through calculation according to the second information portion of the connection information includes:

performing, by the processor, a hash operation on the second information portion of the connection information to obtain a second hash result, and generating the first authentication information according to the second hash result; or adding, by the processor, second preset information to the second information portion of the connection information to obtain second construction information, and generating the first authentication information according to the second construction information.

With reference to any one of the sixth aspect, or the first to the fifth possible implementation manners of the sixth aspect, in a sixth possible implementation manner of the sixth aspect, the operation of obtaining, by the processor, connection information provided by the first device, includes:

receiving the connection information of the first device that is input by a user; or scanning a graphic code displayed by the first device, and obtaining the connection information of the first device that is included in the graphic code; or establishing a short-range communications connection to the first device, and receiving, by using the short-range communications connection, the connection information sent by the first device.

With reference to any one of the sixth aspect, or the first to the sixth possible implementation manners of the sixth aspect, in a seventh possible implementation manner of the sixth aspect, the first message is a probe request Probe request message, and a service set identifier SSID field in the Probe request message carries the first identifier, or a reserved field in the Probe request message carries the first identifier; or the first message is a test request Test request message, and an action frame Action Frame in the Test request message carries the first identifier.

With reference to any one of the sixth aspect, or the first to the seventh possible implementation manners of the sixth aspect, in an eighth possible implementation manner of the sixth aspect, the wireless connection is a Wireless Fidelity Wi-Fi connection or a Bluetooth connection.

In the embodiments of the present disclosure, a first device generates connection information, and provides the connection information to a second device; the second device generates a first identifier according to the connection information, and sends a first message carrying the first identifier to the first device; the first device generates a second identifier according to the connection information, and if the first identifier matches the second identifier, establishes a wireless connection to the second device, where the first device can discover, by using the first identifier and the second identifier, that the second device sending the first message carrying the first identifier is a device to which the first device needs to establish a wireless connection. In this way, a user of the first device only needs to provide the generated connection information to the second device by using the first device, and a subsequent procedure is performed through interaction between the first device and the second device, so as to establish a wireless connection between the first device and the second device. In the embodiments of the present disclosure, the user of the first device does not need to search for nearby devices by using the first device, and the user of the first device does not need to spend time in selecting a device from a large quantity of search results. Therefore, efficiency of establishing a wireless connection is improved, and further, efficiency of data transmission is improved, user operations are also simplified, and user experience is improved.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1-2 is a flowchart of another method for establishing a wireless connection according to an embodiment of the present disclosure;

FIG. 2-1 is a flowchart of another method for establishing a wireless connection according to an embodiment of the present disclosure;

FIG. 2-2 is a first schematic diagram of a UI of a system application according to an embodiment of the present disclosure;

FIG. 2-3 is a second schematic diagram of a UI of a system application according to an embodiment of the present disclosure;

FIG. 2-4 is a first schematic diagram of a UI of a third-party application according to an embodiment of the present disclosure;

FIG. 2-5 is a second schematic diagram of a UI of a third-party application according to an embodiment of the present disclosure;

FIG. 2-6 is a third schematic diagram of a UI of a system application according to an embodiment of the present disclosure;

FIG. 2-7 is a fourth schematic diagram of a UI of a system application according to an embodiment of the present disclosure;

FIG. 2-8 is a fifth schematic diagram of a UI of a system application according to an embodiment of the present disclosure;

FIG. 2-9 is a first schematic structural diagram of a Probe request message according to an embodiment of the present disclosure;

FIG. 2-10 is a first schematic structural diagram of a Probe response message according to an embodiment of the present disclosure;

FIG. 3 is a flowchart of another method for establishing a wireless connection according to an embodiment of the present disclosure;

FIG. 4-1 is a flowchart of another method for establishing a wireless connection according to an embodiment of the present disclosure;

FIG. 4-2 is a second schematic structural diagram of a Probe request message according to an embodiment of the present disclosure;

FIG. 4-3 is a second schematic structural diagram of a Probe response message according to an embodiment of the present disclosure;

FIG. 5 is a flowchart of another method for establishing a wireless connection according to an embodiment of the present disclosure;

FIG. 6-1 is a flowchart of another method for establishing a wireless connection according to an embodiment of the present disclosure;

FIG. 6-2 is a schematic structural diagram of a Test request message according to an embodiment of the present disclosure;

FIG. 6-3 is a schematic structural diagram of a Test response message according to an embodiment of the present disclosure;

FIG. 7 is a flowchart of another method for establishing a wireless connection according to an embodiment of the present disclosure;

FIG. 8 is a first schematic structural diagram of a device for establishing a wireless connection according to an embodiment of the present disclosure;

FIG. 9 is a second schematic structural diagram of a device for establishing a wireless connection according to an embodiment of the present disclosure;

FIG. 10 is a first schematic structural diagram of a device according to an embodiment of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

When a user of a first device needs to establish a wireless connection between the first device and a second device, the first device may establish a wireless connection to the second device according to the following process, including: the first device performs a device search, and obtains device search results, where the device search results include an identifier of each device searched out by the first device;

then the user finds an identifier of the second device from the device search results, and selects the identifier of the second device; and the first device establishes a wireless connection to the second device according to the identifier of the second device selected by the user. Device search results sometimes include identifiers of a large quantity of devices, or sometimes include identifiers of multiple devices that are of a same type as the second device, but the identifiers of the multiple devices of the same type are similar. Consequently, the user needs to spend a long time in selecting an appropriate device, and efficiency is low. To improve efficiency of establishing a wireless connection, any one of the following implementation manners may be used to establish a wireless connection between the first device and the second device.

Figure 1:
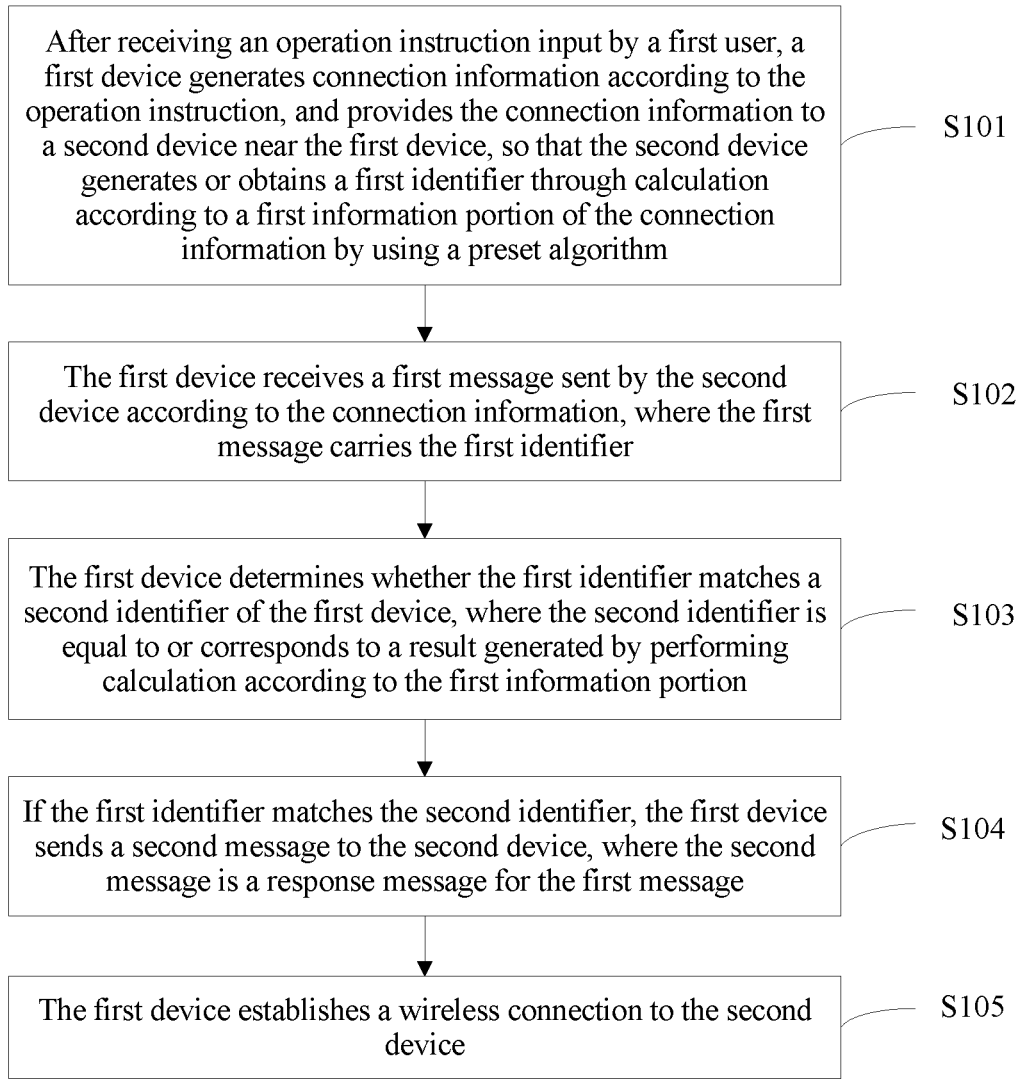
FIG. 1-1 is a flowchart of a method for establishing a wireless connection according to an embodiment of the present disclosure.

Referring to FIG. 1-1, an embodiment of the present disclosure provides a method for establishing a wireless connection, where the method is used for establishing a wireless connection between a first device and a second device. The method includes the following steps.

Step S101: After receiving an operation instruction input by a first user, the first device generates connection information according to the operation instruction, and provides the connection information to the second device near the first device, so that the second device obtains a first identifier through calculation according to a first information portion of the connection information by using a preset algorithm, where the first user is a user corresponding to the first device, and the first information portion is a portion or all of the connection information.

That the second device is near the first device may mean that a distance between the first device and the second device is in a range of several meters or a dozen of meters, or that the first device and the second device may approach each other to perform short-range communication, or the like. For example, two persons use their mobile phones face to face to share images with each other; a distance between the two persons is short, and therefore, a distance between the two mobile phones is short, for example, the distance is in a range of several meters or a dozen of meters; or the two persons may perform NFC (near field communication) communication by making their mobile phones close to each other.

The connection information may be a character string. Content of the character string may be numerals, letters, or other characters, or may be any combination of numerals, letters, and other characters. The first device may generate a character string randomly, and use the generated character string as the connection information; or the first device may generate the connection information according to a second identifier and second authentication information that are preset.

The first device may provide the connection information to the second device according to any one of the following first to fourth implementation manners, which are respectively:

Manner 1: The first device displays the connection information.

A second user corresponding to the second device may view the connection information displayed by the first device, and input the connection information to the second device. The second user and the first user may be a same user, where the user may perform operations on the first device and the second device. Alternatively, the second user and the first user may be two different users, where the two users are users who respectively correspond to the first device and the second device.

Manner 2: The first device plays the connection information by using a sound box or a speaker.

The second user may listen to the connection information played by the first device, and input the connection information to the second device.

Manner 3: The first device generates, according to the connection information, a graphic code including the connection information, and displays the graphic code.

The graphic code may be a one-dimensional code or a two-dimensional code. The first device may code the connection information by using a coding algorithm that is used for generating a graphic code, so as to generate the graphic code including the connection information.

The second device has a scanning module, where the scanning module may be a camera, a scanner, or the like. After the first device displays the graphic code, the second device may scan, by using the scanning module included in the second device, the graphic code displayed by the first device, and obtain the connection information.

Manner 4: The first device establishes a short-range communications connection to the second device, and sends the connection information to the second device by using the short-range communications connection.

In this embodiment, all connection information generated by the first device is a character string that includes simple characters and is relatively short, for example, the generated connection information may be "123456", "abcdef", or the like, so that the user may input or listen to the connection information conveniently. Therefore, in this step, the second device obtains the first identifier through calculation according to the first information portion of the connection information by using the preset algorithm. In this way, a length, complexity, or the like of the first identifier may be increased, and therefore, a probability that the first identifier is the same as an identifier of another device may be reduced.

Step S102: The first device receives a first message that is sent by the second device according to the connection information, where the first message carries the first identifier.

Optionally, after generating the first identifier through calculation, the second device may use the first identifier as an identifier of a device that needs to establish a wireless connection to the first device, and then broadcast the first message carrying the first identifier, so as to request the device corresponding to the first identifier to establish a wireless connection to the first device.

Step S103: The first device determines whether the first identifier matches a second identifier of the first device, where the second identifier is equal to or corresponds to a result that is generated through calculation according to the first information portion.

In the embodiment of the present disclosure, the second device may use the first identifier as an identifier of a device that needs to establish a wireless connection to the second device. Therefore, in this step, because the first identifier is generated by the second device through calculation according to the first information portion of the connection information, and the second identifier is equal to or corresponds to the result that is generated through calculation according to the first information portion, when the first identifier matches the second identifier, the first device can automatically discover that the second device is a device to which the first device needs to establish a wireless connection.

Step S104: If the first identifier matches the second identifier, the first device sends a second message to the second device, where the second message is a response message corresponding to the first message.

The second message is used by the second device to determine that the first device agrees to establish a wireless connection to the second device, so that the second device also discovers that the first device is a device that needs to establish a wireless connection to the second device.

Step S105: The first device establishes a wireless connection to the second device.

In the embodiment of the present disclosure, a first device generates a piece of connection information, and provides the connection information to a second device; and then the second device and the first device perform subsequent interaction according to the connection information to establish a wireless connection between the first device and the second device. In comparison with finding an identifier of the second device from a large quantity of device search results by a user, the embodiment of the present disclosure may save both time for performing a device search by the first device and time for searching for the identifier of the second device by the user, and therefore may reduce time for establishing a wireless connection.

In the embodiment of the present disclosure, a first device generates connection information, and provides the connection information to a second device; the second device generates a first identifier according to the connection information, and sends a first message carrying the first identifier to the first device; the first device generates a second identifier according to the connection information, and if the first identifier matches the second identifier, establishes a wireless connection to the second device, where the first device can discover, by using the first identifier and the second identifier, that the second device sending the first message carrying the first identifier is a device to which the first device needs to establish a wireless connection. In this way, a user of the first device only needs to provide the generated connection information to the second device by using the first device, and a subsequent procedure is performed through interaction between the first device and the second device, so as to establish a wireless connection between the first device and the second device. In the embodiment of the present disclosure, the user of the first device does not need to search for nearby devices by using the first device, and the user of the first device does not need to spend time in selecting a device from a large quantity of search results. Therefore, efficiency of establishing a wireless connection is improved, and further, efficiency of data transmission is improved, user operations are also simplified, and user experience is improved.

Figures 1, 2:
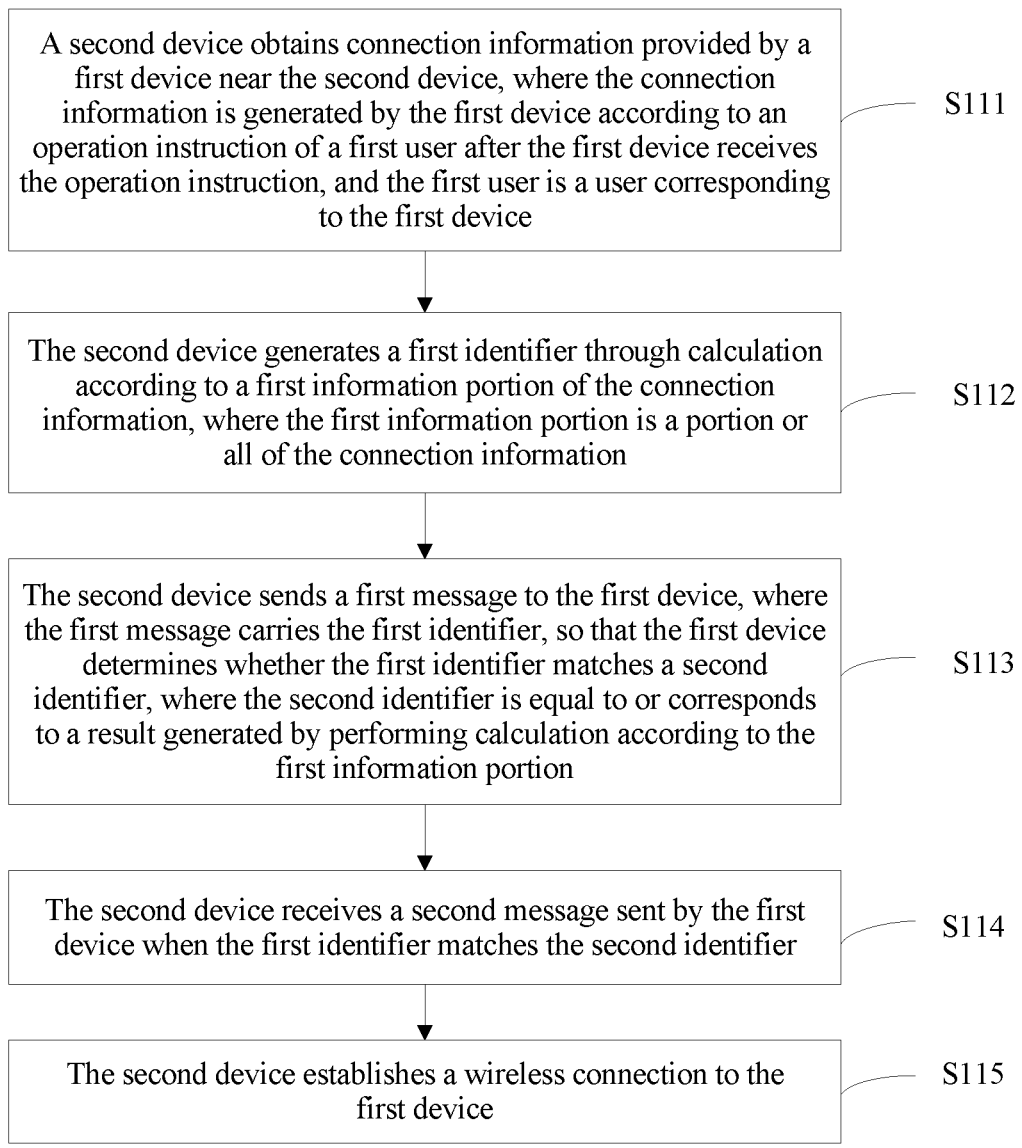

Referring to FIG. 1-2, an embodiment of the present disclosure provides a method for establishing a wireless connection, where the method is used for establishing a wireless connection between a first device and a second device. The method includes the following steps.

Step S111: The second device obtains connection information provided by the first device near the second device, where the connection information is generated by the first device according to an operation instruction of a first user after the first device receives the operation instruction, and the first user is a user corresponding to the first device.

The second device may obtain the connection information in any one of the following first, second, and third manners:

Manner 1: The second device receives the connection information input by a second user.

After generating the connection information, the first device displays the connection information or plays the connection information by using a sound box. The second user may view or listen to the connection information, and then input the connection information to the second device.

Manner 2: The second device scans a graphic code displayed by the first device, and obtains the connection information included in the graphic code.

The second user may enable a scanning module of the second device, and then the second device scans, by using the scanning module, the graphic code displayed by the first device, parses the scanned graphic code, and obtains the connection information included in the scanned graphic code.

Manner 3: The second device establishes a short-range communications connection to the first device, and receives, by using the short-range communications connection, the connection information sent by the first device.

The connection information is generated by the first device, and the second device may obtain the connection information according to any one of the foregoing manners. In comparison with finding an identifier of a device from a large quantity of device search results by a user, this step may save both time for performing a device search by the first device and time for searching for the identifier of the device by the user, and therefore may reduce time for establishing a wireless connection.

Step S112: The second device generates a first identifier through calculation according to a first information portion of the connection information, where the first information portion is a portion or all of the connection information.

The second device may generate the first identifier according to either of the following two manners, including:

Manner 1: The second device performs a hash operation on the first information portion of the connection information to obtain a first hash result, and generates the first identifier according to the first hash result.

An information portion may be truncated from the first hash result and used as the first identifier, or preset information is added to a truncated information portion to form the first identifier, or the first hash result is used as the first identifier, or the like.

Manner 2: The second device adds first preset information to the first information portion of the connection information to obtain first construction information, and generates the first identifier according to the first construction information.

The second device generates the first identifier through calculation according to the first information portion of the connection information. In this way, a probability that the first identifier generated by the second device collides with an identifier generated by another device may be reduced.

Step S113: The second device sends a first message to the first device, where the first message carries the first identifier, so that the first device determines whether the first identifier matches a second identifier, where the second identifier is equal to or corresponds to a result that is generated through calculation according to the first information portion.

In the embodiment of the present disclosure, the second device uses the first identifier as an identifier of a device that needs to establish a wireless connection to the second device. Because the first identifier is generated through calculation according to the first information portion of the connection information, and the second identifier is equal to or corresponds to the result that is generated through calculation according to the first information portion, when the first identifier matches the second identifier, the first device can automatically discover that the second device is a device that needs to establish a wireless connection to the first device. In this way, the first device and the second device mutually discover that they are devices that need to establish a wireless connection to each other.

Step S114: The second device receives a second message sent by the first device when the first identifier matches the second identifier.

Step S115: The second device establishes a wireless connection to the first device.

In the embodiment of the present disclosure, a second device obtains connection information provided by a first device, generates a first identifier according to the connection information, and sends a first message carrying the first identifier to the first device, so that the first device determines whether the first identifier matches a second identifier of the first device; and if the first identifier matches the second identifier, the second device establishes a wireless connection to the first device, where the first device and the second device can mutually discover, by using the first identifier and the second identifier, that they are devices that need to establish a wireless connection to each other. In this way, a user does not need to select a device from a large quantity of search results, efficiency of establishing a wireless connection is improved, and efficiency of data transmission is improved.

An embodiment of the present disclosure provides a method for establishing a wireless connection. In the embodiment of the present disclosure, a first device is a wireless access device, and a second device is a wireless terminal. For example, when the first device is an AP (access point) in an infrastructure network model or is a hotspot converted from an intelligent terminal, correspondingly, the second device is a wireless terminal; when the first device is a GO (group owner) device in a P2P (Peer-to-Peer) network, correspondingly, the second device is a Client device in the P2P network. A person skilled in the art may understand that methods performed by the first device and the second device in the two scenarios are similar. For ease of description, in this embodiment, for example, the second device and the first device establish a wireless connection in an AP-STA (access point-station) mode. An identity of the second device is a STA, and an identity of the first device is an AP. The first device generates connection information, and provides the connection information to the second device; the second device generates a first identifier through calculation according to a first information portion of the connection information, and sends a Probe request message to the first device, where an SSID (service set identifier) field in the Probe request message carries the first identifier; the first device generates a second identifier through calculation according to the first information portion of the connection information; the first device compares the first identifier with the second identifier, and if the first identifier matches the second identifier, the first device establishes a wireless connection to the second device. Referring to FIG. 2-1, the method includes the following steps.

Step 201: The first device generates connection information.

The connection information may be a character string. Content of the connection information may be numerals, letters, or other characters, or may be any combination of multiple characters of numerals, letters, and other characters. The first device may generate a character string randomly, and use the generated character string as the connection information.

In the embodiment of the present disclosure, the first device may generate connection information when triggered by a first user corresponding to the first device. Specifically, the following two trigger manners exist and include:

Manner 1: The first device generates connection information when detecting a connection command that is triggered by clicking a connection interface in a UI of a system application by the first user.

A connection interface is set in the UI of the system application requiring data transmission. When the first user needs to transmit data, the first user may click the connection interface, so that the connection interface triggers a connection command. The system application may be any application or a software program that needs to connect to the peer device, or a submodule in a application, or another application invoked in an application. For example, the system application may be a media content sharing application, and when the user clicks a connection interface, of the application, for connecting to a media content sharing peer device, a connection command is triggered, where the media content sharing peer device is a device that sends media content or a device that receives media content; or the system application may be a network sharing application, and when the user clicks a connection interface, of the application, for connecting to a network sharing peer device, a connection command is triggered, where the network sharing peer device is a device that shares a network with the first device or a device that uses a network shared by the first device; or the system application may be a multi-screen interaction application, and when the user clicks a connection interface, of the application, for connecting to a multi-screen interaction peer device, a connection command is triggered, where the multi-screen interaction peer device is a device that initiates multi-screen interaction or a device that joins in multi-screen interaction; or the system application may be a multi-player game application, and when the user clicks a connection interface for connecting to a multi-player game peer device, a connection command is triggered, where the multi-player game peer device is a device that initiates a multi-player game or a device that joins in a multi-player game; or the system application may be a service connection application, and when the user clicks a connection interface for connecting to a service connection peer device, a connection command is triggered, where the service connection peer device is a device that can meet a service requirement of the first device.

When the connection command is triggered, another application invoked in the foregoing system application is also considered as a part of the system application. For example, when the user performs sharing in an image shooting application that has an image sharing function or in a video shooting application that has a video sharing function, another application for triggering the device to enable a connected mode may also be invoked. In this embodiment, the another application is also considered as a part of the system application.

It should be noted that, in the foregoing process, clicking a dedicated connection button may be not required. Instead, a connection command is triggered by default when the application is triggered.

A detailed description is provided by using an example in which a system application is an image shooting application that has an image sharing function or a video shooting application that has a video sharing function.

For example, referring to a UI of a system application shown in FIG. 2-2, the system application is an image shooting application. The image shooting application shoots an image and displays the image in the UI. On an upper side of the UI is a connection interface (such as an icon having a sharing function shown in the figure), and when the first user clicks the connection interface, the connection interface triggers a connection command. When the first device detects the connection command triggered by the connection interface, connection information is generated randomly. It is assumed that the generated connection information is "12345678", as shown in FIG. 2-3.

Manner 2: The first device generates connection information when detecting a connection command that is triggered by clicking a connection interface in a UI of a third-party application by the first user, where the third-party application is an application for establishing a wireless connection.

A third-party application that may be used for establishing a wireless connection is installed on the first device, and a UI of the third-party application includes a connection interface. When the first user needs to transmit data, the first user may click the connection interface, so that the connection interface triggers a connection command.

Figures 1, 2:
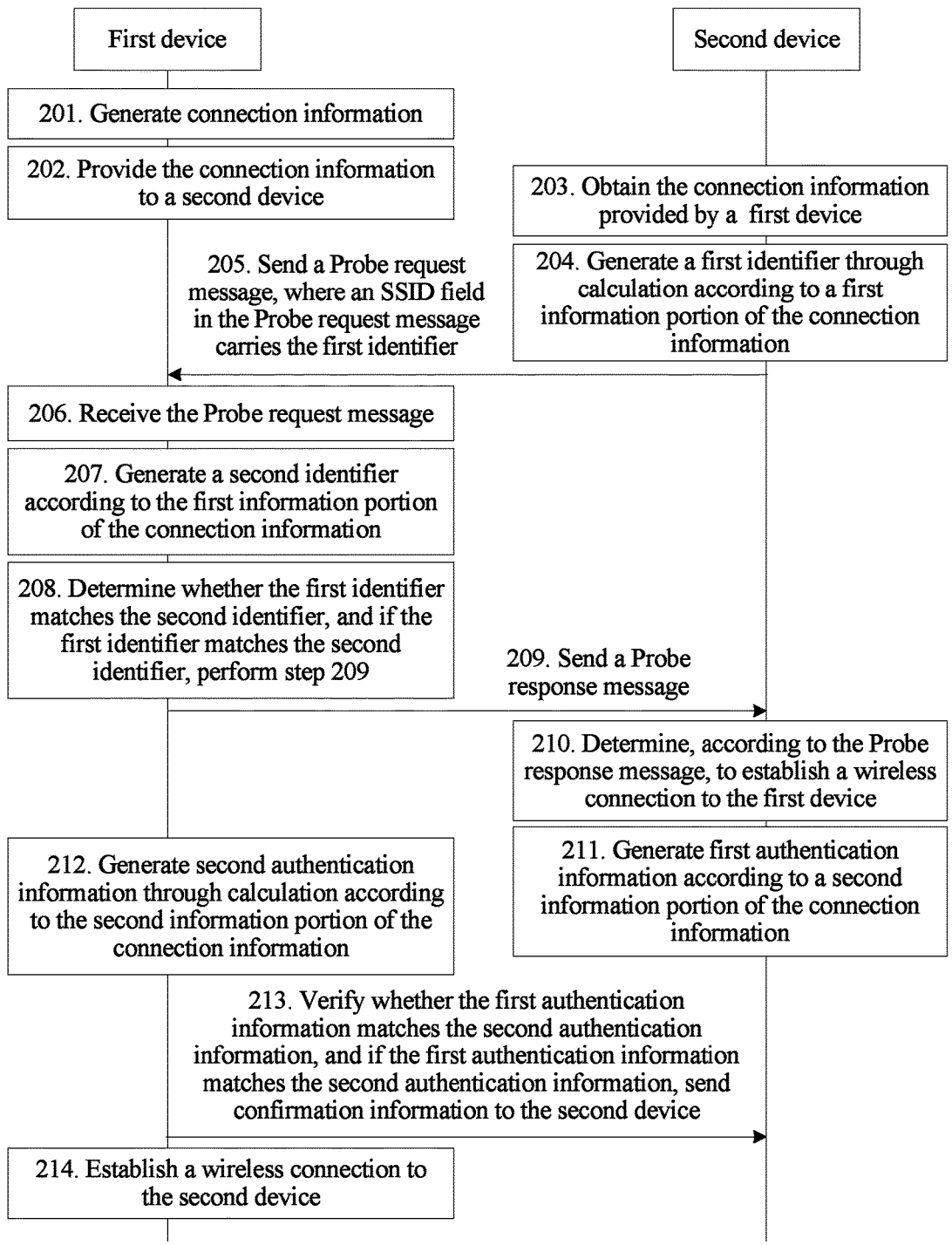
Figure 2:
Figures 2, 3:
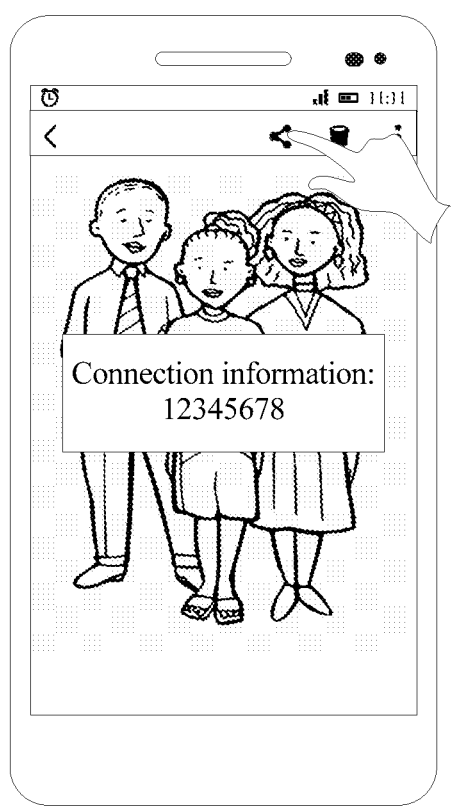
Figures 2, 3, 4:
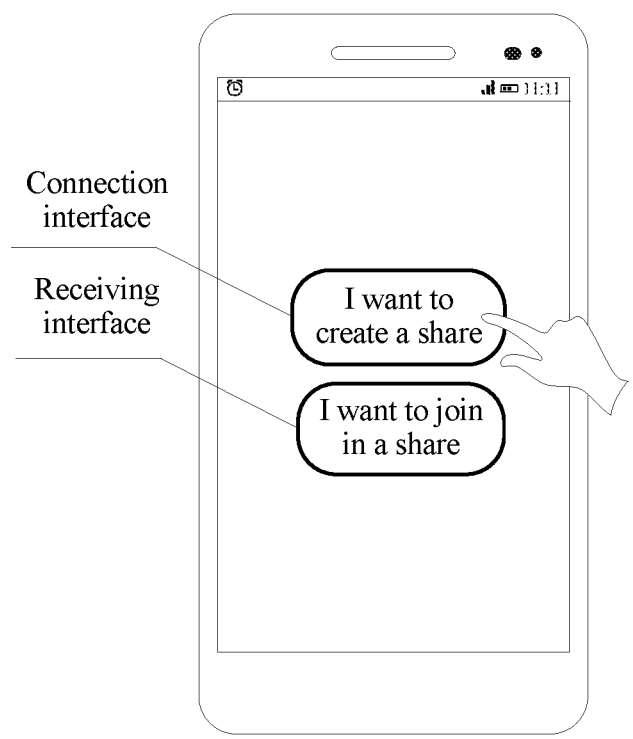

For example, referring to a UI of a third-party application shown in FIG. 2-4, a connection interface (such as an icon "I want to create a share" shown in FIG. 2-4) exists in the UI; the first user clicks the connection interface, and the connection interface triggers a connection command. When the first device detects the connection command triggered by the connection interface, connection information is generated randomly. It is assumed that the generated connection information is "12345678", as shown in FIG. 2-5.

Step 202: The first device provides the connection information to the second device.

Specifically, this step may be implemented in any one of the following four manners:

Manner 1: The first device displays the connection information.

A second user corresponding to the second device may view the connection information displayed by the first device, and input the connection information to the second device. The second user may be the same as or different from the first user corresponding to the first device. Alternatively, the second user corresponding to the second device may obtain, through other artificial means, the connection information displayed by the first device. For example, after the first user corresponding to the first device views the connection information, the first user notifies the second user of the connection information in all feasible manners such as reading, SMS, and calling, and the second user inputs the connection information to the second device.

Manner 2: The first device plays, by using a speaker, a speech corresponding to the connection information.

The second user may listen to the speech corresponding to the connection information and played by the first device, and input the connection information to the second device.

Manner 3: The first device generates, according to the connection information, a graphic code including the connection information, and displays the graphic code.

The graphic code may be a one-dimensional code or a two-dimensional code, or a graphic code in another form. The first device may code the connection information by using a coding algorithm that is used for generating a graphic code, so as to generate the graphic code including the connection information, for example, generate a QR Code (quick response code) two-dimensional code.

The second device has a scanning module, where the scanning module may be a camera, a scanner, or the like. After the first device displays the graphic code, the second device may scan, by using the scanning module included in the second device, the graphic code displayed by the first device, and obtain the connection information.

Manner 4: The first device establishes a short-range communications connection to the second device, and sends the connection information to the second device by using the short-range communications connection.

The first device may establish the short-range communications connection to the second device in an out-of-band communications mode. The out-of-band communications mode may be a communications mode like acoustic wave, infrared, NFC (near field communication), or HotKnot.

In the embodiment of the present disclosure, the first device may be a terminal device or an AP. When the first device is a terminal device, before performing this step, the first device sets its own identity as an AP or a hotspot.

After the first device becomes an AP, the first device may also actively broadcast a Beacon message to notify nearby STAs of presence of the AP. The second device may determine, according to the received Beacon message, that the first device is an AP, and actively request to establish a connection to the first device; then the first device performs this step. The second device may also directly request to establish a connection to the first device after obtaining the connection information of the first device.

Step 203: The second device obtains the connection information provided by the first device.

Specifically, the second device may obtain the connection information in any one of the following first, second, and third manners.

Manner 1: The second device receives the connection information input by the second user.

After generating the connection information, the first device displays the connection information or plays the connection information by using a sound box. The second user may view or listen to the connection information, and then input the connection information to the second device.

The second device may obtain, in the following two manners (1) and (2), the connection information input by the second user, including:

(1) The second device obtains, from a UI of a system application, the connection information input by the second user.

The UI of the system application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the first device displays the connection information "12345678" or plays the connection information "12345678" by using a sound box, and the second user views the connection information "12345678" or listens to the connection information "12345678". Then, the second user clicks the receiving interface in the UI of the system application shown in FIG. 2-6, and the receiving interface triggers a receiving command. The second device displays an input box in the UI when detecting the receiving command triggered by the receiving interface. As shown in FIG. 2-7, the second user inputs the connection information "12345678" in the input box. Then the second device reads, from the input box, the connection information "12345678" input by the second user.

(2) The second device obtains, from a UI of a third-party application, the connection information input by the second user.

The UI of the third-party application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the second user clicks the receiving interface in the UI of the third-party application shown in FIG. 2-4, and the receiving interface triggers a receiving command. The second device displays an input box in the UI when detecting the receiving command triggered by the receiving interface. As shown in FIG. 2-8, the second user inputs the connection information "12345678" in the input box. Then the second device reads, from the input box, the connection information "12345678" input by the second user.

Manner 2: The second device scans the graphic code displayed by the first device, and obtains the connection information included in the graphic code.

The second user may enable the scanning module of the second device, and then the second device scans, by using the scanning module, the graphic code displayed by the first device, parses the scanned graphic code, and obtains the connection information included in the scanned graphic code.

Manner 3: The second device establishes a short-range communications connection to the first device, and receives, by using the short-range communications connection, the connection information sent by the first device.

In this embodiment, the first device generates a piece of connection information; the second user may input the connection information to the second device, or scan, by using the second device, a graphic code including the connection information on the first device, or make the second device close to the first device so that the second device obtains the connection information in a short-range communications mode. In comparison with finding an identifier of the second device from a large quantity of device search results by the first user, this step may save both time for performing a device search by the first device and time for searching for the identifier of the second device by the first user, and therefore may reduce time for establishing a wireless connection between the first device and the second device.

Step 204: The second device generates a first identifier through calculation according to a first information portion included in the connection information, where the first information portion is a portion or all of the connection information.

Specifically, this step may be implemented in either of the following two manners:

performing a conversion operation on the first information portion of the connection information to obtain a first conversion result, and obtaining the first identifier according to the first conversion result; or adding first preset information to the first information portion of the connection information to obtain first construction information, and obtaining the first identifier according to the first construction information.

Specifically, the conversion operation may be performing partial displacement, splitting, reverse ordering, mapping, padding, replacement, adding/subtracting a preset value, multiplying/dividing by a preset value, performing conversion by using a preset formula, or the like, or may be a combination of the foregoing conversion operations, and the present disclosure is not limited thereto.

For example, assuming that the first information portion of the connection information "12345678" is "1234" and that first preset information is "hua", the second device performs reverse ordering on the first information portion "1234" of the connection information to obtain "4321" as the first identifier, or repeats a value of each character in the first information portion "1234" of the connection information once to obtain "11223344" as the first identifier.

Specifically, the second device may further perform a hash operation on the first information portion of the connection information to obtain a first hash result, and generate the first identifier according to the first hash result. The hash operation is an operation performed on inputs of different lengths to obtain an output of a fixed length, including but not limited to various operations involving common hash algorithms in an operation process, and customized operation algorithms that may obtain an output of a fixed length. For example, the first information portion of the connection information is first extended, or information is added thereto, and then an SHA-256 operation may be performed to obtain a first hash result.

Specifically, an information portion may also be truncated from the first hash result and used as the first identifier, or preset information is added to a truncated information portion to form the first identifier, or the first hash result is used as the first identifier, or the like. For example, the second device first performs replacement on the first information portion "1234" of the connection information "12345678" to obtain "5678", then performs a hash operation of an SHA-256 hash algorithm on "5678" to obtain a first hash result "6BAA0BD18BCC1E5237B70DC18595A7DEFF11CD27120CDC96A678003F8B162941", and then truncates values "8B162941" of the last eight characters of the first hash result as the first identifier; or further adds "hua" to obtain "hua8B162941" as the first identifier.

Manner 2: The second device adds first preset information to the first information portion of the connection information to obtain first construction information, and generates the first identifier according to the first construction information.

Reverse displacement processing or shift processing may be performed on the first construction information to generate the first identifier. For example, assuming that the first information portion of the connection information "12345678" is "1234" and that the first preset information is "hua", the first construction information obtained by the second device by adding the first preset information "hua" to the first information portion "1234" of the connection information may be "1234hua", "hua1234", "12hua34", or the like.

Assuming that the constructed first construction information is "1234hua", the first identifier obtained by performing reverse displacement processing on the first construction information is "auh4321"; or a shift amount is preset, where the shift amount may be two, three, or the like, and then two-position shift processing, three-position shift processing, or the like is performed on the first construction information. For example, when two-position shift processing is performed on the first construction information, the obtained first identifier is "ua1234h", and when three-position shift processing is performed on the first construction information, the obtained first identifier is "hua1234".

In addition to the foregoing first and second manners, the second device may further use other manners of generating the first identifier, for example, may truncate a character string of a preset first character quantity from the connection information as a first character string, and generate the first identifier according to the first character string; or perform a hash operation on the whole connection information to obtain the first identifier.

The second device may generate the first identifier according to the first character string in any one of the following manners (1) to (4):

(1) Determine that the first character string is the first identifier.

For example, the preset first character quantity is 6, and the second device truncates a character string "123456" of the first six characters or a character string "345678" of the last six characters from the connection information "12345678" as the first character string, and determines that the first character string "123456" or "345678" is the first identifier.

(2) Use the first character string and a first preset character string to form the first identifier.

For example, if the first character string is "123456", and the first preset character string is "Huawei", the first identifier formed by the first character string and the first preset character string is "123456Huawei" or "Huawei123456".

(3) Perform a hash operation on the first character string to obtain a hash result, and truncate a character string of the preset first character quantity from the hash result as the first identifier.

(4) Perform a hash operation on the first character string to obtain a hash result, truncate a character string of the preset first character quantity from the hash result, and use the truncated character string and the first preset character string to form the first identifier.

Step 205: The second device sends a Probe request message, where an SSID field in the Probe request message carries the first identifier.

The second device sets its own identity as a STA, and sends the Probe request message to request to establish a wireless connection to an AP that receives the Probe request message. The second device may broadcast the Probe request message, or after receiving a Beacon message broadcast by the first device, the second device may obtain an address of the first device from the Beacon message, and unicast the Probe request message to the first device according to the address of the first device.

Referring to a structure of a Probe request shown in FIG. 2-9, the Probe request message includes parts such as a MAC (media access control) header, a frame body, and an FCS (frame check sequence). The MAC header includes fields such as Addr_1 and Addr_2, where Addr_1 is a receiver address, and Addr_2 is a sender address. The frame body includes fields such as an SSID, where the SSID is an identifier of an AP. The FCS is a check field and is used to carry a check code. In the embodiment of the present disclosure, the second device uses the first identifier as the identifier of the AP. When the second device broadcasts the Probe request message, the Addr_1 field in the Probe request message is null; when the second device unicasts the Probe request message to the first device, the Addr_1 field in the Probe request message carries a MAC address of the first device; in the two cases, the Addr_2 field in the Probe request message carries a MAC address of the second device, and the SSID field carries the first identifier.

Step 206: The first device receives the Probe request message, where the SSID field in the Probe request message carries the first identifier.

Only an AP can receive a Probe request message. Therefore, in the embodiment of the present disclosure, the first device is an AP or sets its own identity as an AP, and then receives the Probe request message sent by the second device.

For example, the second device sends a Probe request message, where an SSID field in the Probe request message carries a first identifier "123456", and the first device receives the Probe request message.

Step 207: The first device generates a second identifier according to the first information portion of the connection information, where the first device uses the second identifier as its own identifier.

A manner of generating the second identifier by the first device may be the same as a manner of generating the first identifier by the second device.

Specifically, the first device may generate the second identifier through calculation in the following first and second manners, including:

Manner 1: The first device performs a hash operation on the first information portion of the connection information to obtain a first hash result, and generates the second identifier according to the first hash result.

This implementation manner is the same as the first manner of generating the first identifier by the second device. For a detailed process, reference may be made to the first manner of generating the first identifier by the second device, and details are not further described herein.

Manner 2: The first device adds second preset information to a second information portion of the connection information to obtain second construction information, and generates the second identifier according to the second construction information.

The first preset information is added to the first information portion of the connection information to obtain the first construction information, and the second identifier of the first device is obtained according to the first construction information.

This implementation manner is the same as the second manner of generating the first identifier by the second device. For a detailed process, reference may be made to the second manner of generating the first identifier by the second device, and details are not further described herein.

In addition to the foregoing first and second manners, the first device may further use other manners of generating the second identifier, for example, may truncate a character string of the preset first character quantity from the connection information as a second character string, and generate the second identifier according to the second character string; or perform a hash operation on the whole connection information to obtain the second identifier.

It should be noted that, the first device may also generate the second identifier according to this step after generating the connection information and before receiving the Probe request message.

An implementation manner in which the first device generates the second identifier according to the second character string may include the following manners (1) to (4):

(1) Determine that the second character string is the second identifier.

For example, the preset first character quantity is 6, and the first device truncates a character string "123456" of the first six characters or a character string "345678" of the last six characters from the connection information "12345678" as the second character string, and determines that the second character string "123456" or "345678" is the second identifier.

(2) Use the second character string and the first preset character string to form the second identifier.

For example, assuming that the second character string is "123456" and that the first preset character string is "Huawei", the second identifier formed by the second character string and the first preset character string is "123456Huawei" or "Huawei123456".

(3) Perform a hash operation on the second character string to obtain a hash result, and truncate a character string of the preset first character quantity from the hash result as the second identifier.

(4) Perform a hash operation on the second character string to obtain a hash result, truncate a character string of the preset first character quantity from the hash result, and use the truncated character string and the preset character string to form the second identifier.

Step 208: The first device determines whether the first identifier matches the second identifier, and if the first identifier matches the second identifier, performs step 209.

That the first identifier matches the second identifier means that the first identifier is equal to the second identifier or that the first identifier corresponds to the second identifier.

An identifier relationship table may be preset on the first device, where the identifier relationship table is used to store any two identifiers having a correspondence.

Correspondingly, the first device may determine, in the following manner, whether the first identifier corresponds to the second identifier, including: the first device may search out a corresponding identifier from the identifier relationship table according to the first identifier; if the identifier that is searched out is equal to the second identifier, determine that the first identifier corresponds to the second identifier; otherwise, determine that the first identifier does not correspond to the second identifier.

In the embodiment of the present disclosure, the second device uses the first identifier as an identifier of a device that needs to establish a wireless connection to the second device. Because the first identifier is generated through calculation according to the first information portion of the connection information, and the second identifier is equal to or corresponds to a result that is generated through calculation according to the first information portion, when the first device receives the first identifier that matches the second identifier, the first device can automatically discover that the second device is a device to which the first device needs to establish a wireless connection. Therefore, the first device and the second device can discover each other quickly, and time for establishing a wireless connection is reduced.

Step 209: The first device sends a Probe response message to the second device, where the Probe response message is used by the second device to determine to establish a wireless connection to the first device.

The second device sends a Probe request message, to request to establish a wireless connection to an AP, where a first identifier of the AP is carried in an SSID field in the Probe request message. Therefore, in this step, when the first device determines that the first identifier matches the second identifier, the first device may know that the second device requests to establish a wireless connection to the first device, therefore determine that a wireless connection needs to be established to the second device, and send the Probe response message to the second device, so as to notify the second device that the first device agrees to establish a wireless connection to the second device.

Referring to a structure of a Probe response message shown in FIG. 2-10, the Probe response message includes parts such as a MAC header, a frame body, and an FCS. The MAC header includes fields such as Addr_3 and Addr_4, where Addr_3 is a receiver address, and Addr_4 is a sender address. The frame body includes fields such as an SSID, where the SSID is an identifier of an AP. The FCS is a check field and is used to carry a check code. In the embodiment of the present disclosure, in the Probe response message, the Addr_3 field carries the MAC address of the second device, the Addr_4 field carries the MAC address of the first device, and the SSID field carries the second identifier.

For example, it is assumed that the SSID field in the Probe request message sent by the second device carries the first identifier "123456". The first device receives the Probe request message, and the generated second identifier is "123456". The first identifier "123456" is the same as the second identifier "123456", and therefore, the first identifier matches the second identifier. The first device determines that a wireless connection needs to be established to the second device, and sends a Probe response message to the second device.

Step 210: The second device receives the Probe response message, determines, according to the Probe response message, to establish a wireless connection to the first device, and performs step 211.

Step 211: The second device generates first authentication information according to a second information portion of the connection information.

Content of the first information portion of the connection information may be the same as or different from content of the second information portion. For example, if the connection information is "12345678", the first information portion may be "1234", and the second information portion may be "5678"; or the first information portion may be "123456", and the second information portion may be "345678"; or the like.

Specifically, this step may be implemented in either of the following two manners:

Manner 1: The second device performs a hash operation on the second information portion of the connection information to obtain a second hash result, and generates the first authentication information according to the second hash result.

For example, hash of the SHA-256 hash algorithm is performed on the second information portion "5678" of the connection information "12345678" to obtain a second hash result "6BAA0BD18BCC1E5237B70DC 18595A7DEFF11CD27120CDC96A678003F8B162941", and processing such as truncation or supplementation is performed on the second hash result according to an authentication mode used by the second device, to obtain first authentication information of a character quantity required by the authentication mode.

The authentication mode used by the second device may include a 4-way handshake authentication mode, a WPS authentication mode, or another authentication mode. For each authentication mode, an authentication message format is specified. For example, for the 4-way handshake authentication mode, it is specified that an authentication message is key information formed by 256 bits, and for the WPS authentication mode, it is specified that an authentication message is eight digits.

For example, when the second device uses the 4-way handshake authentication, the second hash result includes 32 characters, exactly 256 bits, and therefore, the second hash result is used as the first authentication information. When the second device uses the WPS authentication, last eight characters "8F162941" are truncated, and "F" is mapped to a numeral "6" to obtain "86162941" as the first authentication information.

Manner 2: The second device adds the second preset information to the second information portion of the connection information to obtain the second construction information, and generates the first authentication information according to the second construction information.

For example, when using the 4-way handshake authentication, the second device converts the second information portion "5678" of the connection information "12345678" into binary "1011000101110", and then adds 243 bits of "0" to a left side of "1011000101110" to obtain 256-bit first authentication information, or adds 243 bits of "1" to a right side of "1011000101110" to obtain 256-bit first authentication information.

When using the WPS authentication, the second device adds four digits "8888" or "0000" to a left side or a right side of the second information portion "5678" of the connection information "12345678" to obtain eight digits as the first authentication information.

It should be noted that, when a character quantity of the second information portion meets a character quantity of authentication information required by the authentication mode used by the second device, the second information portion may also be directly used as the first authentication information.

In addition to the foregoing first and second manners of generating the first authentication information, the second device may further use other manners of generating the first authentication information. For example, the second device truncates a character string of a preset second character quantity from the connection information as a fourth character string, and generates the first authentication information according to the fourth character string; or determines that the connection information is the first authentication information.

An implementation manner in which the second device generates the first authentication information according to the fourth character string includes the following manners:

Manner 1: Determine that the fourth character string is the first authentication information.

For example, assuming that the preset second character quantity is 4, the second device truncates a character string "1234" of the first four characters or a character string "5678" of the last four characters from the connection information "12345678" as the fourth character string, and uses the fourth character string as the first authentication information.

In the embodiment of the present disclosure, a sum of the preset first character quantity and the second character quantity may be equal to a quantity of characters included in the connection information. Correspondingly, the second device obtains a remaining character string after truncating the first character string of the preset first character quantity from the connection information, where a quantity of characters of the remaining character string is the preset second character quantity, and the remaining character string of the preset second character quantity may be used as the fourth character string. For example, the preset first character quantity is 6, and the preset second character quantity is 2. The second device obtains a remaining character string "78" of the preset second character quantity after truncating the first character string "123456" of the preset first character quantity from the connection information "12345678", and the second device may use the remaining character string "78" of the preset second character quantity as the fourth character string.

Manner 2: Use the fourth character string and a second preset character string to form the first authentication information.

For example, assuming that the fourth character string is "1234" and that the second preset character string is "9860", second authentication information formed by the fourth character string and the second preset character string is "12349860" or "98601234".

Manner 2: Perform a hash operation on the fourth character string to obtain a hash result, and truncate a character string of the preset second character quantity from the hash result as the first authentication information, or determine that the hash result is the first authentication information.

Manner 4: Generate the first authentication information according to the fourth character string and the authentication mode used by the second device.

Specifically, a quantity of characters in the authentication information is determined according to the authentication mode used by the second device; and information padding or information truncation is performed on the fourth character string according to the determined quantity of characters to obtain the second authentication information. For example, the fourth character string is "1234"; assuming that the second device uses the WPS (Wi-Fi (Wireless Fidelity) Protected Setup, Wi-Fi protected setup) authentication mode, it is determined, according to the WPS authentication mode, that the quantity of characters in the authentication information is eight digits; information "9988" is padded into the fourth character string "1234", and first authentication information "12349988" is obtained. For another example, assuming that the second device uses the 4-way handshake authentication mode, it is determined, according to the 4-way handshake authentication mode, that a quantity of bits in the authentication information is 256 bits, but the fourth character string "1234" includes 32 bits; therefore, 224 bits are padded into the fourth character string, and 256-bit first authentication information is obtained.

Alternatively, a quantity of characters in the authentication information is determined according to the authentication mode used by the second device; a hash operation is performed on the fourth character string to obtain a hash result; and information padding or information truncation is performed on the hash result according to the determined quantity of characters to obtain the second authentication information. For example, the fourth character string is "1234"; a hash operation is performed on the fourth character string "1234" to obtain a hash result "98765432111"; assuming that the second device uses the WPS authentication mode, it is determined, according to the WPS authentication mode, that the quantity of characters in the authentication information is eight digits; and eight digits "98765432" are truncated from the hash result and used as the first authentication information. For another example, assuming that the second device uses the 4-way handshake authentication mode, it is determined, according to the 4-way handshake authentication mode, that a quantity of bits in the authentication information is 256 bits, but the hash result "98765432111" includes 88 bits; therefore, 168 bits are padded into the hash result, and 256-bit first authentication information is obtained.

Step 212: The first device generates second authentication information according to the second information portion of the connection information.

Specifically, this step may be implemented in the following first and second manners, including:

Manner 1: The first device performs a hash operation on the second information portion of the connection information to obtain a second hash result, and generates the second authentication information according to the second hash result.

A process of this implementation manner is the same as the process of the first manner of generating the first authentication information by the second device, and details are not further described herein.

Manner 2: The first device adds the second preset information to the second information portion of the connection information to obtain the second construction information, and generates the second authentication information according to the second construction information.

A process of this implementation manner is the same as the process of the second manner of generating the first authentication information by the second device, and details are not further described herein.

In addition to the foregoing first and second manners of generating the second authentication information, the first device may further use other manners of generating the second authentication information. For example, the first device truncates a character string of the preset second character quantity from the connection information as a third character string, and generates the second authentication information according to the third character string; or determines that the whole connection information is the second authentication information.

A manner in which the first device generates the second authentication information according to the third character string includes the following manners:

Manner 1: Determine that the third character string is the second authentication information.

For example, assuming that the preset second character quantity is 4, the first device truncates a character string "1234" of the first four characters or a character string "5678" of the last four characters from the connection information "12345678" as the third character string, and uses the third character string as the second authentication information.

In the embodiment of the present disclosure, the sum of the preset first character quantity and the second character quantity may be equal to the quantity of characters included in the connection information. Correspondingly, the first device obtains a remaining character string after truncating the second character string of the preset first character quantity from the connection information, where a quantity of characters of the remaining character string is the preset second character quantity, and the remaining character string of the preset second character quantity may be used as the third character string. For example, the preset first character quantity is 6, and the preset second character quantity is 2. The first device obtains a remaining character string "78" of the preset second character quantity after truncating the second character string "123456" of the preset first character quantity from the connection information "12345678", and the first device may use the remaining character string "78" of the preset second character quantity as the third character string.

Manner 2: Use the third character string and the second preset character string to form the second authentication information.

For example, assuming that the third character string is "1234" and that the second preset character string is "9860", the second authentication information formed by the third character string and the second preset character string is "12349860" or "98601234".

Manner 3: Perform a hash operation on the third character string to obtain a hash result, and truncate a character string of the preset second character quantity from the hash result as the first authentication information, or determine that the hash result is the second authentication information.

Manner 4: Generate the second authentication information according to the third character string and an authentication mode used by the first device.

Step 213: The first device verifies whether the first authentication information of the second device matches the second authentication information of the first device, and if the first authentication information matches the second authentication information, sends confirmation information to the second device, where the confirmation information is used by the second device to determine to establish the wireless connection to the first device.

When the first device uses the 4-way handshake authentication mode, this step may be: The first device determines that the second authentication information is a PMK (pairwise master key) of the 4-way handshake authentication mode, and verifies, according to the PMK by using the 4-way handshake authentication mode, whether the first authentication information of the second device matches the second authentication information of the first device.

When the first device uses the WPS authentication mode, this step may be: The first device determines that the second authentication information is a PIN (personal identification number) of the WPS authentication mode, and verifies, according to the PIN by using the WPS authentication mode, whether the first authentication information of the second device matches the second authentication information of the first device.

In the process of verification by the first device, the second device performs verification with the first device, so that the first device determines whether the first authentication information of the second device matches the second authentication information of the first device. Specific implementation is: The second device uses the first authentication information as the PMK of the 4-way handshake authentication mode, and performs authentication with the first device according to the PMK by using the 4-way handshake authentication mode; or uses the first authentication information as the PIN of the WPS authentication mode, and performs authentication with the first device according to the PIN by using the WPS authentication mode.

In the process of verification, after receiving the confirmation information sent by the first device, the second device determines, according to the confirmation information, to establish the wireless connection to the first device, and then step 214 is performed.

The first device and the second device perform mutual authentication by using the first authentication information and the second authentication information. In this way, the first device and the second device establish a wireless connection to each other only after mutual authentication is successful, ensuring that the wireless connection established between the first device and the second device is a secure connection.

Step 214: The first device establishes a data connection to the second device, to implement establishment of a wireless connection to the second device.

The wireless connection established by the first device to the second device is a Wi-Fi connection or a Bluetooth connection. After establishing the wireless connection to the second device, the first device may transmit data by using the established wireless connection.

In the embodiment of the present disclosure, when the first device determines that the first identifier matches the second identifier, the first device may directly perform open authentication with the second device, and establish the data connection to the second device after the authentication is successful, so as to implement establishment of the wireless connection to the second device.

In the embodiment of the present disclosure, a first device generates connection information, and provides the connection information to a second device; the second device generates a first identifier according to the connection information, and sends a Probe request message carrying the first identifier to the first device; the first device generates a second identifier according to the connection information, and if the first identifier matches the second identifier, establishes a wireless connection to the second device. The second device obtains, in a user input manner or another manner, the connection information generated by the first device, generates the first identifier according to the connection information, and determines, by using the first identifier, a device that needs to be connected to. Therefore, manually selecting the device that needs to be connected to by a user is avoided, efficiency of establishing a wireless connection is improved, and efficiency of data transmission is improved. The first device and the second device further perform mutual authentication by using first authentication information and second authentication information. Therefore, the established wireless connection is more secure, and security of data transmission is improved.

An embodiment of the present disclosure provides a method for establishing a wireless connection. In the embodiment of the present disclosure, a second device and a first device establish a wireless connection in an AP-STA mode. An identity of the second device is a STA, and an identity of the first device is an AP. The first device generates connection information according to a second identifier and second authentication information that are stored by the first device, and provides the connection information to the second device; the second device generates a first identifier according to the connection information, and sends a Probe request message to the first device, where an SSID field in the Probe request message carries the first identifier; and the first device establishes a wireless connection to the second device when determining that the first identifier matches the second identifier. Referring to FIG. 3, the method includes the following steps.

Step 301: The first device generates a first information portion of connection information according to a second identifier.

Before this step is performed, a person skilled in the art may set the second identifier on the first device, or the first device generates the second identifier and stores the generated second identifier.

For example, a generation rule for the second identifier may be set manually, and the first device generates the second identifier according to the generation rule; or an identifier resource library for the second identifier may be set, and the first device randomly selects an identifier from the resource library as the second identifier; or the second identifier may be set manually.

For example, the first device may generate the second identifier in the following manner, including: the first device generates the connection information, adds first preset information to the first information portion of the connection information to obtain first construction information, generates the second identifier according to the first construction information, and may perform reverse displacement or shift processing on the first construction information to obtain the second identifier.

Assuming that the generated connection information is "12345678", that the first information portion of the connection information is "1234", and that the first preset information is "hua", the first construction information obtained by the first device by adding the first preset information "hua" to the first information portion "1234" of the connection information may be "1234hua", "hua1234", "12hua34", or the like. Assuming that the constructed first construction information is "1234hua", the first identifier obtained by performing reverse displacement processing on the first construction information is "auh4321"; or a shift amount is preset, where the shift amount may be two, three, or the like, and then two-position shift processing, three-position shift processing, or the like is performed on the first construction information. For example, when two-position shift processing is performed on the first construction information, the obtained first identifier is "ua1234h", and when three-position shift processing is performed on the first construction information, the obtained first identifier is "hua1234".

This step may be: The first device performs truncation on the second identifier to obtain an information portion, and determines that the truncated information portion is the first information portion of the connection information; or performs first operation processing on the second identifier to obtain the first information portion of the connection information, where the first operation processing is an operation inverse to that of generating the second identifier.

The first operation processing may be performed on the second identifier according to the following two steps (1) and (2) to obtain the first information portion of the connection information, including:

(1) Generate the first construction information according to the second identifier.

Forward displacement processing may be performed on the second identifier to obtain the first construction information, or reverse shifting may be performed on the second identifier to obtain the first construction information, where a shifting direction of the reverse shifting is opposite to that of performing shifting processing on the first construction information to obtain the second identifier. For example, assuming that the first identifier is "auh4321", forward displacement processing is performed on the first identifier "auh4321" to obtain the first construction information "1234hua"; or assuming that the first identifier is "ua1234h", reverse two-position shifting is performed on the first identifier "ua1234h" to obtain the first construction information "1234hua"; or assuming that the first identifier is "hua1234", reverse three-position shifting is performed on the first identifier "hua1234" to obtain the first construction information "1234hua".

(2) Remove the first preset information from the first construction information to obtain the first information portion of the connection information.

For example, the first preset information is "hua", and after the first preset information "hua" is removed from the first construction information "1234hua", the first information portion "1234" of the connection information is obtained.

For another example, the first device may further generate the second identifier in the following manner, including: the first device generates the second identifier including preset information and random information. For example, a first identifier portion of the second identifier is a manufacturer identifier, a device model identifier, a device address identifier, a preset field, an application identifier, or the like, and a second identifier portion is a randomly generated number or characters of a preset length.

The first device may perform truncation on the second identifier to obtain the first information portion of the connection information, or after performing truncation on the second identifier, perform a conversion operation to obtain the first information portion of the connection information. For example, the first identifier portion of the second identifier is an application identifier, where the application identifier is an identifier of a system application of the first device, or a content portion obtained by truncation from the application identifier is used as an application identifier. Assuming that the application identifier of the first device is DC9B9CBAAE0D, "AE0D" is truncated as the first identifier portion. Assuming that the second identifier portion generated randomly is "1234", the second identifier is "AE0D1234". The last four characters "1234" may be truncated from the second identifier, and used as the first information portion of the connection information; or the last four characters "1234" are truncated from the second identifier, and then a reversible conversion operation such as reversal or inversion is performed to obtain the first information portion of the connection information.

Step 302: The first device generates a second information portion of the connection information according to second authentication information.

Before this step is performed, a person skilled in the art may set the second authentication information on the first device, or the first device generates the second authentication information and stores the generated second authentication information.

For example, a generation rule for the second authentication information may be set manually, and the first device generates the second authentication information according to the generation rule; or an identifier resource library for the second authentication information may be set, and the first device randomly selects an identifier from the resource library as the second authentication information; or the second authentication information may be set manually.

For example, the first device may generate the second authentication information in the following manner, including: the first device generates the connection information, adds second preset information to the second information portion of the connection information to obtain second construction information, generates the second authentication information according to the second construction information, and may perform reverse displacement or shift processing on the second construction information to obtain the second authentication information.

Assuming that the generated connection information is "12345678", that the first information portion of the connection information is "5678", and that the second preset information is "wei", the second construction information obtained by the first device by adding the second preset information "wei" to the second information portion "5678" of the connection information may be "5678wei", "wei5678", "56wei78", or the like. Assuming that the constructed second construction information is "5678wei", the second authentication information obtained by performing reverse displacement processing on the second construction information is "iew5678"; or a shift amount is preset, where the shift amount may be two, three, or the like, and then two-position shift processing, three-position shift processing, or the like is performed on the second construction information. For example, when two-position shift processing is performed on the second construction information, the obtained second authentication information is "ei5678w", and when three-position shift processing is performed on the second construction information, the obtained second authentication information is "wei5678".

This step may be: The first device performs truncation on the second authentication information to obtain an information portion, and determines that the truncated information portion is the second information portion of the connection information; or performs second operation processing on the second authentication information to obtain the second information portion of the connection information, where the second operation processing is an operation inverse to that of generating the second authentication information.

The second operation processing may be performed on the second authentication information according to the following two steps (1) and (2) to obtain the second information portion of the connection information, including:

(1) Generate the second construction information according to the second authentication information.

Forward displacement processing may be performed on the second authentication information to obtain the second construction information, or reverse shifting may be performed on the second authentication information to obtain the second construction information. For example, assuming that the second authentication information is "iew4321", forward displacement processing is performed on the second authentication information "iew4321" to obtain the second construction information "5678wei"; or assuming that the second authentication information is "ei5678w", reverse two-position shifting is performed on the second authentication information "ei5678w" to obtain the second construction information "5678wei"; or assuming that the second authentication information is "wei5678", reverse three-position shifting is performed on the second authentication information "wei5678" to obtain the second construction information "5678wei".

(2) Remove the second preset information from the second construction information to obtain the second information portion of the connection information.

For example, the second preset information is "wei", and after the second preset information "wei" is removed from the second construction information "5678wei", the second information portion "5678" of the connection information is obtained.

For another example, the first device may further generate the second authentication information in the following manner, including: the first device generates the second authentication information including preset information and random information. For example, a first identifier portion of the second authentication information is a manufacturer identifier, a device model identifier, a device address identifier, a preset field, an application identifier, or the like, and a second identifier portion is a randomly generated number or characters of a preset length.

The first device may perform truncation on the second authentication information to obtain the second information portion of the connection information, or after performing truncation on the second authentication information, perform a conversion operation to obtain the second information portion of the connection information. For example, the first identifier portion of the second authentication information is a device address identifier, where the device address identifier is a physical address of a wireless local area network of the first device, such as a MAC address, or a temporary address of the first device, such as an interface address, or a content portion obtained by truncation from the foregoing address is used as a device address identifier. Assuming that the wireless local area network of the first device is DC:9B:9C:BA:AE:0D, "AE0D" is truncated as the first identifier portion. Assuming that the second identifier portion generated randomly is "1234", the second authentication information is "AE0D1234". The last four characters "1234" may be truncated from the second authentication information, and used as the first information portion of the connection information, or the last four characters "1234" are truncated from the second authentication information, and then a reversible conversion operation such as reversal or inversion is performed to obtain the second information portion of the connection information.

For another example, the first device may further generate a random number or characters of a preset length, and use the number or characters as the second authentication information, and perform conversion on the second authentication information to obtain the second information portion of the connection information. For example, the first device generates a four-digit number, and performs a reversible conversion operation, such as inversion or conversion or adding a preset field, on the four-digit number to obtain the second information portion of the connection information. For example, "8765" is generated, and inversion is performed on "8765" to obtain "5678" as the second information portion of the connection information. Alternatively, the first device generates an eight-digit number, encrypts the eight-digit number by using an encryption key generated according to the application identifier of the first device, and obtains the second information portion of the connection information according to an encryption result.

Step 303: The first device constructs the connection information according to the first information portion and the second information portion.

The first information portion and the second information portion are spliced to obtain the connection information. For example, the first information portion is "1234", and the second information portion is "5678". The first information portion "1234" and the second information portion "5678" are spliced to obtain "12345678" as the connection information.

In the embodiment of the present disclosure, the first device may generate connection information according to the foregoing steps 301 to 303 when triggered by a first user corresponding to the first device. Specifically, the following two trigger manners exist and include:

Manner 1: The first device performs the foregoing steps 301 to 303 when detecting a connection command that is triggered by clicking a connection interface in a UI of a system application by the first user.

A connection interface is set in the UI of the system application requiring data transmission. When the first user needs to transmit data, the first user may click the connection interface, so that the connection interface triggers a connection command. The system application may be an image shooting application that has an image sharing function or a video shooting application that has a video sharing function.

For example, referring to a UI of a system application shown in FIG. 2-2, the system application is an image shooting application. The image shooting application shoots an image and displays the image in the UI. On an upper side of the UI, a connection interface exists, and when the first user clicks the connection interface, the connection interface triggers a connection command. When the first device detects the connection command triggered by the connection interface, the first device performs the foregoing steps 301 to 303 to generate connection information. It is assumed that the generated connection information is "12345678", as shown in FIG. 2-3.

Manner 2: The first device performs the foregoing steps 301 to 303 to generate connection information when detecting a connection command that is triggered by clicking a connection interface in a UI of a third-party application by the first user, where the third-party application is an application for establishing a wireless connection.

A third-party application that is used for establishing a wireless connection is installed on the first device, and a UI of the third-party application includes a connection interface. When the first user needs to transmit data, the first user may click the connection interface, so that the connection interface triggers a connection command.

For example, referring to a UI of a third-party application shown in FIG. 2-4, a connection interface exists in the UI; the first user clicks the connection interface, and the connection interface triggers a connection command. When the first device detects the connection command triggered by the connection interface, the first device performs the foregoing steps 301 to 303 to generate connection information. It is assumed that the generated connection information is "12345678", as shown in FIG. 2-5.

Step 304: The first device provides the connection information to the second device.

Specifically, this step may be implemented in any one of the following four manners, which are respectively:

Manner 1: The first device displays the connection information.

A second user corresponding to the second device may view the connection information displayed by the first device, and input the connection information to the second device.

Manner 2: The first device plays the connection information by using a sound box.

The second user may listen to the connection information played by the first device, and input the connection information to the second device.

Manner 3: The first device generates, according to the connection information, a graphic code including the connection information, and displays the graphic code.

The graphic code may be a one-dimensional code or a two-dimensional code. The first device may code the connection information by using a coding algorithm that is used for generating a graphic code, so as to generate the graphic code including the connection information.

The second device has a scanning module, where the scanning module may be a camera, a scanner, or the like. After the first device displays the graphic code, the second device may scan, by using the scanning module included in the second device, the graphic code displayed by the first device, and obtain the connection information.

Manner 4: The first device establishes a short-range communications connection to the second device, and sends the connection information to the second device by using the short-range communications connection.

The first device may establish the short-range communications connection to the second device in an out-of-band communications mode. The out-of-band communications mode may be a communications mode like acoustic wave, infrared, NFC, or HotKnot.

In the embodiment of the present disclosure, the first device may be a terminal device or an AP. When the first device is a terminal device, the first device sets its own identity as an AP, and then performs this step. After the first device becomes an AP, the first device may also actively broadcast a Beacon message to notify nearby STAs of presence of the AP. A device that receives the Beacon message determines, according to the Beacon message, that the first device is an AP, and actively requests to establish a connection to the first device; then the first device performs this step.

Step 305: The second device obtains the connection information provided by the first device.

Specifically, the second device may obtain the connection information in any one of the following first, second, and third manners.

Manner 1: The second device receives the connection information input by the second user.

After generating the connection information, the first device displays the connection information or plays the connection information by using a sound box. The second user may view or listen to the connection information, and then input the connection information to the second device.

The second device may obtain, in the following two manners (1) and (2), the connection information input by the second user, including:

(1) The second device obtains, from a UI of a system application, the connection information input by the second user.

The UI of the system application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the first device displays the connection information "12345678" or plays the connection information "12345678" by using a sound box, and the second user views the connection information "12345678" or listens to the connection information "12345678". Then, the second user clicks the receiving interface in the UI of the system application shown in FIG. 2-6, and the receiving interface triggers a receiving command. The second device displays an input box in the UI when detecting the receiving command triggered by the receiving interface. As shown in FIG. 2-7, the second user inputs the connection information "12345678" in the input box. Then the second device reads, from the input box, the connection information "12345678" input by the second user.

(2) The second device obtains, from a UI of a third-party application, the connection information input by the second user.

The UI of the third-party application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the second user clicks the receiving interface in the UI of the third-party application shown in FIG. 2-4, and the receiving interface triggers a receiving command. The second device displays an input box in the UI when detecting the receiving command triggered by the receiving interface. As shown in FIG. 2-8, the second user inputs the connection information "12345678" in the input box. Then the second device reads, from the input box, the connection information "12345678" input by the second user.

Manner 2: The second device scans the graphic code displayed by the first device, and obtains the connection information included in the graphic code.

The second user may enable the scanning module of the second device, and then the second device scans, by using the scanning module, the graphic code displayed by the first device, parses the scanned graphic code, and obtains the connection information included in the scanned graphic code.

Manner 3: The second device establishes a short-range communications connection to the first device, and receives, by using the short-range communications connection, the connection information sent by the first device.

In this embodiment, the first device generates a piece of connection information; the user may input the connection information to the second device, or scan, by using the second device, a graphic code including the connection information on the first device, or make the second device close to the first device so that the second device obtains the connection information in a short-range communications mode. In comparison with finding an identifier of the second device from a large quantity of device search results by the user, this step may save both time for performing a device search by the first device and time for searching for the identifier of the second device by the user, and therefore may reduce time for establishing a wireless connection.

Step 306: The second device generates a first identifier through calculation according to the first information portion included in the connection information.

Specifically, this step may be implemented in either of the following two manners:

Manner 1: The second device performs a hash operation on the first information portion of the connection information to obtain a first hash result, and generates the first identifier according to the first hash result.

An information portion may be truncated from the first hash result and used as the first identifier, or preset information is added to a truncated information portion to form the first identifier, or the first hash result is used as the first identifier, or the like.

Manner 2: The second device adds the first preset information to the first information portion of the connection information to obtain the first construction information, and generates the first identifier according to the first construction information.

Reverse displacement processing or shift processing may be performed on the first construction information to generate the first identifier. For example, assuming that the first information portion of the connection information "12345678" is "1234" and that the first preset information is "hua", the first construction information obtained by the second device by adding the first preset information "hua" to the first information portion "1234" of the connection information may be "1234hua", "hua1234", "12hua34", or the like.

Assuming that the constructed first construction information is "1234hua", the first identifier obtained by performing reverse displacement processing on the first construction information is "auh4321"; or a shift amount is preset, where the shift amount may be two, three, or the like, and then two-position shift processing, three-position shift processing, or the like is performed on the first construction information. For example, when two-position shift processing is performed on the first construction information, the obtained first identifier is "ua1234h", and when three-position shift processing is performed on the first construction information, the obtained first identifier is "hua1234".

In addition to the foregoing first and second manners, the second device may further use other manners of generating the first identifier, for example, may truncate a character string of a preset first character quantity from the connection information as a first character string, and generate the first identifier according to the first character string; or perform a hash operation on the whole connection information to obtain the first identifier.

An implementation manner in which the second device generates the first identifier according to the first character string includes the following manners (1) to (4):

(1) Determine that the first character string is the first identifier.

For example, the preset first character quantity is 6, and the second device truncates a character string "123456" of the first six characters or a character string "345678" of the last six characters from the connection information "12345678" as the first character string, and determines that the first character string "123456" or "345678" is the first identifier.

(2) Use the first character string and a first preset character string to form the first identifier.

For example, if the first character string is "123456", and the first preset character string is "Huawei", the first identifier formed by the first character string and the first preset character string is "123456Huawei" or "Huawei123456".

(3) Perform a hash operation on the first character string to obtain a hash result, and truncate a character string of the preset first character quantity from the hash result as the first identifier.

(4) Perform a hash operation on the first character string to obtain a hash result, truncate a character string of the preset first character quantity from the hash result, and use the truncated character string and the first preset character string to form the first identifier.

A person skilled in the art may understand that, as can be known from a conversion process of step 301 in which the first device generates the first information portion of the connection information according to the second identifier, the second device performs corresponding reverse conversion on the obtained first information portion of the connection information, and may obtain the first identifier that matches the second identifier.

A solution in which the second identifier includes an application identifier and a randomly generated portion is used as an example. For example, when the second identifier is "AE0D1234" in step 301, after obtaining the first information portion "1234", the second device obtains an application identifier of a corresponding system application running on the second device. Because the system applications running on the second device and the first device are the same, the second device may obtain an application identifier "AE0D", and may obtain the first identifier "AE0D1234" by splicing the application identifier and the first information portion.

Step 307: The second device sends a Probe request message, where an SSID field in the Probe request message carries the first identifier.

The second device sets its own identity as a STA, and sends the Probe request message to request to establish a wireless connection to an AP that receives the Probe request message. The second device may broadcast the Probe request message, or after receiving a Beacon message broadcast by the first device, the second device may obtain an address of the first device from the Beacon message, and unicast the Probe request message to the first device according to the address of the first device.

Referring to a structure of a Probe request message shown in FIG. 2-9, the Probe request message includes parts such as a MAC header, a frame body, and an FCS. The MAC header includes fields such as Addr_1 and Addr_2, where Addr_1 is a receiver address, and Addr_2 is a sender address. The frame body includes fields such as an SSID, where the SSID is an identifier of an AP. The FCS is a check field and is used to carry a check code. In the embodiment of the present disclosure, the second device uses the first identifier as the identifier of the AP. When the second device broadcasts the Probe request message, the Addr_1 field in the Probe request message is null; when the second device unicasts the Probe request message to the first device, the Addr_1 field in the Probe request message carries a MAC address of the first device; in the two cases, the Addr_2 field in the Probe request message carries a MAC address of the second device, and the SSID field carries the first identifier.

Step 308: The first device receives the Probe request message, where the SSID field in the Probe request message carries the first identifier.

Only an AP can receive a Probe request message. Therefore, in the embodiment of the present disclosure, the first device is an AP or sets its own identity as an AP, and then receives the Probe request message sent by the second device.

For example, the second device sends a Probe request message, where an SSID field in the Probe request message carries a first identifier "123456", and the first device receives the Probe request message.

Step 309: The first device determines whether the first identifier matches the second identifier, and if the first identifier matches the second identifier, performs step 310.

That the first identifier matches the second identifier means that the first identifier is equal to the second identifier or that the first identifier corresponds to the second identifier.

An identifier relationship table may be preset on the first device, where the identifier relationship table is used to store any two identifiers having a correspondence.

Correspondingly, the first device may determine, in the following manner, whether the first identifier corresponds to the second identifier, including: the first device may search out a corresponding identifier from the identifier relationship table according to the first identifier; if the identifier that is searched out is equal to the second identifier, determine that the first identifier corresponds to the second identifier; otherwise, determine that the first identifier does not correspond to the second identifier.

In the embodiment of the present disclosure, the second device may use the first identifier as an identifier of a device that needs to establish a wireless connection to the second device. Because the first identifier is generated through calculation according to the first information portion of the connection information, and the second identifier is equal to or corresponds to a result that is generated through calculation according to the first information portion, when the first identifier matches the second identifier, the first device can automatically discover that the second device is a device that needs to establish a wireless connection to the first device. In this way, the first device and the second device mutually discover that they are devices that need to establish a wireless connection to each other. Therefore, the first device and the second device can discover each other quickly, and time for establishing a wireless connection is reduced.

Step 310: The first device sends a Probe response message to the second device, where the Probe response message is used by the second device to determine to establish a wireless connection to the first device.

The second device sends a Probe request message, to request to establish a wireless connection to an AP, where a first identifier of the AP is carried in an SSID field in the Probe request message. Therefore, in this step, when the first device determines that the first identifier matches the second identifier, the first device may know that the second device requests to establish a wireless connection to the first device, therefore determine that a wireless connection needs to be established to the second device, and send the Probe response message to the second device, so as to notify the second device that the first device agrees to establish a wireless connection to the second device.

Referring to a structure of a Probe response message shown in FIG. 2-10, the Probe response message includes parts such as a MAC header, a frame body, and an FCS. The MAC header includes fields such as Addr_3 and Addr_4, where Addr_3 is a receiver address, and Addr_4 is a sender address. The frame body includes fields such as an SSID, where the SSID is an identifier of an AP. The FCS is a check field and is used to carry a check code. In the embodiment of the present disclosure, in the Probe response message, the Addr_3 field carries the MAC address of the second device, the Addr_4 field carries the MAC address of the first device, and the SSID field carries the second identifier.

For example, it is assumed that the SSID field in the Probe request message sent by the second device carries the first identifier "123456". The first device receives the Probe request message, and the generated second identifier is "123456". The first identifier "123456" is the same as the second identifier "123456", and therefore, the first identifier matches the second identifier. The first device determines that a wireless connection needs to be established to the second device, and sends a Probe response message to the second device.

Step 311: The second device receives the Probe response message, determines, according to the Probe response message, to establish a wireless connection to the first device, and performs step 312.

Step 312: The second device generates first authentication information according to the second information portion of the connection information.

Content of the first information portion of the connection information may be the same as or different from content of the second information portion. For example, if the connection information is "12345678", the first information portion may be "1234", and the second information portion may be "5678"; or the first information portion may be "123456", and the second information portion may be "345678"; or the like.

Specifically, this step may be implemented in either of the following two manners:

Manner 1: The second device performs a hash operation on the second information portion of the connection information to obtain a second hash result, and generates the second authentication information according to the second hash result.

Manner 2: The second device adds the second preset information to the second information portion of the connection information to obtain the second construction information, and generates the first authentication information according to the second construction information.

In addition to the foregoing first and second manners of generating the first authentication information, the second device may further use other manners of generating the first authentication information. For example, the second device truncates a character string of a preset second character quantity from the connection information as a fourth character string, and generates the first authentication information according to the fourth character string; or determines that the connection information is the first authentication information.

An implementation manner in which the second device generates the first authentication information according to the fourth character string includes the following manners:

Manner 1: Determine that the fourth character string is the first authentication information.

For example, assuming that the preset second character quantity is 4, the first device truncates a character string "1234" of the first four characters or a character string "5678" of the last four characters from the connection information "12345678" as the fourth character string, and uses the fourth character string as the first authentication information.

In the embodiment of the present disclosure, a sum of the preset first character quantity and the second character quantity may be equal to a quantity of characters included in the connection information. Correspondingly, the second device obtains a remaining character string after truncating the first character string of the preset first character quantity from the connection information, where a quantity of characters of the remaining character string is the preset second character quantity, and the remaining character string of the preset second character quantity may be used as the fourth character string. For example, the preset first character quantity is 6, and the preset second character quantity is 2. The second device obtains a remaining character string "78" of the preset second character quantity after truncating the first character string "123456" of the preset first character quantity from the connection information "12345678", and the first device may use the remaining character string "78" of the preset second character quantity as the fourth character string.

Manner 2: Use the fourth character string and a second preset character string to form the first authentication information.

For example, assuming that the fourth character string is "1234" and that the second preset character string is "9860", second authentication information formed by the fourth character string and the second preset character string is "12349860" or "98601234".

Manner 3: Perform a hash operation on the fourth character string to obtain a hash result, and truncate a character string of the preset second character quantity from the hash result as the first authentication information, or determine that the hash result is the first authentication information.

Manner 4: Generate the first authentication information according to the fourth character string and an authentication mode used by the second device.

Specifically, a quantity of characters in the authentication information is determined according to the authentication mode used by the second device; and information padding or information truncation is performed on the fourth character string according to the determined quantity of characters to obtain the second authentication information. For example, the fourth character string is "1234"; assuming that the second device uses a WPS authentication mode, it is determined, according to the WPS authentication mode, that the quantity of characters in the authentication information is eight digits; information "9988" is padded into the fourth character string "1234", and first authentication information "12349988" is obtained. For another example, assuming that the second device uses a 4-way handshake authentication mode, it is determined, according to the 4-way handshake authentication mode, that a quantity of bits in the authentication information is 256 bits, but the fourth character string "1234" includes 32 bits; therefore, 224 bits are padded into the fourth character string, and 256-bit first authentication information is obtained.

Alternatively, a quantity of characters in the authentication information is determined according to the authentication mode used by the second device; a hash operation is performed on the fourth character string to obtain a hash result; and information padding or information truncation is performed on the hash result according to the determined quantity of characters to obtain the second authentication information. For example, the fourth character string is "1234"; a hash operation is performed on the fourth character string "1234" to obtain a hash result "98765432111"; assuming that the second device uses a WPS authentication mode, it is determined, according to the WPS authentication mode, that the quantity of characters in the authentication information is eight digits; and eight digits "98765432" are truncated from the hash result and used as the first authentication information. For another example, assuming that the second device uses a 4-way handshake authentication mode, it is determined, according to the 4-way handshake authentication mode, that a quantity of bits in the authentication information is 256 bits, but the hash result "98765432111" includes 88 bits; therefore, 168 bits are padded into the hash result, and 256-bit first authentication information is obtained.

A person skilled in the art may understand that, as can be known from a conversion process of step 302 in which the first device generates the second information portion of the connection information according to the second authentication information, the second device performs corresponding reverse conversion on the obtained second information portion of the connection information, and may obtain the first authentication information that matches the second authentication information.

For example, when the first device obtains the second information portion of the connection information by performing inversion on the generated four-digit number, the second device may obtain the first authentication information by performing inversion again on the second information portion; when the first device encrypts the generated second authentication information of a preset character quantity by using the encryption key generated according to the application identifier of the first device, and uses the encryption result as the second information portion of the connection information, the second device decrypts the second information portion by using the application identifier, and may obtain the first authentication information.

Step 313: The first device verifies whether the first authentication information of the second device matches the second authentication information of the first device, and if the first authentication information matches the second authentication information, sends confirmation information to the second device, where the confirmation information is used by the second device to determine to establish the wireless connection to the first device.

An authentication mode used by the first device may be the 4-way handshake authentication mode in IEEE 802.11, the WPS authentication mode specified by the WFA (Wi-Fi Alliance), or another authentication mode. For each authentication mode, an authentication message format is specified. For example, for the 4-way handshake authentication mode, it is specified that an authentication message is key information formed by 256 bits, and for the WPS authentication mode, it is specified that an authentication message is eight digits.

When the 4-way handshake authentication mode is used, this step may be: The first device determines that the second authentication information is a PMK of the 4-way handshake authentication mode, and verifies, according to the PMK by using the 4-way handshake authentication mode, whether the first authentication information of the second device matches the second authentication information of the first device.

When the WPS authentication mode is used, this step may be: The first device determines that the second authentication information is a PIN of the WPS authentication mode, and verifies, according to the PIN by using the WPS authentication mode, whether the first authentication information of the second device matches the second authentication information of the first device.

In the process of verification by the first device, the second device performs verification with the first device, so that the first device determines whether the first authentication information of the second device matches the second authentication information of the first device. Specific implementation is: The second device uses the first authentication information as the PMK of the 4-way handshake authentication mode, and performs authentication with the first device according to the PMK by using the 4-way handshake authentication mode; or uses the first authentication information as the PIN of the WPS authentication mode, and performs authentication with the first device according to the PIN by using the WPS authentication mode.

In the process of verification, after receiving the confirmation information sent by the first device, the second device determines, according to the confirmation information, to establish the wireless connection to the first device, and then step 314 is performed.

The first device and the second device perform mutual authentication by using the first authentication information and the second authentication information. In this way, the first device and the second device establish a wireless connection to each other only after mutual authentication is successful, ensuring that the wireless connection established between the first device and the second device is a secure connection.

Step 314: The first device establishes a data connection to the second device, to implement establishment of a wireless connection to the second device.

The wireless connection established by the second device to the first device is an encrypted wireless connection, and the second device and the first device may transmit data by using the encrypted wireless connection. The wireless connection may be a Wi-Fi connection or a Bluetooth connection.

In the embodiment of the present disclosure, a first device generates connection information, and provides the connection information to a second device; the second device generates a first identifier according to the connection information, and sends a Probe request message carrying the first identifier to the first device; the first device determines whether a second identifier stored by the first device matches the first identifier sent by the second device, and if the first identifier matches the second identifier, establishes a wireless connection to the second device. The second device obtains, in a user input manner or another manner, the connection information generated by the first device, generates the first identifier according to the connection information, and determines, by using the first identifier, a device that needs to be connected to. Therefore, manually selecting the device that needs to be connected to by a user is avoided, efficiency of establishing a wireless connection is improved, and efficiency of data transmission is improved. The first device and the second device further perform mutual authentication by using first authentication information and second authentication information. Therefore, the established wireless connection is more secure, and security of data transmission is improved.

An embodiment of the present disclosure provides a method for establishing a wireless connection. In the embodiment of the present disclosure, both a first device and a second device are ordinary Wi-Fi P2P (peer to peer) devices, and both the second device and the first device detect nearby Wi-Fi P2P devices by broadcasting a Probe request message. When the second device and the first device discover each other, the first device and the second device perform GO negotiation. It is assumed that after the negotiation, the first device becomes a GO.

Then the first device generates connection information, and provides the connection information to the second device. The second device generates a first identifier according to the connection information, and the first device generates a second identifier according to the connection information. If the first identifier matches the second identifier, the first device establishes a wireless connection to the second device. Referring to FIG. 4-1, the method includes the following steps.

Step 401: The first device generates connection information.

The connection information may be a character string. Content of the connection information may be numerals, letters, or other characters, or may be any combination of multiple characters of numerals, letters, and other characters. The first device may generate a character string randomly, and use the generated character string as the connection information.

In the embodiment of the present disclosure, the first device may generate connection information when triggered by a first user corresponding to the first device. Specifically, the following two trigger manners exist and include:

Manner 1: The first device generates connection information when detecting a connection command that is triggered by clicking a connection interface in a UI of a system application by the first user.

A connection interface is set in the UI of the system application requiring data transmission. When the first user needs to transmit data, the first user may click the connection interface, so that the connection interface triggers a connection command. The system application may be an image shooting application that has an image sharing function or a video shooting application that has a video sharing function.

For example, referring to a UI of a system application shown in FIG. 2-2, the system application is an image shooting application. The image shooting application shoots an image and displays the image in the UI. On an upper side of the UI, a connection interface exists, and when the first user clicks the connection interface, the connection interface triggers a connection command. When the first device detects the connection command triggered by the connection interface, connection information is generated randomly. It is assumed that the generated connection information is "12345678", as shown in FIG. 2-3.

Manner 2: The first device generates connection information when detecting a connection command that is triggered by clicking a connection interface in a UI of a third-party application by the first user, where the third-party application is an application for establishing a wireless connection.

A third-party application that is used for establishing a wireless connection is installed on the first device, and a UI of the third-party application includes a connection interface. When the first user needs to transmit data, the first user may click the connection interface, so that the connection interface triggers a connection command.

For example, referring to a UI of a third-party application shown in FIG. 2-4, a connection interface exists in the UI; the first user clicks the connection interface, and the connection interface triggers a connection command. When the first device detects the connection command triggered by the connection interface, connection information is generated randomly. It is assumed that the generated connection information is "12345678", as shown in FIG. 2-5.

Step 402: The first device provides the connection information to the second device.

Specifically, this step may include the following first to fourth implementation manners, which are respectively:

Manner 1: The first device displays the connection information.

A second user corresponding to the second device may view the connection information displayed by the first device, and input the connection information to the second device.

Manner 2: The first device plays the connection information by using a sound box.

The second user may listen to the connection information played by the first device, and input the connection information to the second device.

Manner 3: The first device generates, according to the connection information, a graphic code including the connection information, and displays the graphic code.

The graphic code may be a one-dimensional code or a two-dimensional code. The first device may code the connection information by using a coding algorithm that is used for generating a graphic code, so as to generate the graphic code including the connection information, for example, generate a QR Code two-dimensional code.

The second device has a scanning module, where the scanning module may be a camera, a scanner, or the like. After the first device displays the graphic code, the second device may scan, by using the scanning module included in the second device, the graphic code displayed by the first device, and obtain the connection information.

Manner 4: The first device establishes a short-range communications connection to the second device, and sends the connection information to the second device by using the short-range communications connection.

The first device may establish the short-range communications connection to the second device in an out-of-band communications mode. The out-of-band communications mode may be a communications mode like acoustic wave, infrared, NFC, or HotKnot.

In this embodiment, the first device generates a piece of connection information; the user may input the connection information to the second device, or scan, by using the second device, a graphic code including the connection information on the first device, or make the second device close to the first device so that the second device obtains the connection information in a short-range communications mode. In comparison with finding an identifier of the second device from a large quantity of device search results by the user, this step may save both time for performing a device search by the first device and time for searching for the identifier of the second device by the user, and therefore may reduce time for establishing a wireless connection.

Step 403: The second device obtains the connection information provided by the first device.

Specifically, the second device may obtain the connection information in any one of the following first, second, and third manners.

Manner 1: The second device receives the connection information input by the second user.

After generating the connection information, the first device displays the connection information or plays the connection information by using a sound box. The second user may view or listen to the connection information, and then input the connection information to the second device.

The second device may obtain, in the following two manners (1) and (2), the connection information input by the second user, including:

(1) The second device obtains, from a UI of a system application, the connection information input by the second user.

The UI of the system application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the first device displays the connection information "12345678" or plays the connection information "12345678" by using a sound box, and the second user views the connection information "12345678" or listens to the connection information "12345678". Then, the second user clicks the receiving interface in the UI of the system application shown in FIG. 2-6, and the receiving interface triggers a receiving command. The second device displays an input box in the UI when detecting the receiving command triggered by the receiving interface. As shown in FIG. 2-7, the second user inputs the connection information "12345678" in the input box. Then the second device reads, from the input box, the connection information "12345678" input by the second user.

(2) The second device obtains, from a UI of a third-party application, the connection information input by the second user.

The UI of the third-party application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the second user clicks the receiving interface in the UI of the third-party application shown in FIG. 2-4, and the receiving interface triggers a receiving command. The second device displays an input box in the UI when detecting the receiving command triggered by the receiving interface. As shown in FIG. 2-8, the second user inputs the connection information "12345678" in the input box. Then the second device reads, from the input box, the connection information "12345678" input by the second user.

Manner 2: The second device scans the graphic code displayed by the first device, and obtains the connection information included in the graphic code.

The second user may enable the scanning module of the second device, and then the second device scans, by using the scanning module, the graphic code displayed by the first device, parses the scanned graphic code, and obtains the connection information included in the scanned graphic code.

Manner 3: The second device establishes a short-range communications connection to the first device, and receives, by using the short-range communications connection, the connection information sent by the first device.

Step 404: The second device generates a first identifier through calculation according to a first information portion included in the connection information.

Specifically, this step may be implemented in either of the following two manners:

Manner 1: The second device performs a hash operation on the first information portion of the connection information to obtain a first hash result, and generates the first identifier according to the first hash result.

An information portion may be truncated from the first hash result and used as the first identifier, or preset information is added to a truncated information portion to form the first identifier, or the first hash result is used as the first identifier, or the like.

Manner 2: The second device adds first preset information to the first information portion of the connection information to obtain first construction information, and generates the first identifier according to the first construction information.

Reverse displacement processing or shift processing may be performed on the first construction information to generate the first identifier. For example, assuming that the first information portion of the connection information "12345678" is "1234" and that the first preset information is "hua", the first construction information obtained by the second device by adding the first preset information "hua" to the first information portion "1234" of the connection information may be "1234hua", "hua1234", "12hua34", or the like.

Assuming that the constructed first construction information is "1234hua", the first identifier obtained by performing reverse displacement processing on the first construction information is "auh4321"; or a shift amount is preset, where the shift amount may be two, three, or the like, and then two-position shift processing, three-position shift processing, or the like is performed on the first construction information. For example, when two-position shift processing is performed on the first construction information, the obtained first identifier is "ua1234h", and when three-position shift processing is performed on the first construction information, the obtained first identifier is "hua1234".

In addition to the foregoing first and second manners, the second device may further use other manners of generating the first identifier, for example, may truncate a character string of a preset first character quantity from the connection information as a first character string, and generate the first identifier according to the first character string; or perform a hash operation on the whole connection information to obtain the first identifier.

An implementation manner in which the second device generates the first identifier according to the first character string includes the following manners (1) to (4):

(1) Determine that the first character string is the first identifier.

For example, the preset first character quantity is 6, and the second device truncates a character string "123456" of the first six characters or a character string "345678" of the last six characters from the connection information "12345678" as the first character string, and determines that the first character string "123456" or "345678" is the first identifier.

(2) Use the first character string and a first preset character string to form the first identifier.

For example, if the first character string is "123456", and the first preset character string is "Huawei", the first identifier formed by the first character string and the first preset character string is "123456Huawei" or "Huawei123456".

(3) Perform a hash operation on the first character string to obtain a hash result, and truncate a character string of the preset first character quantity from the hash result as the first identifier.

(4) Perform a hash operation on the first character string to obtain a hash result, truncate a character string of the preset first character quantity from the hash result, and use the truncated character string and the first preset character string to form the first identifier.

Step 405: The second device sends a Probe request message, where a reserved field in the Probe request message carries the first identifier.

An identity of the second device is set as a Wi-Fi P2P device, and the second device sends the Probe request message, to request to establish a wireless connection to a Wi-Fi P2P device receiving the Probe request message. The second device may broadcast the Probe request message, or after receiving a Probe Request message broadcast by the first device, the second device may obtain an address of the first device from the Probe Request message, and unicast the Probe request message to the first device according to the address of the first device.

Referring to a structure of a Probe request message shown in FIG. 4-2, the Probe request message includes parts such as a MAC header, a frame body, and an FCS. The MAC header includes fields such as Addr_1 and Addr_2, where Addr_1 is a receiver address, and Addr_2 is a sender address. The frame body includes fields such as an SSID field and a reserved Vendor specific field, where the SSID field is used to carry an identifier. The FCS is a check field and is used to carry a check code. In the embodiment of the present disclosure, the second device uses the first identifier as the identifier of the GO. When the second device broadcasts the Probe request message, the Addr_1 field in the Probe request message is null; when the second device unicasts the Probe request message to the first device, the Addr_1 field in the Probe request message carries a MAC address of the first device; in the two cases, the Addr_2 field in the Probe request message carries a MAC address of the second device, and the reserved field carries the first identifier, but the SSID field is null. In addition, in the P2P protocol, a P2P IE (information element) is defined to carry content related to a P2P connection, where the P2P IE may carry multiple Attributes. The Attribute part includes a reserved field, which may be used to carry a customized message.

Step 406: The first device receives the Probe request message, where the reserved field in the Probe request message carries the first identifier.

For example, the second device sends a Probe request message, where a reserved field in the Probe request message carries a first identifier "123456", and the first device receives the Probe request message.

Step 407: The first device generates a second identifier according to the first information portion of the connection information, where the first device uses the second identifier as its own identifier.

Specifically, the first device may generate the second identifier through calculation in the following first and second manners, including:

Manner 1: The first device performs a hash operation on the first information portion of the connection information to obtain a first hash result, and generates the second identifier according to the first hash result.

This implementation manner is the same as the first manner of generating the first identifier by the second device. For a detailed process, reference may be made to the first manner of generating the first identifier by the second device, and details are not further described herein.

Manner 2: The first device adds second preset information to a second information portion of the connection information to obtain second construction information, and generates the second identifier according to the second construction information.

This implementation manner is the same as the second manner of generating the first identifier by the second device. For a detailed process, reference may be made to the second manner of generating the first identifier by the second device, and details are not further described herein.

The first preset information is added to the first information portion of the connection information to obtain the first construction information, and the second identifier of the first device is obtained according to the first construction information.

In addition to the foregoing first and second manners, the first device may further use other manners of generating the second identifier, for example, may truncate a character string of the preset first character quantity from the connection information as a second character string, and generate the second identifier according to the second character string; or perform a hash operation on the whole connection information to obtain the second identifier.

It should be noted that, the first device may also generate the second identifier according to this step after generating the connection information and before receiving the Probe request message.

An implementation manner in which the first device generates the second identifier according to the second character string may include the following manners (1) to (4):

(1) Determine that the second character string is the second identifier.

For example, the preset first character quantity is 6, and the first device truncates a character string "123456" of the first six characters or a character string "345678" of the last six characters from the connection information "12345678" as the second character string, and determines that the second character string "123456" or "345678" is the second identifier.

(2) Use the second character string and the first preset character string to form the second identifier.

For example, assuming that the second character string is "123456" and that the first preset character string is "Huawei", the second identifier formed by the second character string and the first preset character string is "123456Huawei" or "Huawei123456".

(3) Perform a hash operation on the second character string to obtain a hash result, and truncate a character string of the preset first character quantity from the hash result as the second identifier.

(4) Perform a hash operation on the second character string to obtain a hash result, truncate a character string of the preset first character quantity from the hash result, and use the truncated character string and the preset character string to form the second identifier.

Step 408: The first device determines whether the first identifier matches the second identifier, and if the first identifier matches the second identifier, performs step 409.

That the first identifier matches the second identifier means that the first identifier is equal to the second identifier or that the first identifier corresponds to the second identifier.

An identifier relationship table may be preset on the first device, where the identifier relationship table is used to store any two identifiers having a correspondence.

Correspondingly, the first device may determine, in the following manner, whether the first identifier corresponds to the second identifier, including: the first device may search out a corresponding identifier from the identifier relationship table according to the first identifier; if the identifier that is searched out is equal to the second identifier, determine that the first identifier corresponds to the second identifier; otherwise, determine that the first identifier does not correspond to the second identifier.

The second device obtains, in a user input manner or another manner, the connection information generated by the first device, generates the first identifier according to the connection information, and determines, by using the first identifier, a device that needs to be connected to. Therefore, manually selecting the device that needs to be connected to by the user is avoided, and efficiency of establishing a wireless connection is improved.

Step 409: The first device sends a Probe response message to the second device, where the Probe response message is used by the second device to determine to establish a wireless connection to the first device.

The second device sends a Probe request message, to request to establish a wireless connection to another P2P device, where a first identifier of the P2P device is carried in a reserved field in the Probe request message. Therefore, in this step, when the first device determines that the first identifier matches the second identifier, the first device may know that the second device requests to establish a wireless connection to the first device, therefore determine that a wireless connection needs to be established to the second device, and send the Probe response message to the second device, so as to notify the second device that the first device agrees to establish a wireless connection to the second device.

For example, it is assumed that the reserved field in the Probe request message sent by the second device carries the first identifier "123456". The first device receives the Probe request message, and the generated second identifier is "123456". The first identifier "123456" is the same as the second identifier "123456", and therefore, the first identifier matches the second identifier. The first device determines that a wireless connection needs to be established to the second device, and sends a Probe response message to the second device.

Step 410: The second device receives the Probe response message, determines, according to the Probe response message, to establish a wireless connection to the first device, and performs step 411.

Step 411: The second device generates first authentication information according to a second information portion of the connection information.

Content of the first information portion of the connection information may be the same as or different from content of the second information portion. For example, if the connection information is "12345678", the first information portion may be "1234", and the second information portion may be "5678"; or the first information portion may be "123456", and the second information portion may be "345678"; or the like.

Specifically, this step may be implemented in either of the following two manners:

Manner 1: The second device performs a hash operation on the second information portion of the connection information to obtain a second hash result, and generates the first authentication information according to the second hash result.

For example, hash of an SHA-256 hash algorithm is performed on the second information portion "5678" of the connection information "12345678" to obtain a second hash result "6BAA0BD18BCC1E5237B70DC 18595A7DEFF11CD27120CDC96A678003F8B162941", and processing such as truncation or supplementation is performed on the second hash result according to an authentication mode used by the second device, to obtain first authentication information of a character quantity required by the authentication mode.

The authentication mode used by the second device may include a 4-way handshake authentication mode, a WPS authentication mode, or another authentication mode. For each authentication mode, an authentication message format is specified. For example, for the 4-way handshake authentication mode, it is specified that an authentication message is key information formed by 256 bits, and for the WPS authentication mode, it is specified that an authentication message is eight digits.

For example, when the second device uses the 4-way handshake authentication, the second hash result includes 32 characters, exactly 256 bits, and therefore, the second hash result is used as the first authentication information. When the second device uses the WPS authentication, last eight characters "8F162941" are truncated, and "F" is mapped to a numeral "6" to obtain "86162941" as the first authentication information.

Manner 2: The second device adds the second preset information to the second information portion of the connection information to obtain the second construction information, and generates the first authentication information according to the second construction information.

For example, when using the 4-way handshake authentication, the second device converts the second information portion "5678" of the connection information "12345678" into binary "1011000101110", and then adds 243 bits of "0" to a left side of "1011000101110" to obtain 256-bit first authentication information, or adds 243 bits of "1" to a right side of "1011000101110" to obtain 256-bit first authentication information.

When using the WPS authentication, the second device adds four characters "8888" or "0000" to a left side or a right side of the second information portion "5678" of the connection information "12345678" to obtain eight digits as the first authentication information.

It should be noted that, when a character quantity of the second information portion meets a character quantity of authentication information required by the authentication mode used by the second device, the second information portion may also be directly used as the first authentication information.

In addition to the foregoing first and second manners of generating the first authentication information, the second device may further use other manners of generating the first authentication information. For example, the second device truncates a character string of a preset second character quantity from the connection information as a fourth character string, and generates the first authentication information according to the fourth character string; or determines that the connection information is the first authentication information.

An implementation manner in which the second device generates the first authentication information according to the fourth character string includes the following manners:

Manner 1: Determine that the fourth character string is the first authentication information.

For example, assuming that the preset second character quantity is 4, the first device truncates a character string "1234" of the first four characters or a character string "5678" of the last four characters from the connection information "12345678" as the fourth character string, and uses the fourth character string as the first authentication information.

In the embodiment of the present disclosure, a sum of the preset first character quantity and the second character quantity may be equal to a quantity of characters included in the connection information. Correspondingly, the second device obtains a remaining character string after truncating the first character string of the preset first character quantity from the connection information, where a quantity of characters of the remaining character string is the preset second character quantity, and the remaining character string of the preset second character quantity may be used as the fourth character string. For example, the preset first character quantity is 6, and the preset second character quantity is 2. The second device obtains a remaining character string "78" of the preset second character quantity after truncating the first character string "123456" of the preset first character quantity from the connection information "12345678", and the first device may use the remaining character string "78" of the preset second character quantity as the fourth character string.

Manner 2: Use the fourth character string and a second preset character string to form the first authentication information.

For example, assuming that the fourth character string is "1234" and that the second preset character string is "9860", second authentication information formed by the fourth character string and the second preset character string is "12349860" or "98601234".

Manner 3: Perform a hash operation on the fourth character string to obtain a hash result, and truncate a character string of the preset second character quantity from the hash result as the second authentication information, or determine that the hash result is the first authentication information.

Manner 4: Generate the first authentication information according to the fourth character string and the authentication mode used by the second device.

Specifically, a quantity of characters in the authentication information is determined according to the authentication mode used by the second device; and information padding or information truncation is performed on the fourth character string according to the determined quantity of characters to obtain the second authentication information. For example, the fourth character string is "1234"; assuming that the second device uses the WPS authentication mode, it is determined, according to the WPS authentication mode, that the quantity of characters in the authentication information is eight digits; information "9988" is padded into the fourth character string "1234", and first authentication information "12349988" is obtained. For another example, assuming that the second device uses the 4-way handshake authentication mode, it is determined, according to the 4-way handshake authentication mode, that a quantity of bits in the authentication information is 256 bits, but the fourth character string "1234" includes 32 bits; therefore, 224 bits are padded into the fourth character string, and 256-bit first authentication information is obtained.

Alternatively, a quantity of characters in the authentication information is determined according to the authentication mode used by the second device; a hash operation is performed on the fourth character string to obtain a hash result; and information padding or information truncation is performed on the hash result according to the determined quantity of characters to obtain the second authentication information. For example, the fourth character string is "1234"; a hash operation is performed on the fourth character string "1234" to obtain a hash result "98765432111"; assuming that the second device uses the WPS authentication mode, it is determined, according to the WPS authentication mode, that the quantity of characters in the authentication information is eight digits; and eight digits "98765432" are truncated from the hash result and used as the first authentication information. For another example, assuming that the second device uses the 4-way handshake authentication mode, it is determined, according to the 4-way handshake authentication mode, that a quantity of bits in the authentication information is 256 bits, but the hash result "98765432111" includes 88 bits; therefore, 168 bits are padded into the hash result, and 256-bit first authentication information is obtained.

Step 412: The first device generates second authentication information according to the second information portion of the connection information.

Specifically, this step may be implemented in the following first and second manners, including:

Manner 1: The first device performs a hash operation on the second information portion of the connection information to obtain a second hash result, and generates the second authentication information according to the second hash result.

A process of this implementation manner is the same as the process of the first manner of generating the first authentication information by the second device, and details are not further described herein.

Manner 2: The first device adds the second preset information to the second information portion of the connection information to obtain the second construction information, and generates the second authentication information according to the second construction information.

A process of this implementation manner is the same as the process of the second manner of generating the first authentication information by the second device, and details are not further described herein.

In addition to the foregoing first and second manners of generating the second authentication information, the first device may further use other manners of generating the second authentication information. For example, the first device truncates a character string of the preset second character quantity from the connection information as a third character string, and generates the second authentication information according to the third character string; or determines that the whole connection information is the second authentication information.

A manner in which the first device generates the second authentication information according to the third character string includes the following manners:

Manner 1: Determine that the third character string is the second authentication information.

For example, assuming that the preset second character quantity is 4, the first device truncates a character string "1234" of the first four characters or a character string "5678" of the last four characters from the connection information "12345678" as the third character string, and uses the third character string as the second authentication information.

In the embodiment of the present disclosure, the sum of the preset first character quantity and the second character quantity may be equal to the quantity of characters included in the connection information. Correspondingly, the first device obtains a remaining character string after truncating the second character string of the preset first character quantity from the connection information, where a quantity of characters of the remaining character string is the preset second character quantity, and the remaining character string of the preset second character quantity may be used as the third character string. For example, the preset first character quantity is 6, and the preset second character quantity is 2. The first device obtains a remaining character string "78" of the preset second character quantity after truncating the second character string "123456" of the preset first character quantity from the connection information "12345678", and the first device may use the remaining character string "78" of the preset second character quantity as the third character string.

Manner 2: Use the third character string and the second preset character string to form the second authentication information.

For example, assuming that the third character string is "1234" and that the second preset character string is "9860", the first authentication information formed by the third character string and the second preset character string is "12349860" or "98601234".

Manner 3: Perform a hash operation on the third character string to obtain a hash result, and truncate a character string of the preset second character quantity from the hash result as the first authentication information, or determine that the hash result is the second authentication information.

Manner 4: Generate the second authentication information according to the third character string and an authentication mode used by the first device.

Step 413: The first device verifies whether the first authentication information of the second device matches the second authentication information of the first device, and if the first authentication information matches the second authentication information, sends confirmation information to the second device, where the confirmation information is used by the second device to determine to establish the wireless connection to the first device.

When the first device uses the 4-way handshake authentication mode, this step may be: The first device determines that the second authentication information is a PMK of the 4-way handshake authentication mode, and verifies, according to the PMK by using the 4-way handshake authentication mode, whether the first authentication information of the second device matches the second authentication information of the first device.

When the first device uses the WPS authentication mode, this step may be: The first device determines that the second authentication information is a PIN of the WPS authentication mode, and verifies, according to the PIN by using the WPS authentication mode, whether the first authentication information of the second device matches the second authentication information of the first device.

In the process of verification by the first device, the second device performs verification with the first device, so that the first device determines whether the first authentication information of the second device matches the second authentication information of the first device. Specific implementation is: The second device uses the first authentication information as the PMK of the 4-way handshake authentication mode, and performs authentication with the first device according to the PMK by using the 4-way handshake authentication mode; or uses the first authentication information as the PIN of the WPS authentication mode, and performs authentication with the first device according to the PIN by using the WPS authentication mode.

In the process of verification, after receiving the confirmation information sent by the first device, the second device determines, according to the confirmation information, to establish the wireless connection to the first device, and then step 414 is performed.

Step 414: The first device establishes a data connection to the second device, to implement establishment of a wireless connection to the second device.

The wireless connection established by the second device to the first device is an encrypted wireless connection, and the second device and the first device may transmit data by using the encrypted wireless connection. The wireless connection may be a Wi-Fi connection or a Bluetooth connection.

In the embodiment of the present disclosure, a first device generates connection information, and provides the connection information to a second device; the second device generates a first identifier according to the connection information, and sends a Probe request message carrying the first identifier to the first device; the first device generates a second identifier according to the connection information, and if the first identifier matches the second identifier, establishes a wireless connection to the second device. The second device obtains, in a user input manner or another manner, the connection information generated by the first device, generates the first identifier according to the connection information, and determines, by using the first identifier, a device that needs to be connected to. Therefore, manually selecting the device that needs to be connected to by a user is avoided, efficiency of establishing a wireless connection is improved, and efficiency of data transmission is improved. The first device and the second device further perform mutual authentication by using first authentication information and second authentication information. Therefore, the established wireless connection is more secure, and security of data transmission is improved.

An embodiment of the present disclosure provides a method for establishing a wireless connection. In the embodiment of the present disclosure, both a first device and a second device are ordinary Wi-Fi P2P devices, and both the first device and the second device probe nearby Wi-Fi P2P devices by broadcasting a Probe request message. When the first device and the second device discover each other, the first device and the second device perform GO negotiation. It is assumed that after the negotiation, the first device becomes a GO.

Figures 2, 3, 4, 5:
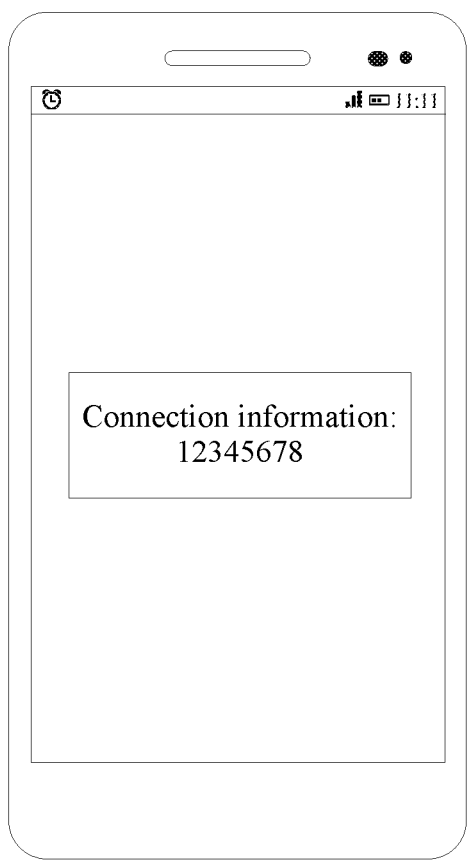

Then the first device generates connection information, and provides the connection information to the second device. The second device generates a first identifier according to the connection information, adds the first identifier to a reserved field in a Probe Request message, and then sends the Probe Request message to the first device. The first device determines whether a second identifier stored by the first device matches the first identifier, and if the first identifier matches the second identifier, establishes a wireless connection to the second device. Referring to FIG. 5, the method includes the following steps.

Step 501: The first device generates a first information portion of connection information according to a second identifier.

Before this step is performed, a person skilled in the art may set the second identifier on the first device, or the first device generates the second identifier and stores the generated second identifier.

For example, a generation rule for the second identifier may be set manually, and the first device generates the second identifier according to the generation rule; or an identifier resource library for the second identifier may be set, and the first device randomly selects an identifier from the resource library as the second identifier; or the second identifier may be set manually.

The first device may generate the second identifier in the following manner, including: the first device generates the connection information, adds first preset information to the first information portion of the connection information to obtain first construction information, generates the second identifier according to the first construction information, and may perform reverse displacement or shift processing on the first construction information to obtain the second identifier.

Assuming that the generated connection information is "12345678", that the first information portion of the connection information is "1234", and that the first preset information is "hua", the first construction information obtained by the first device by adding the first preset information "hua" to the first information portion "1234" of the connection information may be "1234hua", "hua1234", "12hua34", or the like. Assuming that the constructed first construction information is "1234hua", the first identifier obtained by performing reverse displacement processing on the first construction information is "auh4321"; or a shift amount is preset, where the shift amount may be two, three, or the like, and then two-position shift processing, three-position shift processing, or the like is performed on the first construction information. For example, when two-position shift processing is performed on the first construction information, the obtained first identifier is "ua1234h", and when three-position shift processing is performed on the first construction information, the obtained first identifier is "hua1234".

This step may be: The first device performs truncation on the second identifier to obtain an information portion, and determines that the truncated information portion is the first information portion of the connection information; or performs first operation processing on the second identifier to obtain the first information portion of the connection information, where the first operation processing is an operation inverse to that of generating the second identifier.

That the first device generates a first information portion of connection information according to a second identifier may be:

1. Perform reversible calculation on the second identifier to obtain the first information portion of the connection information. For example, for the second identifier.

The first operation processing may be performed on the second identifier according to the following two steps (1) and (2) to obtain the first information portion of the connection information, including:

(1) Generate the first construction information according to the second identifier.

Forward displacement processing may be performed on the second identifier to obtain the first construction information, or reverse shifting may be performed on the second identifier to obtain the first construction information. For example, assuming that the first identifier is "auh4321", forward displacement processing is performed on the first identifier "auh4321" to obtain the first construction information "1234hua"; or assuming that the first identifier is "ua1234h", reverse two-position shifting is performed on the first identifier "ua1234h" to obtain the first construction information "1234hua"; or assuming that the first identifier is "hua1234", reverse three-position shifting is performed on the first identifier "hua1234" to obtain the first construction information "1234hua".

(2) Remove the first preset information from the first construction information to obtain the first information portion of the connection information.

For example, the first preset information is "hua", and after the first preset information "hua" is removed from the first construction information "1234hua", the first information portion "1234" of the connection information is obtained.

Step 502: The first device generates a second information portion of the connection information according to second authentication information.

Before this step is performed, a person skilled in the art may set the second authentication information on the first device, or the first device generates the second authentication information and stores the generated second authentication information.

The first device may generate the second authentication information in the following manner, including: the first device generates the connection information, adds second preset information to the second information portion of the connection information to obtain second construction information, generates the second authentication information according to the second construction information, and may perform reverse displacement or shift processing on the second construction information to obtain the second authentication information.

Assuming that the generated connection information is "12345678", that the first information portion of the connection information is "5678", and that the second preset information is "wei", the second construction information obtained by the first device by adding the second preset information "wei" to the second information portion "5678" of the connection information may be "5678wei", "wei5678", "56wei78", or the like. Assuming that the constructed second construction information is "5678wei", the second authentication information obtained by performing reverse displacement processing on the second construction information is "iew5678"; or a shift amount is preset, where the shift amount may be two, three, or the like, and then two-position shift processing, three-position shift processing, or the like is performed on the second construction information. For example, when two-position shift processing is performed on the second construction information, the obtained second authentication information is "ei5678w", and when three-position shift processing is performed on the second construction information, the obtained second authentication information is "wei5678".

This step may be: The first device performs truncation on the second authentication information to obtain an information portion, and determines that the truncated information portion is the second information portion of the connection information; or performs second operation processing on the second authentication information to obtain the second information portion of the connection information, where the second operation processing is an operation inverse to that of generating the second authentication information.

The second operation processing may be performed on the second authentication information according to the following two steps (1) and (2) to obtain the second information portion of the connection information, including:

(1) Generate the second construction information according to the second authentication information.

Forward displacement processing may be performed on the second authentication information to obtain the second construction information, or reverse shifting may be performed on the second authentication information to obtain the second construction information. For example, assuming that the second authentication information is "iew4321", forward displacement processing is performed on the second authentication information "iew4321" to obtain the second construction information "5678wei"; or assuming that the second authentication information is "ei5678w", reverse two-position shifting is performed on the second authentication information "ei5678w" to obtain the second construction information "5678wei"; or assuming that the second authentication information is "wei5678", reverse three-position shifting is performed on the second authentication information "wei5678" to obtain the second construction information "5678wei".

(2) Remove the second preset information from the second construction information to obtain the second information portion of the connection information.

For example, the second preset information is "wei", and after the second preset information "wei" is removed from the second construction information "5678wei", the second information portion "5678" of the connection information is obtained.

Step 503: The first device constructs the connection information according to the first information portion and the second information portion.

The first information portion and the second information portion are spliced to obtain the connection information. For example, the first information portion "1234" and the second information portion "5678" are spliced to obtain "12345678" as the connection information.

In the embodiment of the present disclosure, the first device may generate connection information according to the foregoing steps 501 to 503 when triggered by a first user corresponding to the first device. Specifically, the following two trigger manners exist and include:

Manner 1: The first device performs the foregoing steps 501 to 503 when detecting a connection command that is triggered by clicking a connection interface in a UI of a system application by the first user.

A connection interface is set in the UI of the system application requiring data transmission. When the first user needs to transmit data, the first user may click the connection interface, so that the connection interface triggers a connection command. The system application may be an image shooting application that has an image sharing function or a video shooting application that has a video sharing function.

For example, referring to a UI of a system application shown in FIG. 2-2, the system application is an image shooting application. The image shooting application shoots an image and displays the image in the UI. On an upper side of the UI, a connection interface exists, and when the first user clicks the connection interface, the connection interface triggers a connection command. When the first device detects the connection command triggered by the connection interface, the first device performs the foregoing steps 501 to 503 to generate connection information. It is assumed that the generated connection information is "12345678", as shown in FIG. 2-3.

Manner 2: The first device performs the foregoing steps 501 to 503 to generate connection information when detecting a connection command that is triggered by clicking a connection interface in a UI of a third-party application by the first user, where the third-party application is an application for establishing a wireless connection.

A third-party application that is used for establishing a wireless connection is installed on the first device, and a UI of the third-party application includes a connection interface. When the first user needs to transmit data, the first user may click the connection interface, so that the connection interface triggers a connection command.

For example, referring to a UI of a third-party application shown in FIG. 2-4, a connection interface exists in the UI; the first user clicks the connection interface, and the connection interface triggers a connection command. When the first device detects the connection command triggered by the connection interface, the first device performs the foregoing steps 301 to 303 to generate connection information. It is assumed that the generated connection information is "12345678", as shown in FIG. 2-5.

Step 504: The first device provides the connection information to the second device.

Specifically, this step may include the following first to fourth implementation manners, which are respectively:

Manner 1: The first device displays the connection information.

A second user corresponding to the second device may view the connection information displayed by the first device, and input the connection information to the second device.

Manner 2: The first device plays the connection information by using a sound box.

The second user may listen to the connection information played by the first device, and input the connection information to the second device.

Manner 3: The first device generates, according to the connection information, a graphic code including the connection information, and displays the graphic code.

The graphic code may be a one-dimensional code or a two-dimensional code. The first device may code the connection information by using a coding algorithm that is used for generating a graphic code, so as to generate the graphic code including the connection information.

The second device has a scanning module, where the scanning module may be a camera, a scanner, or the like. After the first device displays the graphic code, the second device may scan, by using the scanning module included in the second device, the graphic code displayed by the first device, and obtain the connection information.

Manner 4: The first device establishes a short-range communications connection to the second device, and sends the connection information to the second device by using the short-range communications connection.

The first device may establish the short-range communications connection to the second device in an out-of-band communications mode. The out-of-band communications mode may be a communications mode like acoustic wave, infrared, NFC, or HotKnot.

In this embodiment, the first device generates a piece of connection information; the user may input the connection information to the second device, or scan, by using the second device, a graphic code including the connection information on the first device, or make the second device close to the first device so that the second device obtains the connection information in a short-range communications mode. In comparison with finding an identifier of the second device from a large quantity of device search results by the user, this step may save both time for performing a device search by the first device and time for searching for the identifier of the second device by the user, and therefore may reduce time for establishing a wireless connection.

Step 505: The second device obtains the connection information provided by the first device.

Specifically, the second device may obtain the connection information in any one of the following first, second, and third manners.

Manner 1: The second device receives the connection information input by the second user.

After generating the connection information, the first device displays the connection information or plays the connection information by using a sound box. The second user may view or listen to the connection information, and then input the connection information to the second device.

The second device may obtain, in the following two manners (1) and (2), the connection information input by the second user, including:

(1) The second device obtains, from a UI of a system application, the connection information input by the second user.

The UI of the system application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the first device displays the connection information "12345678" or plays the connection information "12345678" by using a sound box, and the second user views the connection information "12345678" or listens to the connection information "12345678". Then, the second user clicks the receiving interface in the UI of the system application shown in FIG. 2-6, and the receiving interface triggers a receiving command. The second device displays an input box in the UI when detecting the receiving command triggered by the receiving interface. As shown in FIG. 2-7, the second user inputs the connection information "12345678" in the input box. Then the second device reads, from the input box, the connection information "12345678" input by the second user.

(2) The second device obtains, from a UI of a third-party application, the connection information input by the second user.

The UI of the third-party application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the second user clicks the receiving interface in the UI of the third-party application shown in FIG. 2-4, and the receiving interface triggers a receiving command. The second device displays an input box in the UI when detecting the receiving command triggered by the receiving interface. As shown in FIG. 2-8, the second user inputs the connection information "12345678" in the input box. Then the second device reads, from the input box, the connection information "12345678" input by the second user.

Manner 2: The second device scans the graphic code displayed by the first device, and obtains the connection information included in the graphic code.

The second user may enable the scanning module of the second device, and then the second device scans, by using the scanning module, the graphic code displayed by the first device, parses the scanned graphic code, and obtains the connection information included in the scanned graphic code.

Manner 3: The second device establishes a short-range communications connection to the first device, and receives, by using the short-range communications connection, the connection information sent by the first device.

Step 506: The second device generates a first identifier through calculation according to the first information portion included in the connection information.

Specifically, this step may be implemented in either of the following two manners:

Manner 1: The second device performs a hash operation on the first information portion of the connection information to obtain a first hash result, and generates the first identifier according to the first hash result.

An information portion may be truncated from the first hash result and used as the first identifier, or preset information is added to a truncated information portion to form the first identifier, or the first hash result is used as the first identifier, or the like.

Manner 2: The second device adds the first preset information to the first information portion of the connection information to obtain the first construction information, and generates the first identifier according to the first construction information.

Reverse displacement processing or shift processing may be performed on the first construction information to generate the first identifier. For example, assuming that the first information portion of the connection information "12345678" is "1234" and that the first preset information is "hua", the first construction information obtained by the second device by adding the first preset information "hua" to the first information portion "1234" of the connection information may be "1234hua", "hua1234", "12hua34", or the like.

Assuming that the constructed first construction information is "1234hua", the first identifier obtained by performing reverse displacement processing on the first construction information is "auh4321"; or a shift amount is preset, where the shift amount may be two, three, or the like, and then two-position shift processing, three-position shift processing, or the like is performed on the first construction information. For example, when two-position shift processing is performed on the first construction information, the obtained first identifier is "ua1234h", and when three-position shift processing is performed on the first construction information, the obtained first identifier is "hua1234".

In addition to the foregoing first and second manners, the second device may further use other manners of generating the first identifier, for example, may truncate a character string of a preset first character quantity from the connection information as a first character string, and generate the first identifier according to the first character string; or perform a hash operation on the whole connection information to obtain the first identifier.

An implementation manner in which the second device generates the first identifier according to the first character string includes the following manners (1) to (4):

(1) Determine that the first character string is the first identifier.

For example, the preset first character quantity is 6, and the second device truncates a character string "123456" of the first six characters or a character string "345678" of the last six characters from the connection information "12345678" as the first character string, and determines that the first character string "123456" or "345678" is the first identifier.

(2) Use the first character string and a first preset character string to form the first identifier.

For example, if the first character string is "123456", and the first preset character string is "Huawei", the first identifier formed by the first character string and the first preset character string is "123456Huawei" or "Huawei123456".

(3) Perform a hash operation on the first character string to obtain a hash result, and truncate a character string of the preset first character quantity from the hash result as the first identifier.

(4) Perform a hash operation on the first character string to obtain a hash result, truncate a character string of the preset first character quantity from the hash result, and use the truncated character string and the first preset character string to form the first identifier.

Step 507: The second device sends a Probe request message, where a reserved field in the Probe request message carries the first identifier.

An identity of the second device is set as a Wi-Fi P2P device, and the second device sends the Probe request message, to request to establish a wireless connection to a GO receiving the Probe request message. The second device may broadcast the Probe request message, or after receiving a Beacon message broadcast by the first device, the second device may obtain an address of the first device from the Beacon message, and unicast the Probe request message to the first device according to the address of the first device.

Referring to a structure of a Probe request message shown in FIG. 4-2, the Probe request message includes parts such as a MAC header, a frame body, and an FCS. The MAC header includes fields such as Addr_1 and Addr_2, where Addr_1 is a receiver address, and Addr_2 is a sender address. The frame body includes fields such as an SSID field and a reserved Vendor specific field, where the SSID field is used to carry an identifier. The FCS is a check field and is used to carry a check code. In the embodiment of the present disclosure, the second device uses the first identifier as the identifier of the GO. When the second device broadcasts the Probe request message, the Addr_1 field in the Probe request message is null; when the second device unicasts the Probe request message to the first device, the Addr_1 field in the Probe request message carries a MAC address of the first device; in the two cases, the Addr_2 field in the Probe request message carries a MAC address of the second device, and the reserved field carries the first identifier, but the SSID field is null.

Step 508: The first device receives the Probe request message, where the reserved field in the Probe request message carries the first identifier.

For example, the second device sends a Probe request message, where a reserved field in the Probe request message carries a first identifier "123456", and the first device receives the Probe request message.

Step 509: The first device determines whether the first identifier matches the second identifier, and if the first identifier matches the second identifier, performs step 510.

That the first identifier matches the second identifier means that the first identifier is equal to the second identifier or that the first identifier corresponds to the second identifier.

An identifier relationship table may be preset on the first device, where the identifier relationship table is used to store any two identifiers having a correspondence.

Correspondingly, the first device may determine, in the following manner, whether the first identifier corresponds to the second identifier, including: the first device may search out a corresponding identifier from the identifier relationship table according to the first identifier; if the identifier that is searched out is equal to the second identifier, determine that the first identifier corresponds to the second identifier; otherwise, determine that the first identifier does not correspond to the second identifier.

Step 510: The first device sends a Probe response message to the second device, where the Probe response message is used by the second device to determine to establish a wireless connection to the first device.

The second device sends a Probe request message, to request to establish a wireless connection to an AP, where a first identifier of the AP is carried in a reserved field in the Probe request message. Therefore, in this step, when the first device determines that the first identifier matches the second identifier, the first device may know that the second device requests to establish a wireless connection to the first device, therefore determine that a wireless connection needs to be established to the second device, and send the Probe response message to the second device, so as to notify the second device that the first device agrees to establish a wireless connection to the second device.

For example, it is assumed that the reserved field in the Probe request message sent by the second device carries the first identifier "123456". The first device receives the Probe request message, and the generated second identifier is "123456". The first identifier "123456" is the same as the second identifier "123456", and therefore, the first identifier matches the second identifier. The first device determines that a wireless connection needs to be established to the second device, and sends a Probe response message to the second device.

Step 511: The second device receives the Probe response message, determines, according to the Probe response message, to establish a wireless connection to the first device, and performs step 512.

Step 512: The second device generates first authentication information according to the second information portion of the connection information.

Content of the first information portion of the connection information may be the same as or different from content of the second information portion. For example, if the connection information is "12345678", the first information portion may be "1234", and the second information portion may be "5678"; or the first information portion may be "123456", and the second information portion may be "345678"; or the like.

Specifically, this step may be implemented in either of the following two manners:

Manner 1: The second device performs a hash operation on the second information portion of the connection information to obtain a second hash result, and generates the second authentication information according to the second hash result.

Manner 2: The second device adds the second preset information to the second information portion of the connection information to obtain the second construction information, and generates the first authentication information according to the second construction information.

In addition to the foregoing first and second manners of generating the first authentication information, the second device may further use other manners of generating the first authentication information. For example, the second device truncates a character string of a preset second character quantity from the connection information as a fourth character string, and generates the first authentication information according to the fourth character string; or determines that the connection information is the first authentication information.

An implementation manner in which the second device generates the first authentication information according to the fourth character string includes the following manners:

Manner 1: Determine that the fourth character string is the first authentication information.

For example, assuming that the preset second character quantity is 4, the first device truncates a character string "1234" of the first four characters or a character string "5678" of the last four characters from the connection information "12345678" as the fourth character string, and uses the fourth character string as the first authentication information.

In the embodiment of the present disclosure, a sum of the preset first character quantity and the second character quantity may be equal to a quantity of characters included in the connection information. Correspondingly, the second device obtains a remaining character string after truncating the first character string of the preset first character quantity from the connection information, where a quantity of characters of the remaining character string is the preset second character quantity, and the remaining character string of the preset second character quantity may be used as the fourth character string. For example, the preset first character quantity is 6, and the preset second character quantity is 2. The second device obtains a remaining character string "78" of the preset second character quantity after truncating the first character string "123456" of the preset first character quantity from the connection information "12345678", and the first device may use the remaining character string "78" of the preset second character quantity as the fourth character string.

Manner 2: Use the fourth character string and a second preset character string to form the first authentication information.

For example, assuming that the fourth character string is "1234" and that the second preset character string is "9860", second authentication information formed by the fourth character string and the second preset character string is "12349860" or "98601234".

Manner 3: Perform a hash operation on the fourth character string to obtain a hash result, and truncate a character string of the preset second character quantity from the hash result as the second authentication information, or determine that the hash result is the first authentication information.

Manner 4: Generate the first authentication information according to the fourth character string and an authentication mode used by the second device.

Specifically, a quantity of characters in the authentication information is determined according to the authentication mode used by the second device; and information padding or information truncation is performed on the fourth character string according to the determined quantity of characters to obtain the second authentication information. For example, the fourth character string is "1234"; assuming that the second device uses a WPS authentication mode, it is determined, according to the WPS authentication mode, that the quantity of characters in the authentication information is eight digits; information "9988" is padded into the fourth character string "1234", and first authentication information "12349988" is obtained. For another example, assuming that the second device uses a 4-way handshake authentication mode, it is determined, according to the 4-way handshake authentication mode, that a quantity of bits in the authentication information is 256 bits, but the fourth character string "1234" includes 32 bits; therefore, 224 bits are padded into the fourth character string, and 256-bit first authentication information is obtained.

Alternatively, a quantity of characters in the authentication information is determined according to the authentication mode used by the second device; a hash operation is performed on the fourth character string to obtain a hash result; and information padding or information truncation is performed on the hash result according to the determined quantity of characters to obtain the second authentication information. For example, the fourth character string is "1234"; a hash operation is performed on the fourth character string "1234" to obtain a hash result "98765432111"; assuming that the second device uses a WPS authentication mode, it is determined, according to the WPS authentication mode, that the quantity of characters in the authentication information is eight digits; and eight digits "98765432" are truncated from the hash result and used as the first authentication information. For another example, assuming that the second device uses a 4-way handshake authentication mode, it is determined, according to the 4-way handshake authentication mode, that a quantity of bits in the authentication information is 256 bits, but the hash result "98765432111" includes 88 bits; therefore, 168 bits are padded into the hash result, and 256-bit first authentication information is obtained.

Step 513: The first device verifies whether the first authentication information of the second device matches the second authentication information of the first device, and if the first authentication information matches the second authentication information, sends confirmation information to the second device, where the confirmation information is used by the second device to determine to establish the wireless connection to the first device.

An authentication mode used by the first device may be the 4-way handshake authentication mode in IEEE 802.11, the WPS (Wi-Fi protected setup) authentication mode specified by the WFA (Wi-Fi Alliance), or another authentication mode. For each authentication mode, an authentication message format is specified. For example, for the 4-way handshake authentication mode, it is specified that an authentication message is key information formed by 256 bits, and for the WPS authentication mode, it is specified that an authentication message is eight digits.

When the 4-way handshake authentication mode is used, this step may be: The first device determines that the second authentication information is a PMK of the 4-way handshake authentication mode, and verifies, according to the PMK by using the 4-way handshake authentication mode, whether the first authentication information of the second device matches the second authentication information of the first device.

When the WPS authentication mode is used, this step may be: The first device determines that the second authentication information is a PIN of the WPS authentication mode, and verifies, according to the PIN by using the WPS authentication mode, whether the first authentication information of the second device matches the second authentication information of the first device.

In the process of verification by the first device, the second device performs verification with the first device, so that the first device determines whether the first authentication information of the second device matches the second authentication information of the first device. Specific implementation is: The second device uses the first authentication information as the PMK of the 4-way handshake authentication mode, and performs authentication with the first device according to the PMK by using the 4-way handshake authentication mode; or uses the first authentication information as the PIN of the WPS authentication mode, and performs authentication with the first device according to the PIN by using the WPS authentication mode.

In the process of verification, after receiving the confirmation information sent by the first device, the second device determines, according to the confirmation information, to establish the wireless connection to the first device, and then step 514 is performed.

Step 514: The first device establishes a data connection to the second device, to implement establishment of a wireless connection to the second device.

The wireless connection established by the second device to the first device is an encrypted wireless connection, and the second device and the first device may transmit data by using the encrypted wireless connection. The wireless connection may be a Wi-Fi connection or a Bluetooth connection.

In the embodiment of the present disclosure, a first device generates connection information, and provides the connection information to a second device; the second device generates a first identifier according to the connection information, and sends a Probe request message carrying the first identifier to the first device; the first device determines whether a second identifier stored by the first device matches the first identifier of the second device, and if the first identifier matches the second identifier, establishes a wireless connection to the second device. The second device obtains, in a user input manner or another manner, the connection information generated by the first device, generates the first identifier according to the connection information, and determines, by using the first identifier, a device that needs to be connected to. Therefore, manually selecting the device that needs to be connected to by a user is avoided, efficiency of establishing a wireless connection is improved, and efficiency of data transmission is improved. The first device and the second device further perform mutual authentication by using first authentication information and second authentication information. Therefore, the established wireless connection is more secure, and security of data transmission is improved.

Figures 2, 3, 4, 5, 6:
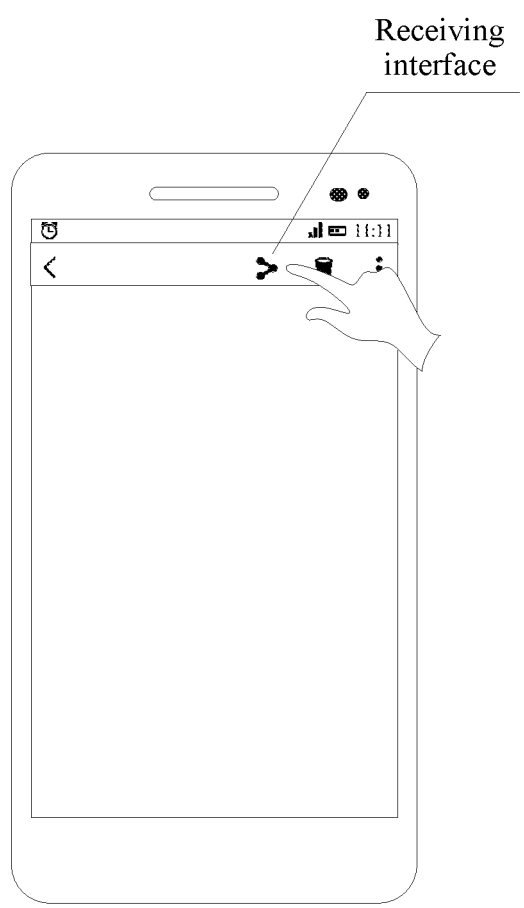

An embodiment of the present disclosure provides a method for establishing a wireless connection. In the embodiment of the present disclosure, a first device generates connection information, and provides the connection information to a second device. The second device generates a first identifier according to the connection information, and sends a Test request message to the first device, where the Test request message carries the first identifier and communications modes supported by the second device. The first device generates a second identifier according to the connection information, selects a communications mode if the first identifier matches the second identifier, sets its own identity according to the selected communications mode, and then establishes a wireless connection to the second device. Referring to FIG. 6-1, the method includes the following steps.

Step 601: The first device generates connection information.

The connection information may be a character string. Content of the connection information may be numerals, letters, or other characters, or may be any combination of multiple characters of numerals, letters, and other characters. The first device may generate a character string randomly, and use the generated character string as the connection information.

In the embodiment of the present disclosure, the first device may generate connection information when triggered by a first user corresponding to the first device. Specifically, the following two trigger manners exist and include:

Manner 1: The first device generates connection information when detecting a connection command that is triggered by clicking a connection interface in a UI of a system application by the first user.

A connection interface is set in the UI of the system application requiring data transmission. When the first user needs to transmit data, the first user may click the connection interface, so that the connection interface triggers a connection command. The system application may be an image shooting application that has an image sharing function or a video shooting application that has a video sharing function.

For example, referring to a UI of a system application shown in FIG. 2-2, the system application is an image shooting application. The image shooting application shoots an image and displays the image in the UI. On an upper side of the UI, a connection interface exists, and when the first user clicks the connection interface, the connection interface triggers a connection command. When the first device detects the connection command triggered by the connection interface, connection information is generated randomly. It is assumed that the generated connection information is "12345678", as shown in FIG. 2-3.

Manner 2: The first device generates connection information when detecting a connection command that is triggered by clicking a connection interface in a UI of a third-party application by the first user, where the third-party application is an application for establishing a wireless connection.

A third-party application that is used for establishing a wireless connection is installed on the first device, and a UI of the third-party application includes a connection interface. When the first user needs to transmit data, the first user may click the connection interface, so that the connection interface triggers a connection command.

For example, referring to a UI of a third-party application shown in FIG. 2-4, a connection interface exists in the UI; the first user clicks the connection interface, and the connection interface triggers a connection command. When the first device detects the connection command triggered by the connection interface, connection information is generated randomly. It is assumed that the generated connection information is "12345678", as shown in FIG. 2-5.

Step 602: The first device provides the connection information to the second device.

Specifically, this step may include the following first to fourth implementation manners, which are respectively:

Manner 1: The first device displays the connection information.

A second user corresponding to the second device may view the connection information displayed by the first device, and input the connection information to the second device.

Manner 2: The first device plays the connection information by using a sound box.

The second user may listen to the connection information played by the first device, and input the connection information to the second device.

Manner 3: The first device generates, according to the connection information, a graphic code including the connection information, and displays the graphic code.

The graphic code may be a one-dimensional code or a two-dimensional code. The first device may code the connection information by using a coding algorithm that is used for generating a graphic code, so as to generate the graphic code including the connection information, for example, generate a QR Code two-dimensional code.

The second device has a scanning module, where the scanning module may be a camera, a scanner, or the like. After the first device displays the graphic code, the second device may scan, by using the scanning module included in the second device, the graphic code displayed by the first device, and obtain the connection information.

Manner 4: The first device establishes a short-range communications connection to the second device, and sends the connection information to the second device by using the short-range communications connection.

The first device may establish the short-range communications connection to the second device in an out-of-band communications mode. The out-of-band communications mode may be a communications mode like acoustic wave, infrared, NFC, or HotKnot.

Step 603: The second device obtains the connection information provided by the first device.

Specifically, the second device may obtain the connection information in any one of the following first, second, and third manners.

Manner 1: The second device receives the connection information input by the second user.

After generating the connection information, the first device displays the connection information or plays the connection information by using a sound box. The second user may view or listen to the connection information, and then input the connection information to the second device.

The second device may obtain, in the following two manners (1) and (2), the connection information input by the second user, including:

(1) The second device obtains, from a UI of a system application, the connection information input by the second user.

The UI of the system application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the first device displays the connection information "12345678" or plays the connection information "12345678" by using a sound box, and the second user views the connection information "12345678" or listens to the connection information "12345678". Then, the second user clicks the receiving interface in the UI of the system application shown in FIG. 2-6, and the receiving interface triggers a receiving command. The second device displays an input box in the UI when detecting the receiving command triggered by the receiving interface. As shown in FIG. 2-7, the second user inputs the connection information "12345678" in the input box. Then the second device reads, from the input box, the connection information "12345678" input by the second user.

(2) The second device obtains, from a UI of a third-party application, the connection information input by the second user.

The UI of the third-party application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the second user clicks the receiving interface in the UI of the third-party application shown in FIG. 2-4, and the receiving interface triggers a receiving command. The second device displays an input box in the UI when detecting the receiving command triggered by the receiving interface. As shown in FIG. 2-8, the second user inputs the connection information "12345678" in the input box. Then the second device reads, from the input box, the connection information "12345678" input by the second user.

Manner 2: The second device scans the graphic code displayed by the first device, and obtains the connection information included in the graphic code.

The second user may enable the scanning module of the second device, and then the second device scans, by using the scanning module, the graphic code displayed by the first device, parses the scanned graphic code, and obtains the connection information included in the scanned graphic code.

Manner 3: The second device establishes a short-range communications connection to the first device, and receives, by using the short-range communications connection, the connection information sent by the first device.

In this embodiment, the first device generates a piece of connection information; the user may input the connection information to the second device, or scan, by using the second device, a graphic code including the connection information on the first device, or make the second device close to the first device so that the second device obtains the connection information in a short-range communications mode. In comparison with finding an identifier of the second device from a large quantity of device search results by the user, this step may save both time for performing a device search by the first device and time for searching for the identifier of the second device by the user, and therefore may reduce time for establishing a wireless connection.

Step 604: The second device generates a first identifier through calculation according to a first information portion included in the connection information.

Specifically, this step may be implemented in either of the following two manners:

Manner 1: The second device performs a hash operation on the first information portion of the connection information to obtain a first hash result, and generates the first identifier according to the first hash result.

An information portion may be truncated from the first hash result and used as the first identifier, or preset information is added to a truncated information portion to form the first identifier, or the first hash result is used as the first identifier, or the like.

Manner 2: The second device adds first preset information to the first information portion of the connection information to obtain first construction information, and generates the first identifier according to the first construction information.

Reverse displacement processing or shift processing may be performed on the first construction information to generate the first identifier. For example, assuming that the first information portion of the connection information "12345678" is "1234" and that the first preset information is "hua", the first construction information obtained by the second device by adding the first preset information "hua" to the first information portion "1234" of the connection information may be "1234hua", "hua1234", "12hua34", or the like.

Assuming that the constructed first construction information is "1234hua", the first identifier obtained by performing reverse displacement processing on the first construction information is "auh4321"; or a shift amount is preset, where the shift amount may be two, three, or the like, and then two-position shift processing, three-position shift processing, or the like is performed on the first construction information. For example, when two-position shift processing is performed on the first construction information, the obtained first identifier is "ua1234h", and when three-position shift processing is performed on the first construction information, the obtained first identifier is "hua1234".

In addition to the foregoing first and second manners, the second device may further use other manners of generating the first identifier, for example, may truncate a character string of a preset first character quantity from the connection information as a first character string, and generate the first identifier according to the first character string; or perform a hash operation on the whole connection information to obtain the first identifier.

An implementation manner in which the second device generates the first identifier according to the first character string includes the following manners (1) to (4):

(1) Determine that the first character string is the first identifier.

For example, the preset first character quantity is 6, and the second device truncates a character string "123456" of the first six characters or a character string "345678" of the last six characters from the connection information "12345678" as the first character string, and determines that the first character string "123456" or "345678" is the first identifier.

(2) Use the first character string and a first preset character string to form the first identifier.

For example, if the first character string is "123456", and the first preset character string is "Huawei", the first identifier formed by the first character string and the first preset character string is "123456Huawei" or "Huawei123456".

(3) Perform a hash operation on the first character string to obtain a hash result, and truncate a character string of the preset first character quantity from the hash result as the first identifier.

(4) Perform a hash operation on the first character string to obtain a hash result, truncate a character string of the preset first character quantity from the hash result, and use the truncated character string and the first preset character string to form the first identifier.

Step 605: The second device sends a Test request message, where an action frame in the Test request message carries the first identifier and communications modes supported by the second device.

The second device supports at least one communications mode. The communications modes include AP-STA (access point-station), GO-Client (group owner-client), and P2P (peer to peer) communications modes. The action frame in the Test request message includes an identifier field and a communications mode field, where the identifier field is used to carry the first identifier, and the communications mode field is used to carry the communications modes supported by the second device.

Referring to a structure of a Test request shown in FIG. 6-2, the Test request message includes parts such as a MAC (media access control) header, a frame body, and an FCS (frame check sequence). The MAC header includes fields such as Addr_1 and Addr_2, where Addr_1 is a receiver address, and Addr_2 is a sender address. The frame body includes an action frame, where the action frame includes an identifier field and a communications mode field. The FCS is a check field and is used to carry a check code. In the embodiment of the present disclosure, when the second device broadcasts the Test request message, in the Test request message, the Addr_1 field is null, the Addr_1 field carries a MAC address of the first device, the identifier field carries the first identifier, and the communications mode field is used to carry the communications modes supported by the second device.

Step 606: The first device receives the Test request message, where the action frame in the Test request message carries the first identifier and the communications modes supported by the second device.

For example, the second device sends a Test request message, where an action frame in the Test request message carries a first identifier "123456" and communications modes supported by the second device, including AP-STA and GO-Client, and the first device receives the Test request message.

Step 607: The first device generates a second identifier according to the first information portion of the connection information, where the first device uses the second identifier as its own identifier.

Specifically, the first device may generate the second identifier through calculation in the following first and second manners, including:

Manner 1: The first device performs a hash operation on the first information portion of the connection information to obtain a first hash result, and generates the second identifier according to the first hash result.

This implementation manner is the same as the first manner of generating the first identifier by the second device. For a detailed process, reference may be made to the first manner of generating the first identifier by the second device, and details are not further described herein.

Manner 2: The first device adds second preset information to a second information portion of the connection information to obtain second construction information, and generates the second identifier according to the second construction information.

This implementation manner is the same as the second manner of generating the first identifier by the second device. For a detailed process, reference may be made to the second manner of generating the first identifier by the second device, and details are not further described herein.

In addition to the foregoing first and second manners, the first device may further use other manners of generating the second identifier, for example, may truncate a character string of the preset first character quantity from the connection information as a second character string, and generate the second identifier according to the second character string; or perform a hash operation on the whole connection information to obtain the second identifier.

It should be noted that, the first device may also generate the second identifier according to this step after generating the connection information and before receiving the Test request message.

An implementation manner in which the first device generates the second identifier according to the second character string may include the following manners (1) to (4):

(1) Determine that the second character string is the second identifier.

For example, the preset first character quantity is 6, and the first device truncates a character string "123456" of the first six characters or a character string "345678" of the last six characters from the connection information "12345678" as the second character string, and determines that the second character string "123456" or "345678" is the second identifier.

(2) Use the second character string and the first preset character string to form the second identifier.

For example, assuming that the second character string is "123456" and that the first preset character string is "Huawei", the second identifier formed by the second character string and the first preset character string is "123456Huawei" or "Huawei123456".

(3) Perform a hash operation on the second character string to obtain a hash result, and truncate a character string of the preset first character quantity from the hash result as the second identifier.

(4) Perform a hash operation on the second character string to obtain a hash result, truncate a character string of the preset first character quantity from the hash result, and use the truncated character string and the preset character string to form the second identifier.

Step 608: The first device determines whether the first identifier matches the second identifier, and if the first identifier matches the second identifier, performs step 609.

That the first identifier matches the second identifier means that the first identifier is equal to the second identifier or that the first identifier corresponds to the second identifier.

An identifier relationship table may be preset on the first device, where the identifier relationship table is used to store any two identifiers having a correspondence.

Correspondingly, the first device may determine, in the following manner, whether the first identifier corresponds to the second identifier, including: the first device may search out a corresponding identifier from the identifier relationship table according to the first identifier; if the identifier that is searched out is equal to the second identifier, determine that the first identifier corresponds to the second identifier; otherwise, determine that the first identifier does not correspond to the second identifier.

Step 609: The first device selects a communications mode from the communications modes supported by the second device, sets its own identity according to the selected communications mode, and sends a Test response message to the second device, where the Test response message carries the selected communications mode and the identity of the first device.

Specifically, the first device performs an intersection between communications modes supported by the first device and the communications modes supported by the second device, selects a communications mode from an intersection result, and then sets its own identity according to the selected communications mode. For example, if AP-STA is selected, the first device may set its own identity as an AP; if GO-Client is selected, the first device may set its own identity as a GO; if the P2P communications mode is selected, the first device may set its own identity as an AP. Then the first device sends a Test response message to the second device, where the Test response message carries the selected communications mode and the identity of the first device.

The Test response message is used by the second device to determine to establish a wireless connection to the first device. The second device sends a Test request message, to request to establish a wireless connection to a P2P device, where a first identifier of the P2P device is carried in an action frame in the Test request message. Therefore, in this step, when the first device determines that the first identifier matches the second identifier, the first device may know that the second device requests to establish a wireless connection to the first device, therefore determine that a wireless connection needs to be established to the second device, and send the Test response message to the second device, so as to notify the second device that the first device agrees to establish a wireless connection to the second device.

Referring to a structure of a Test response message shown in FIG. 6-3, the Test response message includes parts such as a MAC header, a frame body, and an FCS. The MAC header includes fields such as Addr_3 and Addr_4, where Addr_3 is a receiver address, and Addr_4 is a sender address. An action frame is in the frame body, and the action frame includes fields such as a communications mode field. In the embodiment of the present disclosure, in the Test response message, the Addr_3 field carries a MAC address of the second device, the Addr_4 field carries a MAC address of the first device, and the communications mode field carries the selected communications mode and the identity of the first device.

For example, it is assumed that the action frame in the Test request message sent by the second device carries the first identifier "123456". The first device receives the Test request message, and the generated second identifier is "123456". The first identifier "123456" is the same as the second identifier "123456", and therefore, the first identifier matches the second identifier. The first device determines that a wireless connection needs to be established to the second device, obtains the communications modes supported by the first device, including AP-STA, GO-Client, and P2P communications modes, and performs an intersection between the communications modes supported by the first device and the communications modes AP-STA and GO-Client supported by the second device, where an obtained intersection result includes AP-STA and GO-Client. The first device randomly selects, from the intersection result, a communications mode, which is assumed to be AP-STA, then sets the identity of the first device as an AP, and sends a Test response message to the second device, where the Test response message carries the selected communications mode AP-STA and the identity AP of the first device.

Step 610: The second device receives the Test response message, sets its own identity according to the Test response message, determines to establish a wireless connection to the first device, and performs step 611.

The second device sets its own identity according to the communications mode selected by the first device and the identity of the first device that are carried in the Test response message. For example, the second device receives a Test response message, where the Test response message carries a communications mode AP-STA selected by the second device and an identity AP of the first device, and the second device sets its own identity as a STA according to the communications mode AP-STA selected by the second device and the identity AP of the first device.

Step 611: The second device generates first authentication information according to a second information portion of the connection information.

Content of the first information portion of the connection information may be the same as or different from content of the second information portion. For example, if the connection information is "12345678", the first information portion may be "1234", and the second information portion may be "5678"; or the first information portion may be "123456", and the second information portion may be "345678"; or the like.

Specifically, this step may be implemented in either of the following two manners:

Manner 1: The second device performs a hash operation on the second information portion of the connection information to obtain a second hash result, and generates the first authentication information according to the second hash result.

For example, hash of an SHA-256 hash algorithm is performed on the second information portion "5678" of the connection information "12345678" to obtain a second hash result "6BAA0BD18BCC1E5237B70DC18595A7DEFF11CD27120CDC96A678003F8B162941", and processing such as truncation or supplementation is performed on the second hash result according to an authentication mode used by the second device, to obtain first authentication information of a character quantity required by the authentication mode.

The authentication mode used by the second device may include a 4-way handshake authentication mode, a WPS authentication mode, or another authentication mode. For each authentication mode, an authentication message format is specified. For example, for the 4-way handshake authentication mode, it is specified that an authentication message is key information formed by 256 bits, and for the WPS authentication mode, it is specified that an authentication message is eight digits.

For example, when the second device uses the 4-way handshake authentication, the second hash result includes 32 characters, exactly 256 bits, and therefore, the second hash result is used as the first authentication information. When the second device uses the WPS authentication, last eight characters "8F162941" are truncated, and "F" is mapped to a numeral "6" to obtain "86162941" as the first authentication information.

Manner 2: The second device adds the second preset information to the second information portion of the connection information to obtain the second construction information, and generates the first authentication information according to the second construction information.

For example, when using the 4-way handshake authentication, the second device converts the second information portion "5678" of the connection information "12345678" into binary "1011000101110", and then adds 243 bits of "0" to a left side of "1011000101110" to obtain 256-bit first authentication information, or adds 243 bits of "1" to a right side of "1011000101110" to obtain 256-bit first authentication information.

When using the WPS authentication, the second device adds four characters "8888" or "0000" to a left side or a right side of the second information portion "5678" of the connection information "12345678" to obtain eight digits as the first authentication information.

It should be noted that, when a character quantity of the second information portion meets a character quantity of authentication information required by the authentication mode used by the second device, the second information portion may also be directly used as the first authentication information.

In addition to the foregoing first and second manners of generating the first authentication information, the second device may further use other manners of generating the first authentication information. For example, the second device truncates a character string of a preset second character quantity from the connection information as a fourth character string, and generates the first authentication information according to the fourth character string; or determines that the connection information is the first authentication information.

An implementation manner in which the second device generates the first authentication information according to the fourth character string includes the following manners:

Manner 1: Determine that the fourth character string is the first authentication information.

For example, assuming that the preset second character quantity is 4, the first device truncates a character string "1234" of the first four characters or a character string "5678" of the last four characters from the connection information "12345678" as the fourth character string, and uses the fourth character string as the first authentication information.

In the embodiment of the present disclosure, a sum of the preset first character quantity and the second character quantity may be equal to a quantity of characters included in the connection information. Correspondingly, the second device obtains a remaining character string after truncating the first character string of the preset first character quantity from the connection information, where a quantity of characters of the remaining character string is the preset second character quantity, and the remaining character string of the preset second character quantity may be used as the fourth character string. For example, the preset first character quantity is 6, and the preset second character quantity is 2. The second device obtains a remaining character string "78" of the preset second character quantity after truncating the first character string "123456" of the preset first character quantity from the connection information "12345678", and the first device may use the remaining character string "78" of the preset second character quantity as the fourth character string.

Manner 2: Use the fourth character string and a second preset character string to form the first authentication information.

For example, assuming that the fourth character string is "1234" and that the second preset character string is "9860", second authentication information formed by the fourth character string and the second preset character string is "12349860" or "98601234".

Manner 3: Perform a hash operation on the fourth character string to obtain a hash result, and truncate a character string of the preset second character quantity from the hash result as the second authentication information, or determine that the hash result is the first authentication information.

Manner 4: Generate the first authentication information according to the fourth character string and the authentication mode used by the second device.

Specifically, a quantity of characters in the authentication information is determined according to the authentication mode used by the second device; and information padding or information truncation is performed on the fourth character string according to the determined quantity of characters to obtain the second authentication information. For example, the fourth character string is "1234"; assuming that the second device uses the WPS authentication mode, it is determined, according to the WPS authentication mode, that the quantity of characters in the authentication information is eight digits; information "9988" is padded into the fourth character string "1234", and first authentication information "12349988" is obtained. For another example, assuming that the second device uses the 4-way handshake authentication mode, it is determined, according to the 4-way handshake authentication mode, that a quantity of bits in the authentication information is 256 bits, but the fourth character string "1234" includes 32 bits; therefore, 224 bits are padded into the fourth character string, and 256-bit first authentication information is obtained.

Alternatively, a quantity of characters in the authentication information is determined according to the authentication mode used by the second device; a hash operation is performed on the fourth character string to obtain a hash result; and information padding or information truncation is performed on the hash result according to the determined quantity of characters to obtain the second authentication information. For example, the fourth character string is "1234"; a hash operation is performed on the fourth character string "1234" to obtain a hash result "98765432111"; assuming that the second device uses the WPS authentication mode, it is determined, according to the WPS authentication mode, that the quantity of characters in the authentication information is eight digits; and eight digits "98765432" are truncated from the hash result and used as the first authentication information. For another example, assuming that the second device uses the 4-way handshake authentication mode, it is determined, according to the 4-way handshake authentication mode, that a quantity of bits in the authentication information is 256 bits, but the hash result "98765432111" includes 88 bits; therefore, 168 bits are padded into the hash result, and 256-bit first authentication information is obtained.

Step 612: The first device generates second authentication information according to the second information portion of the connection information.

Specifically, this step may be implemented in the following first and second manners, including:

Manner 1: The first device performs a hash operation on the second information portion of the connection information to obtain a second hash result, and generates the second authentication information according to the second hash result.

A process of this implementation manner is the same as the process of the first manner of generating the first authentication information by the second device, and details are not further described herein.

Manner 2: The first device adds the second preset information to the second information portion of the connection information to obtain the second construction information, and generates the second authentication information according to the second construction information.

A process of this implementation manner is the same as the process of the second manner of generating the first authentication information by the second device, and details are not further described herein.

In addition to the foregoing first and second manners of generating the second authentication information, the first device may further use other manners of generating the second authentication information. For example, the first device truncates a character string of the preset second character quantity from the connection information as a third character string, and generates the second authentication information according to the third character string; or determines that the whole connection information is the second authentication information.

A manner in which the first device generates the second authentication information according to the third character string includes the following manners:

Manner 1: Determine that the third character string is the second authentication information.

For example, assuming that the preset second character quantity is 4, the first device truncates a character string "1234" of the first four characters or a character string "5678" of the last four characters from the connection information "12345678" as the third character string, and uses the third character string as the second authentication information.

In the embodiment of the present disclosure, the sum of the preset first character quantity and the second character quantity may be equal to the quantity of characters included in the connection information. Correspondingly, the first device obtains a remaining character string after truncating the second character string of the preset first character quantity from the connection information, where a quantity of characters of the remaining character string is the preset second character quantity, and the remaining character string of the preset second character quantity may be used as the third character string. For example, the preset first character quantity is 6, and the preset second character quantity is 2. The first device obtains a remaining character string "78" of the preset second character quantity after truncating the second character string "123456" of the preset first character quantity from the connection information "12345678", and the first device may use the remaining character string "78" of the preset second character quantity as the third character string.

Manner 2: Use the third character string and the second preset character string to form the second authentication information.

For example, assuming that the third character string is "1234" and that the second preset character string is "9860", the first authentication information formed by the third character string and the second preset character string is "12349860" or "98601234".

Manner 3: Perform a hash operation on the third character string to obtain a hash result, and truncate a character string of the preset second character quantity from the hash result as the first authentication information, or determine that the hash result is the second authentication information.

Manner 4: Generate the second authentication information according to the third character string and an authentication mode used by the first device.

Step 613: The first device verifies whether the first authentication information of the second device matches the second authentication information of the first device, and if the first authentication information matches the second authentication information, sends confirmation information to the second device, where the confirmation information is used by the second device to determine to establish the wireless connection to the first device.

When the first device uses the 4-way handshake authentication mode, this step may be: The first device determines that the second authentication information is a PMK of the 4-way handshake authentication mode, and verifies, according to the PMK by using the 4-way handshake authentication mode, whether the first authentication information of the second device matches the second authentication information of the first device.

When the first device uses the WPS authentication mode, this step may be: The first device determines that the second authentication information is a PIN of the WPS authentication mode, and verifies, according to the PIN by using the WPS authentication mode, whether the first authentication information of the second device matches the second authentication information of the first device.

In the process of verification by the first device, the second device performs verification with the first device, so that the first device determines whether the first authentication information of the second device matches the second authentication information of the first device. Specific implementation is: The second device uses the first authentication information as the PMK of the 4-way handshake authentication mode, and performs authentication with the first device according to the PMK by using the 4-way handshake authentication mode; or uses the first authentication information as the PIN of the WPS authentication mode, and performs authentication with the first device according to the PIN by using the WPS authentication mode.

In the process of verification, after receiving the confirmation information sent by the first device, the second device determines, according to the confirmation information, to establish the wireless connection to the first device, and then step 614 is performed.

Step 614: The first device establishes a data connection to the second device, to implement establishment of a wireless connection to the second device.

The wireless connection established by the second device to the first device is an encrypted wireless connection, and the second device and the first device may transmit data by using the encrypted wireless connection. The wireless connection may be a Wi-Fi connection or a Bluetooth connection.

In the embodiment of the present disclosure, a first device generates connection information, and provides the connection information to a second device; the second device generates a first identifier according to the connection information, and sends a Probe request message carrying the first identifier to the first device; the first device generates a second identifier according to the connection information, and if the first identifier matches the second identifier, establishes a wireless connection to the second device. The second device obtains, in a user input manner or another manner, the connection information generated by the first device, generates the first identifier according to the connection information, and determines, by using the first identifier, a device that needs to be connected to. Therefore, manually selecting the device that needs to be connected to by a user is avoided, efficiency of establishing a wireless connection is improved, and efficiency of data transmission is improved. The first device and the second device further perform mutual authentication by using first authentication information and second authentication information. Therefore, the established wireless connection is more secure, and security of data transmission is improved.

Figures 2, 3, 4, 5, 6, 7:
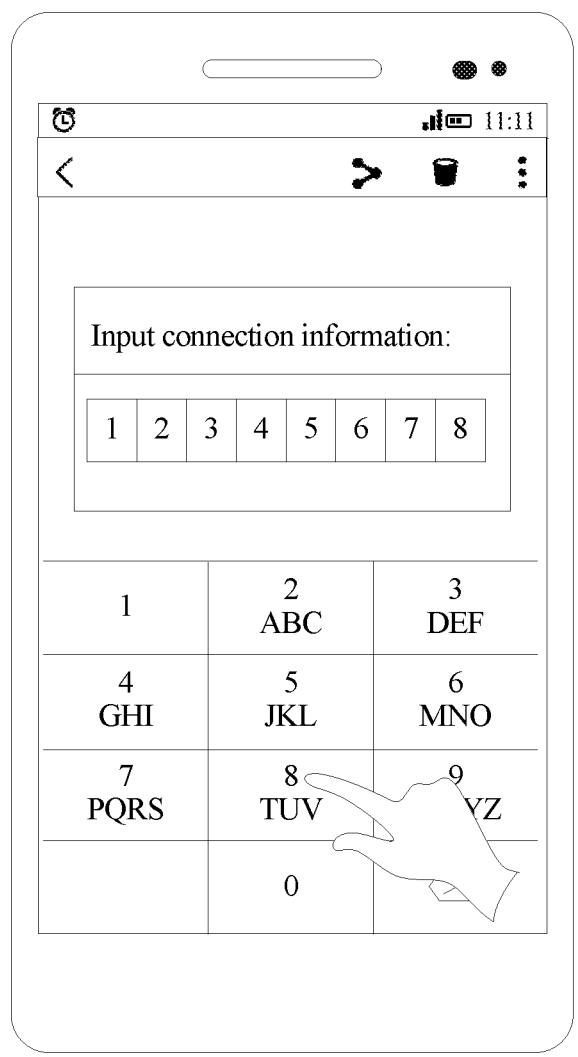

An embodiment of the present disclosure provides a method for establishing a wireless connection. In the embodiment of the present disclosure, a first device generates connection information, and provides the connection information to a second device. The second device generates a first identifier according to the connection information, and sends a Test request message to the first device, where the Test request message carries the first identifier and communications modes supported by the second device. The first device determines whether a second identifier stored by the first device matches the first identifier, selects a communications mode if the first identifier matches the second identifier, sets its own identity according to the selected communications mode, and then establishes a wireless connection to the second device. Referring to FIG. 7, the method includes the following steps.

Step 701: The first device generates a first information portion of connection information according to a second identifier.

Before this step is performed, a person skilled in the art may set the second identifier on the first device, or the first device generates the second identifier and stores the generated second identifier.

The first device may generate the second identifier in the following manner, including: the first device generates the connection information, adds first preset information to the first information portion of the connection information to obtain first construction information, generates the second identifier according to the first construction information, and may perform reverse displacement or shift processing on the first construction information to obtain the second identifier.

Assuming that the generated connection information is "12345678", that the first information portion of the connection information is "1234", and that the first preset information is "hua", the first construction information obtained by the first device by adding the first preset information "hua" to the first information portion "1234" of the connection information may be "1234hua", "hua1234", "12hua34", or the like. Assuming that the constructed first construction information is "1234hua", the first identifier obtained by performing reverse displacement processing on the first construction information is "auh4321"; or a shift amount is preset, where the shift amount may be two, three, or the like, and then two-position shift processing, three-position shift processing, or the like is performed on the first construction information. For example, when two-position shift processing is performed on the first construction information, the obtained first identifier is "ua1234h", and when three-position shift processing is performed on the first construction information, the obtained first identifier is "hua1234".

This step may be: The first device performs truncation on the second identifier to obtain an information portion, and determines that the truncated information portion is the first information portion of the connection information; or performs first operation processing on the second identifier to obtain the first information portion of the connection information, where the first operation processing is an operation inverse to that of generating the second identifier.

The first operation processing may be performed on the second identifier according to the following two steps (1) and (2) to obtain the first information portion of the connection information, including:

(1) Generate the first construction information according to the second identifier.

Forward displacement processing may be performed on the second identifier to obtain the first construction information, or reverse shifting may be performed on the second identifier to obtain the first construction information. For example, assuming that the first identifier is "auh4321", forward displacement processing is performed on the first identifier "auh4321" to obtain the first construction information "1234hua"; or assuming that the first identifier is "ua1234h", reverse two-position shifting is performed on the first identifier "ua1234h" to obtain the first construction information "1234hua"; or assuming that the first identifier is "hua1234", reverse three-position shifting is performed on the first identifier "hua1234" to obtain the first construction information "1234hua".

(2) Remove the first preset information from the first construction information to obtain the first information portion of the connection information.

For example, the first preset information is "hua", and after the first preset information "hua" is removed from the first construction information "1234hua", the first information portion "1234" of the connection information is obtained.

Step 702: The first device generates a second information portion of the connection information according to second authentication information.

Before this step is performed, a person skilled in the art may set the second authentication information on the first device, or the first device generates the second authentication information and stores the generated second authentication information.

The first device may generate the second authentication information in the following manner, including: the first device generates the connection information, adds second preset information to the second information portion of the connection information to obtain second construction information, generates the second authentication information according to the second construction information, and may perform reverse displacement or shift processing on the second construction information to obtain the second authentication information.

Assuming that the generated connection information is "12345678", that the first information portion of the connection information is "5678", and that the second preset information is "wei", the second construction information obtained by the first device by adding the second preset information "wei" to the second information portion "5678" of the connection information may be "5678wei", "wei5678", "56wei78", or the like. Assuming that the constructed second construction information is "5678wei", the second authentication information obtained by performing reverse displacement processing on the second construction information is "iew5678"; or a shift amount is preset, where the shift amount may be two, three, or the like, and then two-position shift processing, three-position shift processing, or the like is performed on the second construction information. For example, when two-position shift processing is performed on the second construction information, the obtained second authentication information is "ei5678w", and when three-position shift processing is performed on the second construction information, the obtained second authentication information is "wei5678".

This step may be: The first device performs truncation on the second authentication information to obtain an information portion, and determines that the truncated information portion is the second information portion of the connection information; or performs second operation processing on the second authentication information to obtain the second information portion of the connection information, where the second operation processing is an operation inverse to that of generating the second authentication information.

The second operation processing may be performed on the second authentication information according to the following two steps (1) and (2) to obtain the second information portion of the connection information, including:

(1) Generate the second construction information according to the second authentication information.

Forward displacement processing may be performed on the second authentication information to obtain the second construction information, or reverse shifting may be performed on the second authentication information to obtain the second construction information. For example, assuming that the second authentication information is "iew4321", forward displacement processing is performed on the second authentication information "iew4321" to obtain the second construction information "5678wei"; or assuming that the second authentication information is "ei5678w", reverse two-position shifting is performed on the second authentication information "ei5678w" to obtain the second construction information "5678wei"; or assuming that the second authentication information is "wei5678", reverse three-position shifting is performed on the second authentication information "wei5678" to obtain the second construction information "5678wei".

(2) Remove the second preset information from the second construction information to obtain the second information portion of the connection information.

For example, the second preset information is "wei", and after the second preset information "wei" is removed from the second construction information "5678wei", the second information portion "5678" of the connection information is obtained.

Step 703: The first device constructs the connection information according to the first information portion and the second information portion.

The first information portion and the second information portion are spliced to obtain the connection information. For example, the first information portion "1234" and the second information portion "5678" are spliced to obtain "12345678" as the connection information.

In the embodiment of the present disclosure, the first device may generate connection information according to the foregoing steps 701 to 703 when triggered by a first user corresponding to the first device. Specifically, the following two trigger manners exist and include:

Manner 1: The first device performs the foregoing steps 701 to 703 when detecting a connection command that is triggered by clicking a connection interface in a UI of a system application by the first user.

A connection interface is set in the UI of the system application requiring data transmission. When the first user needs to transmit data, the first user may click the connection interface, so that the connection interface triggers a connection command. The system application may be an image shooting application that has an image sharing function or a video shooting application that has a video sharing function.

For example, referring to a UI of a system application shown in FIG. 2-2, the system application is an image shooting application. The image shooting application shoots an image and displays the image in the UI. On an upper side of the UI, a connection interface exists, and when the first user clicks the connection interface, the connection interface triggers a connection command. When the first device detects the connection command triggered by the connection interface, the first device performs the foregoing steps 301 to 303 to generate connection information. It is assumed that the generated connection information is "12345678", as shown in FIG. 2-3.

Manner 2: The first device performs the foregoing steps 701 to 703 to generate connection information when detecting a connection command that is triggered by clicking a connection interface in a UI of a third-party application by the first user, where the third-party application is an application for establishing a wireless connection.

A third-party application that is used for establishing a wireless connection is installed on the first device, and a UI of the third-party application includes a connection interface. When the first user needs to transmit data, the first user may click the connection interface, so that the connection interface triggers a connection command.

For example, referring to a UI of a third-party application shown in FIG. 2-4, a connection interface exists in the UI; the first user clicks the connection interface, and the connection interface triggers a connection command. When the first device detects the connection command triggered by the connection interface, the first device performs the foregoing steps 701 to 703 to generate connection information. It is assumed that the generated connection information is "12345678", as shown in FIG. 2-5.

Step 704: The first device provides the connection information to the second device.

Specifically, this step may include the following first to fourth implementation manners, which are respectively:

Manner 1: The first device displays the connection information.

A second user corresponding to the second device may view the connection information displayed by the first device, and input the connection information to the second device.

Manner 2: The first device plays the connection information by using a sound box.

The second user may listen to the connection information played by the first device, and input the connection information to the second device.

Manner 3: The first device generates, according to the connection information, a graphic code including the connection information, and displays the graphic code.

The graphic code may be a one-dimensional code or a two-dimensional code. The first device may code the connection information by using a coding algorithm that is used for generating a graphic code, so as to generate the graphic code including the connection information.

The second device has a scanning module, where the scanning module may be a camera, a scanner, or the like. After the first device displays the graphic code, the second device may scan, by using the scanning module included in the second device, the graphic code displayed by the first device, and obtain the connection information.

Manner 4: The first device establishes a short-range communications connection to the second device, and sends the connection information to the second device by using the short-range communications connection.

The first device may establish the short-range communications connection to the second device in an out-of-band communications mode. The out-of-band communications mode may be a communications mode like acoustic wave, infrared, NFC, or HotKnot.

In the embodiment of the present disclosure, the first device may be a terminal device or an AP. When the first device is a terminal device, before performing this step, the first device sets its own identity as an AP, and then performs this step. After the first device becomes an AP, the first device may also actively broadcast a Beacon message to notify nearby STAs of presence of the AP. A device that receives the Beacon message determines, according to the Beacon message, that the first device is an AP, and actively requests to establish a connection to the first device; then the first device performs this step.

Step 705: The second device obtains the connection information provided by the first device.

Specifically, the second device may obtain the connection information in any one of the following first, second, and third manners.

Manner 1: The second device receives the connection information input by the second user.

After generating the connection information, the first device displays the connection information or plays the connection information by using a sound box. The second user may view or listen to the connection information, and then input the connection information to the second device.

The second device may obtain, in the following two manners (1) and (2), the connection information input by the second user, including:

(1) The second device obtains, from a UI of a system application, the connection information input by the second user.

The UI of the system application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the first device displays the connection information "12345678" or plays the connection information "12345678" by using a sound box, and the second user views the connection information "12345678" or listens to the connection information "12345678". Then, the second user clicks the receiving interface in the UI of the system application shown in FIG. 2-6, and the receiving interface triggers a receiving command. The second device displays an input box in the UI when detecting the receiving command triggered by the receiving interface. As shown in FIG. 2-7, the second user inputs the connection information "12345678" in the input box. Then the second device reads, from the input box, the connection information "12345678" input by the second user.

(2) The second device obtains, from a UI of a third-party application, the connection information input by the second user.

The UI of the third-party application includes a receiving interface, and when the second user clicks the receiving interface, the receiving interface triggers a receiving command. When the second device detects the receiving command triggered by the receiving interface, an input box is displayed in the UI. The second user may input, to the input box, the viewed connection information or the connection information that the second user views or listens to.

For example, the second user clicks the receiving interface in the UI of the third-party application shown in FIG. 2-4, and the receiving interface triggers a receiving command. The second device displays an input box in the UI when detecting the receiving command triggered by the receiving interface. As shown in FIG. 2-8, the second user inputs the connection information "12345678" in the input box. Then the second device reads, from the input box, the connection information "12345678" input by the second user.

Manner 2: The second device scans the graphic code displayed by the first device, and obtains the connection information included in the graphic code.

The second user may enable the scanning module of the second device, and then the second device scans, by using the scanning module, the graphic code displayed by the first device, parses the scanned graphic code, and obtains the connection information included in the scanned graphic code.

Manner 3: The second device establishes a short-range communications connection to the first device, and receives, by using the short-range communications connection, the connection information sent by the first device.

In this embodiment, the first device generates a piece of connection information; the user may input the connection information to the second device, or scan, by using the second device, a graphic code including the connection information on the first device, or make the second device close to the first device so that the second device obtains the connection information in a short-range communications mode. In comparison with finding an identifier of the second device from a large quantity of device search results by the user, this step may save both time for performing a device search by the first device and time for searching for the identifier of the second device by the user, and therefore may reduce time for establishing a wireless connection.

Step 706: The second device generates a first identifier through calculation according to the first information portion included in the connection information.

Specifically, this step may be implemented in either of the following two manners:

Manner 1: The second device performs a hash operation on the first information portion of the connection information to obtain a first hash result, and generates the first identifier according to the first hash result.

An information portion may be truncated from the first hash result and used as the first identifier, or preset information is added to a truncated information portion to form the first identifier, or the first hash result is used as the first identifier, or the like.

Manner 2: The second device adds the first preset information to the first information portion of the connection information to obtain the first construction information, and generates the first identifier according to the first construction information.

Reverse displacement processing or shift processing may be performed on the first construction information to generate the first identifier. For example, assuming that the first information portion of the connection information "12345678" is "1234" and that the first preset information is "hua", the first construction information obtained by the second device by adding the first preset information "hua" to the first information portion "1234" of the connection information may be "1234hua", "hua1234", "12hua34", or the like.

Assuming that the constructed first construction information is "1234hua", the first identifier obtained by performing reverse displacement processing on the first construction information is "auh4321"; or a shift amount is preset, where the shift amount may be two, three, or the like, and then two-position shift processing, three-position shift processing, or the like is performed on the first construction information. For example, when two-position shift processing is performed on the first construction information, the obtained first identifier is "ua1234h", and when three-position shift processing is performed on the first construction information, the obtained first identifier is "hua1234".

In addition to the foregoing first and second manners, the second device may further use other manners of generating the first identifier, for example, may truncate a character string of a preset first character quantity from the connection information as a first character string, and generate the first identifier according to the first character string; or perform a hash operation on the whole connection information to obtain the first identifier.

An implementation manner in which the second device generates the first identifier according to the first character string includes the following manners (1) to (4):

(1) Determine that the first character string is the first identifier.

For example, the preset first character quantity is 6, and the second device truncates a character string "123456" of the first six characters or a character string "345678" of the last six characters from the connection information "12345678" as the first character string, and determines that the first character string "123456" or "345678" is the first identifier.

(2) Use the first character string and a first preset character string to form the first identifier.

For example, if the first character string is "123456", and the first preset character string is "Huawei", the first identifier formed by the first character string and the first preset character string is "123456Huawei" or "Huawei123456".

(3) Perform a hash operation on the first character string to obtain a hash result, and truncate a character string of the preset first character quantity from the hash result as the first identifier.

(4) Perform a hash operation on the first character string to obtain a hash result, truncate a character string of the preset first character quantity from the hash result, and use the truncated character string and the first preset character string to form the first identifier.

Step 707: The second device sends a Test request message, where an action frame in the Test request message carries the first identifier and communications modes supported by the second device.

The second device supports at least one communications mode. The communications modes include AP-STA, GO-Client, and P2P communications modes. The action frame in the Test request message includes an identifier field and a communications mode field, where the identifier field is used to carry the first identifier, and the communications mode field is used to carry the communications modes supported by the second device.

Step 708: The first device receives the Test request message, where the action frame in the Test request message carries the first identifier and the communications modes supported by the second device.

For example, the second device sends a Test request message, where an action frame in the Test request message carries a first identifier "123456" and communications modes supported by the second device, including AP-STA and GO-Client, and the first device receives the Test request message.

Step 709: The first device determines whether the first identifier matches the second identifier, and if the first identifier matches the second identifier, performs step 710.

That the first identifier matches the second identifier means that the first identifier is equal to the second identifier or that the first identifier corresponds to the second identifier.

An identifier relationship table may be preset on the first device, where the identifier relationship table is used to store any two identifiers having a correspondence.

Correspondingly, the first device may determine, in the following manner, whether the first identifier corresponds to the second identifier, including: the first device may search out a corresponding identifier from the identifier relationship table according to the first identifier; if the identifier that is searched out is equal to the second identifier, determine that the first identifier corresponds to the second identifier; otherwise, determine that the first identifier does not correspond to the second identifier.

Step 710: The first device selects a communications mode from the communications modes supported by the second device, sets its own identity according to the selected communications mode, and sends a Test response message to the second device, where the Test response message carries the selected communications mode and the identity of the first device.

Specifically, the first device performs an intersection between communications modes supported by the first device and the communications modes supported by the second device, selects a communications mode from an intersection result, and then sets its own identity according to the selected communications mode. For example, if AP-STA is selected, the first device may set its own identity as an AP; if GO-Client is selected, the first device may set its own identity as a GO; if the P2P communications mode is selected, the first device may set its own identity as an AP. Then the first device sends a Test response message to the second device, where the Test response message carries the selected communications mode and the identity of the first device.

The Test response message is used by the second device to determine to establish a wireless connection to the first device. The second device sends a Test request message, to request to establish a wireless connection to a P2P device, where a first identifier of the P2P device is carried in an action frame in the Test request message. Therefore, in this step, when the first device determines that the first identifier matches the second identifier, the first device may know that the second device requests to establish a wireless connection to the first device, therefore determine that a wireless connection needs to be established to the second device, and send the Test response message to the second device, so as to notify the second device that the first device agrees to establish a wireless connection to the second device.

For example, it is assumed that the action frame in the Test request message sent by the second device carries the first identifier "123456". The first device receives the Test request message, and the generated second identifier is "123456". The first identifier "123456" is the same as the second identifier "123456", and therefore, the first identifier matches the second identifier. The first device determines that a wireless connection needs to be established to the second device, obtains the communications modes supported by the first device, including AP-STA, GO-Client, and P2P communications modes, and performs an intersection between the communications modes supported by the first device and the communications modes AP-STA and GO-Client supported by the second device, where an obtained intersection result includes AP-STA and GO-Client. The first device randomly selects, from the intersection result, a communications mode, which is assumed to be AP-STA, then sets the identity of the first device as an AP, and sends a Test response message to the second device, where the Test response message carries the selected communications mode AP-STA and the identity AP of the first device.

Step 711: The second device receives the Test response message, sets its own identity according to the Test response message, determines to establish a wireless connection to the first device, and performs step 712.

The second device sets its own identity according to the communications mode selected by the first device and the identity of the first device that are carried in the Test response message. For example, the second device receives a Test response message, where the Test response message carries a communications mode AP-STA selected by the second device and an identity AP of the first device, and the second device sets its own identity as a STA according to the communications mode AP-STA selected by the second device and the identity AP of the first device.

Step 712: The second device generates first authentication information according to the second information portion of the connection information.

Content of the first information portion of the connection information may be the same as or different from content of the second information portion. For example, if the connection information is "12345678", the first information portion may be "1234", and the second information portion may be "5678"; or the first information portion may be "123456", and the second information portion may be "345678"; or the like.

Specifically, this step may be implemented in either of the following two manners:

Manner 1: The second device performs a hash operation on the second information portion of the connection information to obtain a second hash result, and generates the second authentication information according to the second hash result.

Manner 2: The second device adds the second preset information to the second information portion of the connection information to obtain the second construction information, and generates the first authentication information according to the second construction information.

In addition to the foregoing first and second manners of generating the first authentication information, the second device may further use other manners of generating the first authentication information. For example, the second device truncates a character string of a preset second character quantity from the connection information as a fourth character string, and generates the first authentication information according to the fourth character string; or determines that the connection information is the first authentication information.

An implementation manner in which the second device generates the first authentication information according to the fourth character string includes the following manners:

Manner 1: Determine that the fourth character string is the first authentication information.

For example, assuming that the preset second character quantity is 4, the first device truncates a character string "1234" of the first four characters or a character string "5678" of the last four characters from the connection information "12345678" as the fourth character string, and uses the fourth character string as the first authentication information.

In the embodiment of the present disclosure, a sum of the preset first character quantity and the second character quantity may be equal to a quantity of characters included in the connection information. Correspondingly, the second device obtains a remaining character string after truncating the first character string of the preset first character quantity from the connection information, where a quantity of characters of the remaining character string is the preset second character quantity, and the remaining character string of the preset second character quantity may be used as the fourth character string. For example, the preset first character quantity is 6, and the preset second character quantity is 2. The second device obtains a remaining character string "78" of the preset second character quantity after truncating the first character string "123456" of the preset first character quantity from the connection information "12345678", and the first device may use the remaining character string "78" of the preset second character quantity as the fourth character string.

Manner 2: Use the fourth character string and a second preset character string to form the first authentication information.

For example, assuming that the fourth character string is "1234" and that the second preset character string is "9860", second authentication information formed by the fourth character string and the second preset character string is "12349860" or "98601234".

Manner 3: Perform a hash operation on the fourth character string to obtain a hash result, and truncate a character string of the preset second character quantity from the hash result as the second authentication information, or determine that the hash result is the first authentication information.

Manner 4: Generate the first authentication information according to the fourth character string and an authentication mode used by the second device.

Specifically, a quantity of characters in the authentication information is determined according to the authentication mode used by the second device; and information padding or information truncation is performed on the fourth character string according to the determined quantity of characters to obtain the second authentication information. For example, the fourth character string is "1234"; assuming that the second device uses a WPS authentication mode, it is determined, according to the WPS authentication mode, that the quantity of characters in the authentication information is eight digits; information "9988" is padded into the fourth character string "1234", and first authentication information "12349988" is obtained. For another example, assuming that the second device uses a 4-way handshake authentication mode, it is determined, according to the 4-way handshake authentication mode, that a quantity of bits in the authentication information is 256 bits, but the fourth character string "1234" includes 32 bits; therefore, 224 bits are padded into the fourth character string, and 256-bit first authentication information is obtained.

Alternatively, a quantity of characters in the authentication information is determined according to the authentication mode used by the second device; a hash operation is performed on the fourth character string to obtain a hash result; and information padding or information truncation is performed on the hash result according to the determined quantity of characters to obtain the second authentication information. For example, the fourth character string is "1234"; a hash operation is performed on the fourth character string "1234" to obtain a hash result "98765432111"; assuming that the second device uses a WPS authentication mode, it is determined, according to the WPS authentication mode, that the quantity of characters in the authentication information is eight digits; and eight digits "98765432" are truncated from the hash result and used as the first authentication information. For another example, assuming that the second device uses a 4-way handshake authentication mode, it is determined, according to the 4-way handshake authentication mode, that a quantity of bits in the authentication information is 256 bits, but the hash result "98765432111" includes 88 bits; therefore, 168 bits are padded into the hash result, and 256-bit first authentication information is obtained.

Step 713: The first device verifies whether the first authentication information of the second device matches the second authentication information of the first device, and if the first authentication information matches the second authentication information, sends confirmation information to the second device, where the confirmation information is used by the second device to determine to establish the wireless connection to the first device.

An authentication mode used by the first device may be the 4-way handshake authentication mode in IEEE 802.11, the WPS authentication mode specified by the WFA, or another authentication mode. For each authentication mode, an authentication message format is specified. For example, for the 4-way handshake authentication mode, it is specified that an authentication message is key information formed by 256 bits, and for the WPS authentication mode, it is specified that an authentication message is eight digits.

When the 4-way handshake authentication mode is used, this step may be: The first device determines that the second authentication information is a PMK of the 4-way handshake authentication mode, and verifies, according to the PMK by using the 4-way handshake authentication mode, whether the first authentication information of the second device matches the second authentication information of the first device.

When the WPS authentication mode is used, this step may be: The first device determines that the second authentication information is a PIN of the WPS authentication mode, and verifies, according to the PIN by using the WPS authentication mode, whether the first authentication information of the second device matches the second authentication information of the first device.

In the process of verification by the first device, the second device performs verification with the first device, so that the first device determines whether the first authentication information of the second device matches the second authentication information of the first device. Specific implementation is: The second device uses the first authentication information as the PMK of the 4-way handshake authentication mode, and performs authentication with the first device according to the PMK by using the 4-way handshake authentication mode; or uses the first authentication information as the PIN of the WPS authentication mode, and performs authentication with the first device according to the PIN by using the WPS authentication mode.

In the process of verification, after receiving the confirmation information sent by the first device, the second device determines, according to the confirmation information, to establish the wireless connection to the first device, and then step 714 is performed.

Step 714: The first device establishes a data connection to the second device, to implement establishment of a wireless connection to the second device.

The wireless connection established by the second device to the first device is an encrypted wireless connection, and the second device and the first device may transmit data by using the encrypted wireless connection. The wireless connection may be a Wi-Fi connection or a Bluetooth connection.

In the embodiment of the present disclosure, a first device generates connection information, and provides the connection information to a second device; the second device generates a first identifier according to the connection information, and sends a Probe request message carrying the first identifier to the first device; the first device determines whether a second identifier stored by the first device matches the first identifier of the second device, and if the first identifier matches the second identifier, establishes a wireless connection to the second device. The second device obtains, in a user input manner or another manner, the connection information generated by the first device, generates the first identifier according to the connection information, and determines, by using the first identifier, a device that needs to be connected to. Therefore, manually selecting the device that needs to be connected to by a user is avoided, efficiency of establishing a wireless connection is improved, and efficiency of data transmission is improved. The first device and the second device further perform mutual authentication by using first authentication information and second authentication information. Therefore, the established wireless connection is more secure, and security of data transmission is improved.

An embodiment of the present disclosure provides a method for establishing a wireless connection. In the embodiment of the present disclosure, a first device and a second device are NAN devices. A first message and a second message are SDF messages, and connection information may be generated and provided by a system application.

Embodiment 8

Figures 2, 3, 4, 5, 6, 7, 8:
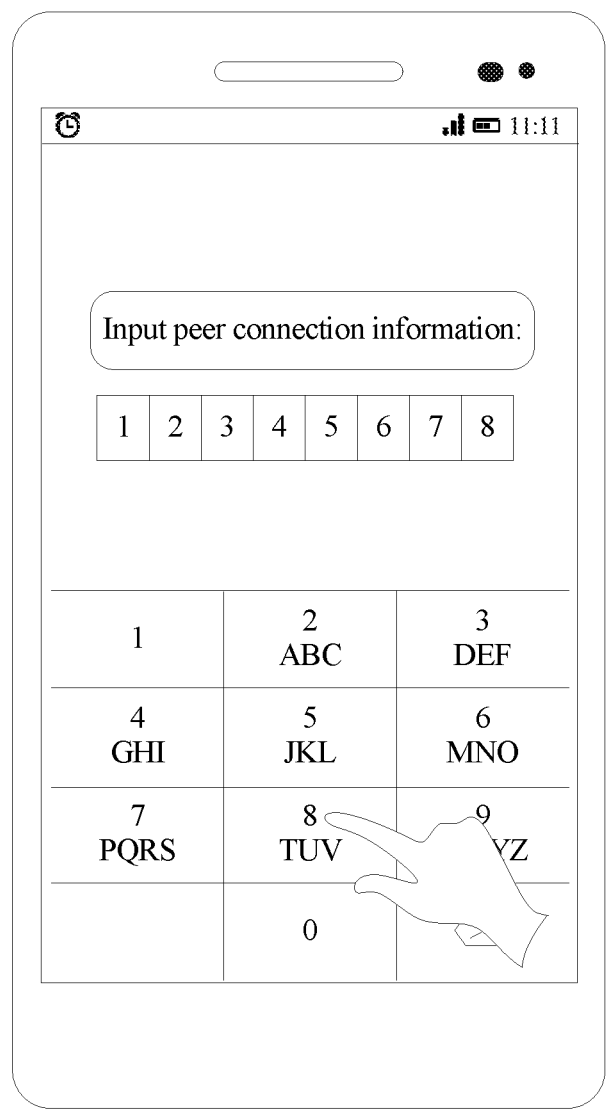

Referring to FIG. 8, an embodiment of the present disclosure provides a device for establishing a wireless connection, where the device is a first device and is configured to establish a wireless connection to a second device, and the first device includes:

a generation module 801, configured to generate, after an operation instruction of a first user is received, connection information according to the operation instruction, where the first user is a user corresponding to the first device;

a providing module 802, configured to provide the connection information to the second device near the first device, so that the second device obtains a first identifier through calculation according to a first information portion of the connection information by using a preset algorithm, where the first information portion is a portion or all of the connection information;

a receiving module 803, configured to receive a first message that is sent by the second device according to the connection information, where the first message carries the first identifier;

a determining module 804, configured to determine whether the first identifier matches a second identifier of the first device, where the second identifier is equal to or corresponds to a result that is generated through calculation according to the first information portion;

a sending module 805, configured to send a second message to the second device if the determining module 804 determines that the first identifier matches the second identifier of the first device, where the second message is a response message for the first message; and an establishing module 806, configured to establish a wireless connection to the second device.

Further, the first device further includes:

a first calculation module, configured to generate the second identifier of the first device through calculation according to the first information portion of the connection information by using the preset algorithm.

Preferably, the first calculation module includes:

a first hash unit, configured to perform a hash operation on the first information portion of the connection information to obtain a first hash result, and generate the second identifier of the first device according to the first hash result; or a first construction unit, configured to add first preset information to the first information portion of the connection information to obtain first construction information, and generate the second identifier of the first device according to the first construction information.

Further, in addition to the foregoing two manners, the first calculation module may further use other manners of calculating the second identifier. For example, the first calculation module may truncate a character string of a preset first character quantity from the connection information as a second character string, and generate the second identifier according to the second character string; or perform a hash operation on the whole connection information to obtain the second identifier.

Preferably, an implementation manner in which the first calculation module generates the second identifier according to the second character string may include the following manners (1) to (4):

(1) Determine that the second character string is the second identifier.

For example, the preset first character quantity is 6, and the connection information is "12345678"; the first device truncates a character string "123456" of the first six characters or a character string "345678" of the last six characters from the connection information "12345678" as the second character string, and determines that the second character string "123456" or "345678" is the second identifier.

(2) Use the second character string and a first preset character string to form the second identifier.

For example, assuming that the second character string is "123456" and that the first preset character string is "Huawei", the second identifier formed by the second character string and the first preset character string is "123456Huawei" or "Huawei123456".

(3) Perform a hash operation on the second character string to obtain a hash result, and truncate a character string of the preset first character quantity from the hash result as the second identifier.

(4) Perform a hash operation on the second character string to obtain a hash result, truncate a character string of the preset first character quantity from the hash result, and use the truncated character string and the preset character string to form the second identifier.

Preferably, the determining module 804 is configured to determine, if the first identifier is equal to the second identifier of the first device or the first identifier corresponds to the second identifier of the first device, that the first identifier matches the second identifier of the first device.

An identifier relationship table may be preset on the first device, where the identifier relationship table is used to store any two identifiers having a correspondence.

Preferably, the determining module may determine, in the following manner, whether the first identifier corresponds to the second identifier, including: the determining module may search out a corresponding identifier from the identifier relationship table according to the first identifier; if the identifier that is searched out is equal to the second identifier, determine that the first identifier corresponds to the second identifier; otherwise, determine that the first identifier does not correspond to the second identifier.

Preferably, the providing module 802 includes:

a displaying or playing unit, configured to display or play the connection information, so that a user inputs the connection information to the second device; or a displaying unit, configured to generate, according to the connection information, a graphic code including the connection information, and display the graphic code, so that the second device scans the graphic code and obtains the connection information; or a sending unit, configured to establish a short-range communications connection to the second device, and send the connection information to the second device by using the short-range communications connection.

The providing module 802 may include a sound box, and the connection information is played by using the sound box.

The first message is a probe request Probe request message, and an SSID field in the Probe request message carries the first identifier, or a reserved field in the Probe request message carries the first identifier; or the first message is a Test request message, and an Action Frame in the Test request message carries the first identifier.

Further, the first device further includes:

a setting module, configured to set an identity of the first device as an access point AP, and then perform an operation of receiving a Probe request message sent by the second device.

Preferably, the establishing module 806 includes:

a verifying unit, configured to verify whether first authentication information of the second device matches second authentication information of the first device, where the first authentication information is generated by the second device through calculation according to a second information portion of the connection information, the second information portion is a portion or all of the connection information, and the second authentication information is equal to or corresponds to a result generated through calculation according to the second information portion; and an establishing unit, configured to: if it is verified that the first authentication information matches the second authentication information, send confirmation information to the second device, and establish the wireless connection to the second device, where the confirmation information is used by the second device to determine to establish the wireless connection to the first device.

Preferably, the verifying unit includes:

a first verifying subunit, configured to determine that the second authentication information of the first device is a PMK of a 4-way handshake authentication mode, and verify, according to the PMK by using the 4-way handshake authentication mode, whether the first authentication information of the second device matches the second authentication information of the first device; or a second verifying subunit, configured to determine that the second authentication information of the first device is a PIN of a WPS authentication mode, and verify, according to the PIN by using the WPS authentication mode, whether the first authentication information of the second device matches the second authentication information of the first device.

Further, the first device further includes:

a second calculation module, configured to generate the second authentication information of the first device through calculation according to the second information portion of the connection information.

Preferably, the second calculation module includes:

a second hash unit, configured to perform a hash operation on the second information portion of the connection information to obtain a second hash result, and generate the second authentication information of the first device according to the second hash result; or a second construction unit, configured to add second preset information to the second information portion of the connection information to obtain second construction information, and generate the second authentication information of the first device according to the second construction information.

In addition to the foregoing first and second manners of generating the second authentication information, the second calculation module may further use other manners of generating the second authentication information. For example, the second calculation module truncates a character string of a preset second character quantity from the connection information as a fourth character string, and generates the second authentication information according to the fourth character string; or determines that the connection information is the second authentication information.

An implementation manner in which the second calculation module generates the second authentication information according to the fourth character string includes the following manners:

Manner 1: Determine that the fourth character string is the second authentication information.

For example, assuming that the preset second character quantity is 4, the second calculation module truncates a character string "1234" of the first four characters or a character string "5678" of the last four characters from the connection information "12345678" as the fourth character string, and uses the fourth character string as the second authentication information.

In the embodiment of the present disclosure, a sum of the preset first character quantity and the second character quantity may be equal to a quantity of characters included in the connection information. Correspondingly, the second calculation module obtains a remaining character string after truncating the first character string of the preset first character quantity from the connection information, where a quantity of characters of the remaining character string is the preset second character quantity, and the remaining character string of the preset second character quantity may be used as the fourth character string. For example, the preset first character quantity is 6, and the preset second character quantity is 2. The second calculation module obtains a remaining character string "78" of the preset second character quantity after truncating the first character string "123456" of the preset first character quantity from the connection information "12345678", and the second calculation module may use the remaining character string "78" of the preset second character quantity as the fourth character string.

Manner 2: Use the fourth character string and a second preset character string to form the second authentication information.

For example, assuming that the fourth character string is "1234" and that the second preset character string is "9860", the second authentication information formed by the fourth character string and the second preset character string is "12349860" or "98601234".

Manner 3: Perform a hash operation on the fourth character string to obtain a hash result, and truncate a character string of the preset second character quantity from the hash result as the second authentication information, or determine that the hash result is the second authentication information.

Manner 4: Generate the second authentication information according to the fourth character string and an authentication mode used by the second device.

Specifically, a quantity of characters in the authentication information is determined according to the authentication mode used by the first device; and information padding or information truncation is performed on the fourth character string according to the determined quantity of characters to obtain the second authentication information. For example, the fourth character string is "1234"; assuming that the first device uses the WPS authentication mode, it is determined, according to the WPS authentication mode, that the quantity of characters in the authentication information is eight digits; information "9988" is padded into the fourth character string "1234", and first authentication information "12349988" is obtained. For another example, assuming that the first device uses the 4-way handshake authentication mode, it is determined, according to the 4-way handshake authentication mode, that a quantity of bits in the authentication information is 256 bits, but the fourth character string "1234" includes 32 bits; therefore, 224 bits are padded into the fourth character string, and 256-bit first authentication information is obtained.

Alternatively, a quantity of characters in the authentication information is determined according to the authentication mode used by the first device; a hash operation is performed on the fourth character string to obtain a hash result; and information padding or information truncation is performed on the hash result according to the determined quantity of characters to obtain the second authentication information. For example, the fourth character string is "1234"; a hash operation is performed on the fourth character string "1234" to obtain a hash result "98765432111"; assuming that the second device uses the WPS authentication mode, it is determined, according to the WPS authentication mode, that the quantity of characters in the authentication information is eight digits; and eight digits "98765432" are truncated from the hash result and used as the first authentication information. For another example, assuming that the second device uses the 4-way handshake authentication mode, it is determined, according to the 4-way handshake authentication mode, that a quantity of bits in the authentication information is 256 bits, but the hash result "98765432111" includes 88 bits; therefore, 168 bits are padded into the hash result, and 256-bit second authentication information is obtained.

Further, the first device further includes:

a first generation module, configured to generate the first information portion of the connection information according to the second identifier of the first device;

a second generation module, configured to generate the second information portion of the connection information according to the second authentication information of the first device; and a construction module, configured to construct the connection information according to the first information portion and the second information portion.

Preferably, the first generation module includes:

a first truncation unit, configured to perform truncation on the second identifier of the first device to obtain an information portion, and determine that the information portion is the first information portion of the connection information; or a first operation unit, configured to perform first operation processing on the second identifier of the first device to obtain the first information portion of the connection information, where the first operation processing is an operation inverse to that of generating the second identifier.

Preferably, the second generation module includes:

a second truncation unit, configured to perform truncation on the second authentication information of the first device to obtain an information portion, and determine that the information portion is the second information portion of the connection information; or a second operation unit, configured to perform second operation processing on the second authentication information of the first device to obtain the second information portion of the connection information, where the second operation processing is an operation inverse to that of generating the first authentication information.

Preferably, the establishing module 806 is configured to perform open authentication with the second device, and establish a data connection to the second device after the authentication is successful, so as to implement establishment of the wireless connection to the second device.

The wireless connection is a Wireless Fidelity Wi-Fi connection or a Bluetooth connection.

In the embodiment of the present disclosure, a first device generates connection information, and provides the connection information to a second device; the second device generates a first identifier according to the connection information, and sends a first message carrying the first identifier to the first device; the first device generates a second identifier according to the connection information, and if the first identifier matches the second identifier, establishes a wireless connection to the second device. In this way, a user does not need to select a device from a large quantity of search results, efficiency of establishing a wireless connection is improved, and efficiency of data transmission is improved.

Embodiment 9

Figures 2, 3, 4, 5, 6, 7, 8, 9:
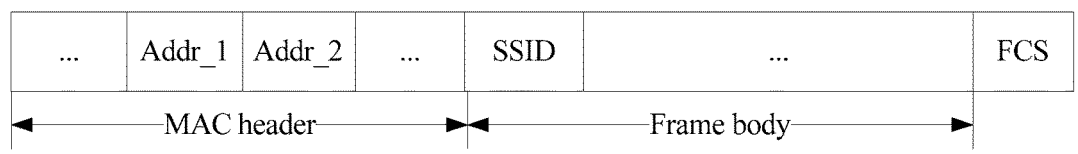

Referring to FIG. 9, an embodiment of the present disclosure provides a device for establishing a wireless connection, where the device is a second device and is configured to establish a wireless connection to a first device, and the second device includes:

an obtaining module 901, configured to obtain connection information provided by the first device near the second device, where the connection information is generated by the first device according to an operation instruction of a first user after the first device receives the operation instruction, and the first user is a user corresponding to the first device;

a calculation module 902, configured to generate a first identifier through calculation according to a first information portion of the connection information, where the first information portion is a portion or all of the connection information;

a sending module 903, configured to send a first message to the first device, where the first message carries the first identifier, so that the first device determines whether the first identifier matches a second identifier, where the second identifier is equal to or corresponds to a result that is generated through calculation according to the first information portion;

a receiving module 904, configured to receive a second message sent by the first device when the first identifier matches the second identifier, where the second message is a response message for the first message; and an establishing module 905, configured to establish a wireless connection to the first device.

Preferably, the calculation module 902 includes:

a first hash unit, configured to perform a hash operation on the first information portion of the connection information to obtain a first hash result, and generate the first identifier according to the first hash result; or a first adding unit, configured to add first preset information to the first information portion of the connection information to obtain first construction information, and generate the first identifier according to the first construction information.

In addition to the foregoing first and second manners, the calculation module 902 may further use other manners of generating the first identifier, for example, may truncate a character string of a preset first character quantity from the connection information as a first character string, and generate the first identifier according to the first character string; or perform a hash operation on the whole connection information to obtain the first identifier.

An implementation manner in which the calculation module 902 generates the first identifier according to the first character string includes the following manners (1) to (4):

(1) Determine that the first character string is the first identifier.

For example, the preset first character quantity is 6, and the calculation module 902 truncates a character string "123456" of the first six characters or a character string "345678" of the last six characters from the connection information "12345678" as the first character string, and determines that the first character string "123456" or "345678" is the first identifier.

(2) Use the first character string and a first preset character string to form the first identifier.

For example, if the first character string is "123456", and the first preset character string is "Huawei", the first identifier formed by the first character string and the first preset character string is "123456Huawei" or "Huawei123456".

(3) Perform a hash operation on the first character string to obtain a hash result, and truncate a character string of the preset first character quantity from the hash result as the first identifier.

(4) Perform a hash operation on the first character string to obtain a hash result, truncate a character string of the preset first character quantity from the hash result, and use the truncated character string and the first preset character string to form the first identifier.

Preferably, the establishing module 905 includes:

a verifying unit, configured to perform verification with the first device, so that the first device determines whether first authentication information of the second device matches second authentication information of the first device, where the first authentication information is generated through calculation according to a second information portion of the connection information, and the second authentication information is equal to or corresponds to a result generated through calculation according to the second information portion of the connection information;

a first receiving unit, configured to receive confirmation information sent by the first device when the first device verifies that the first authentication information matches the second authentication information; and an establishing unit, configured to establish the wireless connection to the first device according to the confirmation information.

Preferably, the verifying unit includes:

a first verifying subunit, configured to determine that the first authentication information is a PMK of a 4-way handshake authentication mode, and perform verification with the first device according to the PMK by using the 4-way handshake authentication mode; or a second verifying subunit, configured to determine that the first authentication information is a PIN of a Wireless Fidelity protected setup WPS authentication mode, and perform verification with the first device according to the PIN by using the WPS authentication mode.

Further, the second device further includes:

a generation module, configured to generate the first authentication information through calculation according to the second information portion of the connection information.

Preferably, the generation module includes:

a second hash unit, configured to perform a hash operation on the second information portion of the connection information to obtain a second hash result, and generate the first authentication information according to the second hash result; or a second adding unit, configured to add second preset information to the second information portion of the connection information to obtain second construction information, and generate the first authentication information according to the second construction information.

In addition to the foregoing first and second manners of generating the first authentication information, the generation module may further use other manners of generating the first authentication information. For example, the generation module truncates a character string of a preset second character quantity from the connection information as a fourth character string, and generates the first authentication information according to the fourth character string; or determines that the connection information is the first authentication information.

An implementation manner in which the generation module generates the first authentication information according to the fourth character string includes the following manners:

Manner 1: Determine that the fourth character string is the first authentication information.

For example, assuming that the preset second character quantity is 4, the first device truncates a character string "1234" of the first four characters or a character string "5678" of the last four characters from the connection information "12345678" as the fourth character string, and uses the fourth character string as the first authentication information.

In the embodiment of the present disclosure, a sum of the preset first character quantity and the second character quantity may be equal to a quantity of characters included in the connection information. Correspondingly, the generation module obtains a remaining character string after truncating the first character string of the preset first character quantity from the connection information, where a quantity of characters of the remaining character string is the preset second character quantity, and the remaining character string of the preset second character quantity may be used as the fourth character string. For example, the preset first character quantity is 6, and the preset second character quantity is 2. The generation module obtains a remaining character string "78" of the preset second character quantity after truncating the first character string "123456" of the preset first character quantity from the connection information "12345678", and the first device may use the remaining character string "78" of the preset second character quantity as the fourth character string.

Manner 2: Use the fourth character string and a second preset character string to form the first authentication information.

For example, assuming that the fourth character string is "1234" and that the second preset character string is "9860", second authentication information formed by the fourth character string and the second preset character string is "12349860" or "98601234".

Manner 3: Perform a hash operation on the fourth character string to obtain a hash result, and truncate a character string of the preset second character quantity from the hash result as the first authentication information, or determine that the hash result is the first authentication information.

Manner 4: Generate the first authentication information according to the fourth character string and an authentication mode used by the second device.

Specifically, a quantity of characters in the authentication information is determined according to the authentication mode used by the second device; and information padding or information truncation is performed on the fourth character string according to the determined quantity of characters to obtain the second authentication information. For example, the fourth character string is "1234"; assuming that the second device uses the WPS authentication mode, it is determined, according to the WPS authentication mode, that the quantity of characters in the authentication information is eight digits; information "9988" is padded into the fourth character string "1234", and first authentication information "12349988" is obtained. For another example, assuming that the second device uses the 4-way handshake authentication mode, it is determined, according to the 4-way handshake authentication mode, that a quantity of bits in the authentication information is 256 bits, but the fourth character string "1234" includes 32 bits; therefore, 224 bits are padded into the fourth character string, and 256-bit first authentication information is obtained.

Alternatively, a quantity of characters in the authentication information is determined according to the authentication mode used by the second device; a hash operation is performed on the fourth character string to obtain a hash result; and information padding or information truncation is performed on the hash result according to the determined quantity of characters to obtain the second authentication information. For example, the fourth character string is "1234"; a hash operation is performed on the fourth character string "1234" to obtain a hash result "98765432111"; assuming that the second device uses the WPS authentication mode, it is determined, according to the WPS authentication mode, that the quantity of characters in the authentication information is eight digits; and eight digits "98765432" are truncated from the hash result and used as the first authentication information. For another example, assuming that the second device uses the 4-way handshake authentication mode, it is determined, according to the 4-way handshake authentication mode, that a quantity of bits in the authentication information is 256 bits, but the hash result "98765432111" includes 88 bits; therefore, 168 bits are padded into the hash result, and 256-bit first authentication information is obtained.

Preferably, the obtaining module 901 includes:

a second receiving unit, configured to receive the connection information of the first device that is input by a user; or a scanning unit, configured to scan a graphic code displayed by the first device, and obtain the connection information of the first device that is included in the graphic code; or a third receiving unit, configured to establish a short-range communications connection to the first device, and receive, by using the short-range communications connection, the connection information sent by the first device.

The first message is a probe request Probe request message, and a service set identifier SSID field in the Probe request message carries the first identifier, or a reserved field in the Probe request message carries the first identifier; or the first message is a test request Test request message, and an action frame Action Frame in the Test request message carries the first identifier.

Preferably, the establishing module 905 is configured to perform open authentication with the first device, and establish the wireless connection to the first device after the authentication is successful.

The wireless connection is a Wireless Fidelity Wi-Fi connection or a Bluetooth connection.

In the embodiment of the present disclosure, a second device obtains connection information provided by a first device, generates a first identifier according to the connection information, and sends a first message carrying the first identifier to the first device, so that the first device determines whether the first identifier matches a second identifier of the first device; and if the first identifier matches the second identifier, the second device establishes a wireless connection to the first device. In this way, a user does not need to select a device from a large quantity of search results, efficiency of establishing a wireless connection is improved, and efficiency of data transmission is improved.

Embodiment 10

Figures 2, 3, 4, 5, 6, 7, 8, 9, 10:
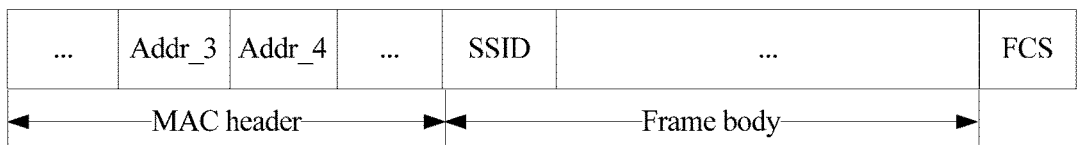
Figure 3:
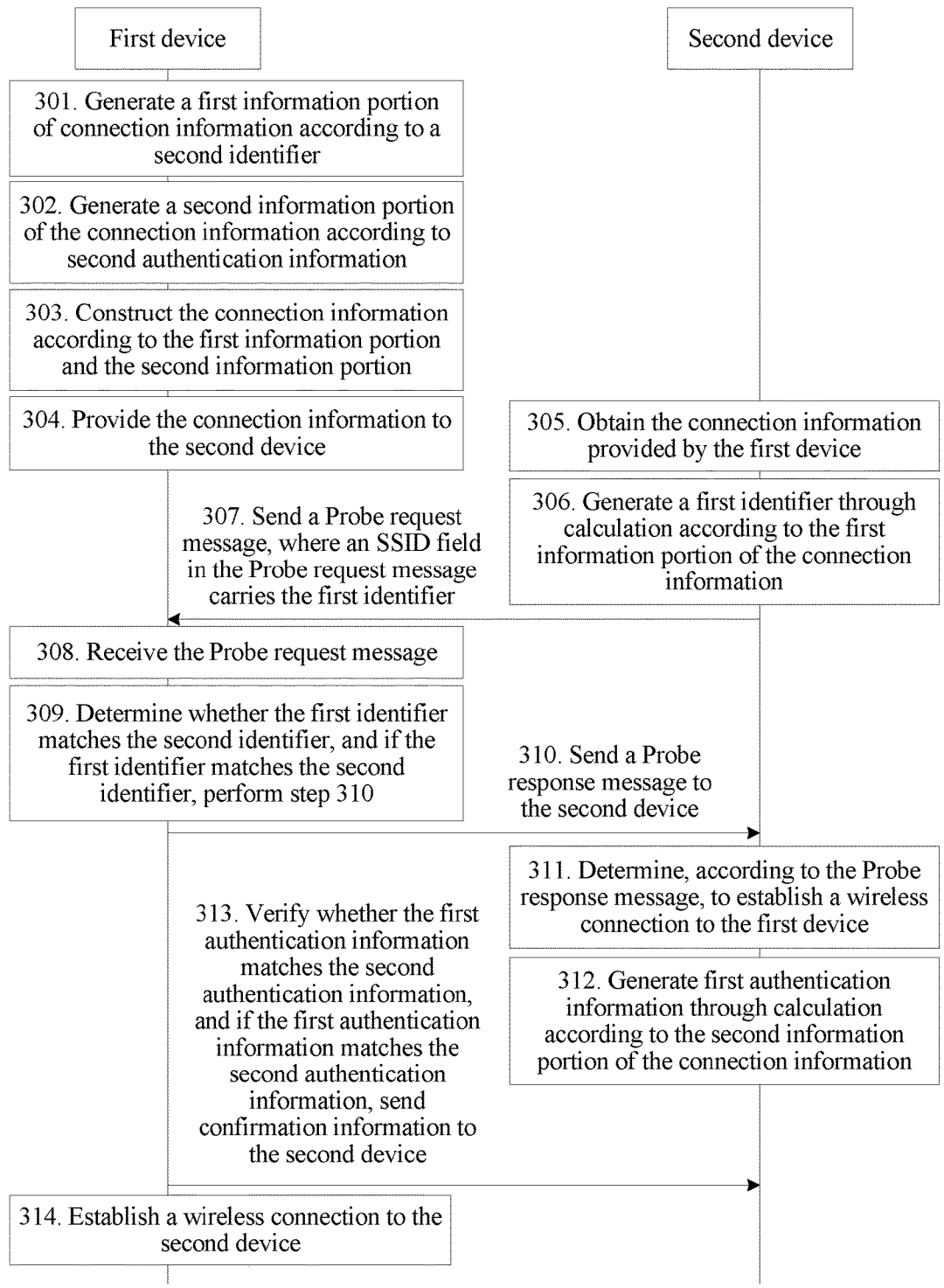
Figures 1, 4:
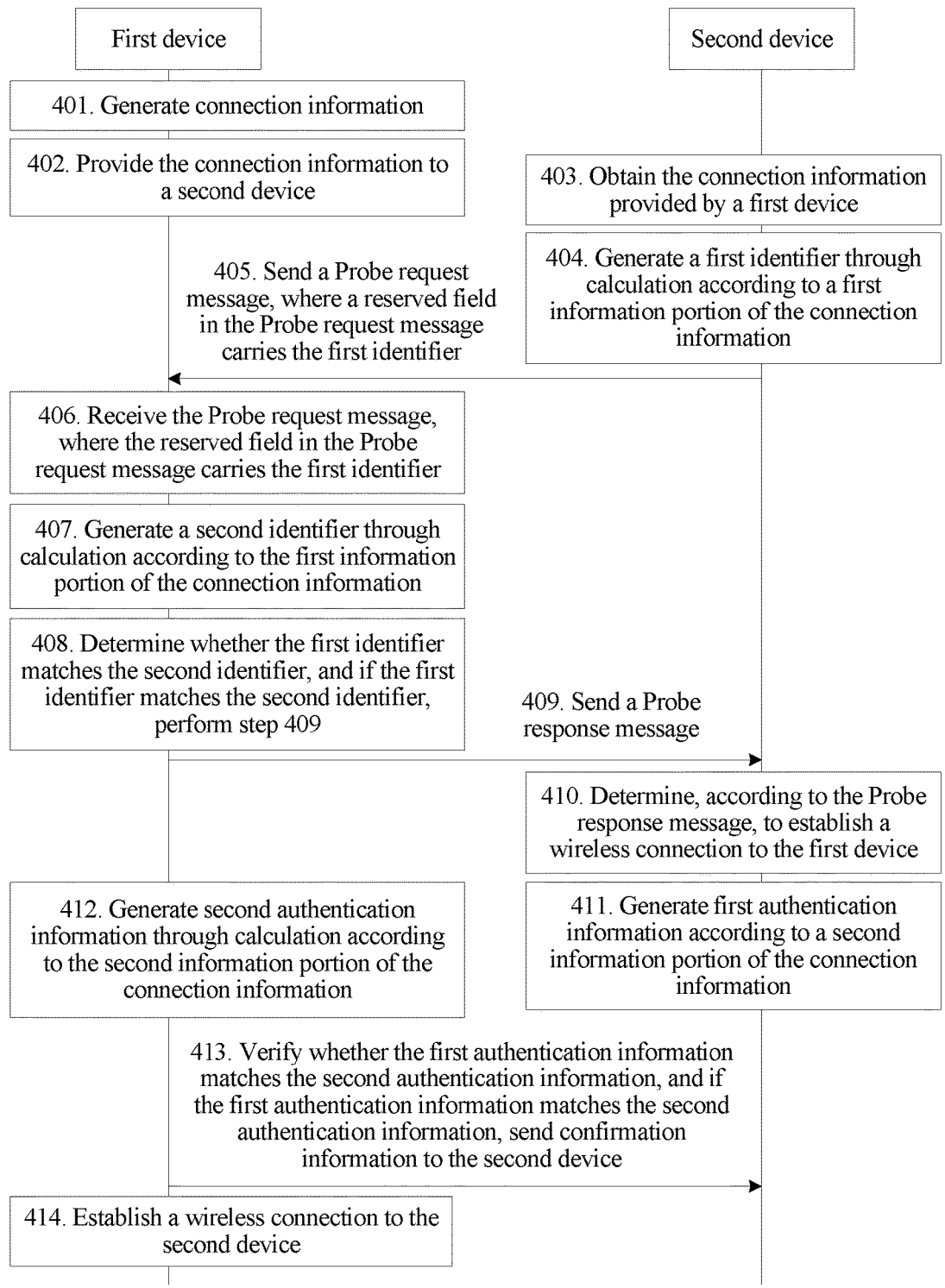
Figures 2, 4:
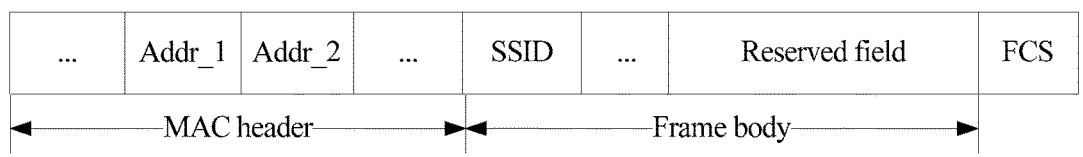
Figures 3, 4:
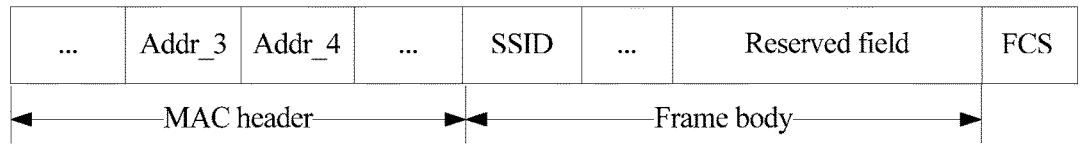
Figure 5:
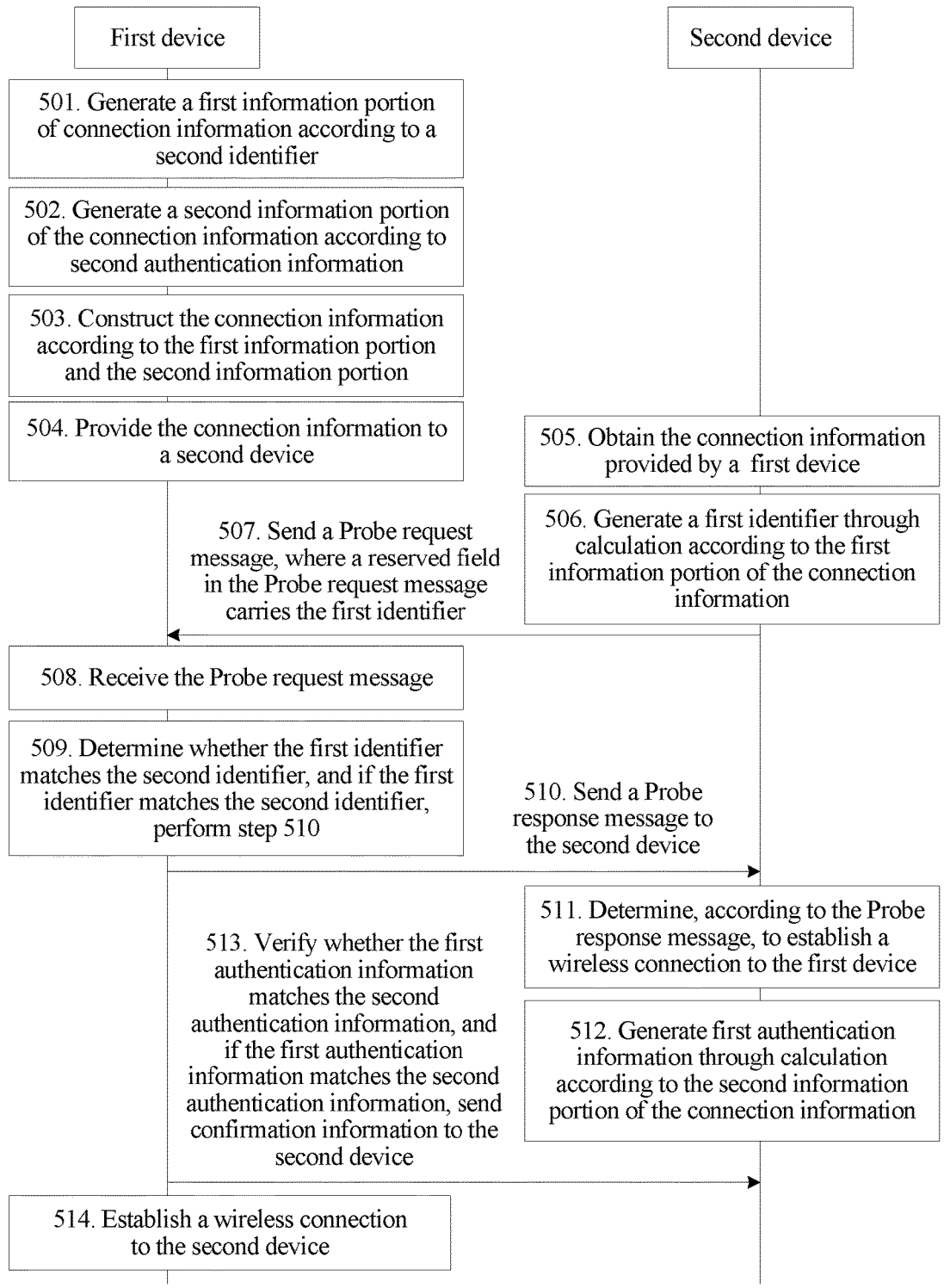
Figures 1, 6:
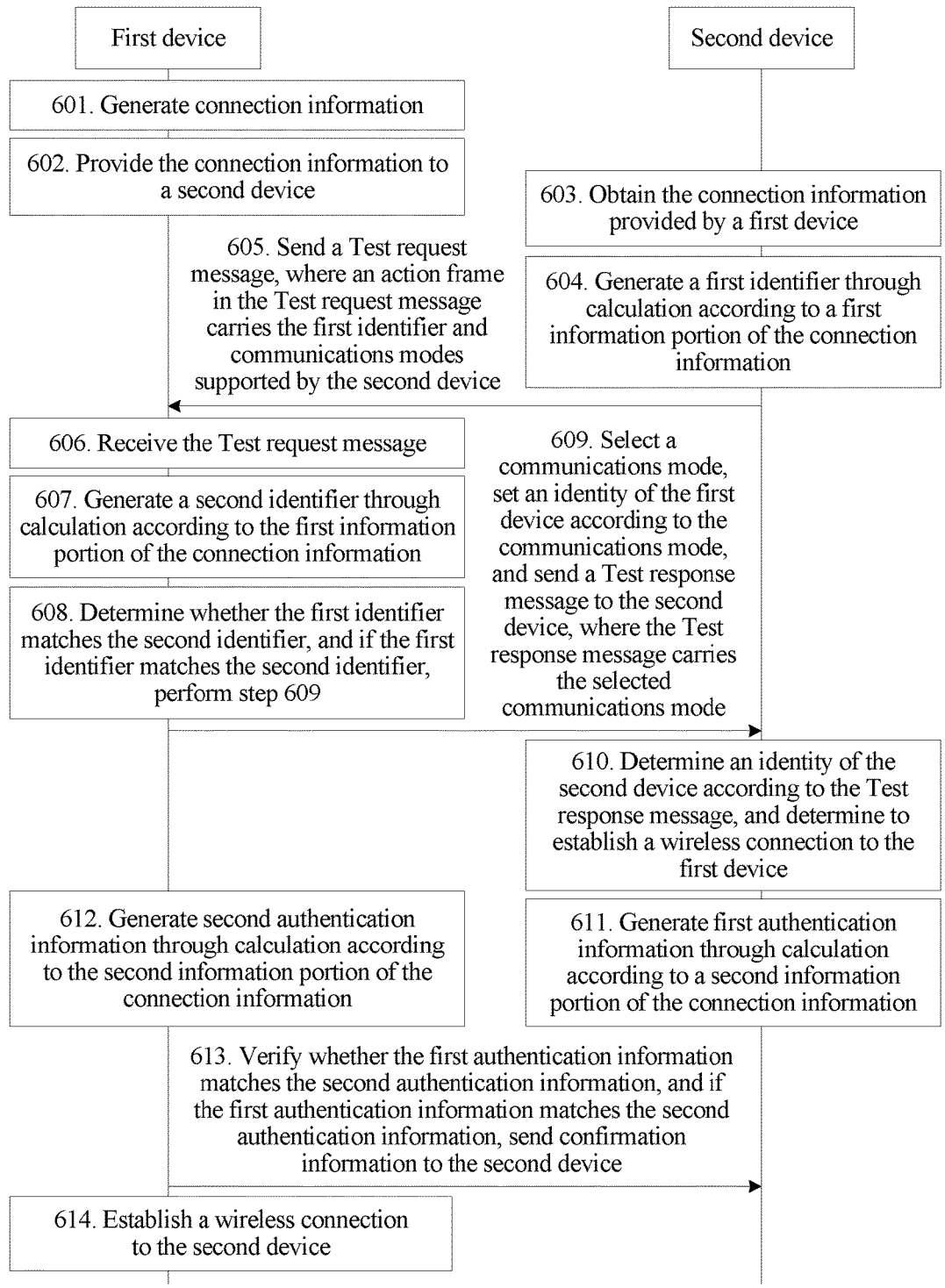
Figures 2, 6:
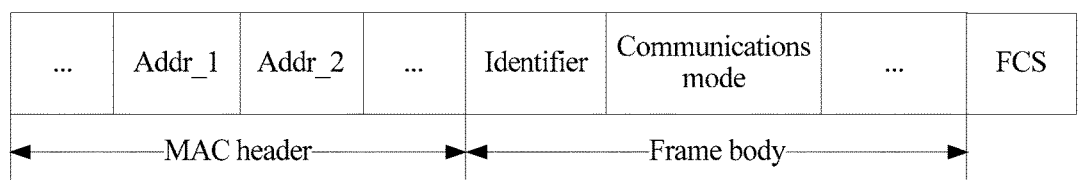
Figures 3, 6:
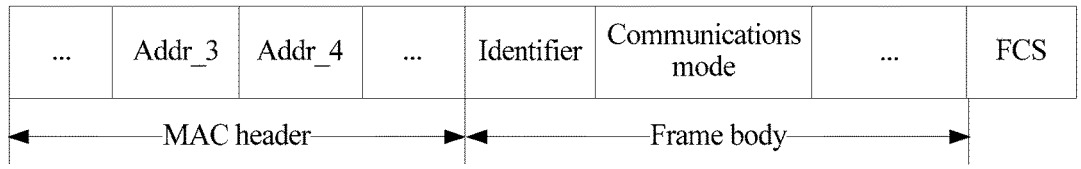
Figure 7:
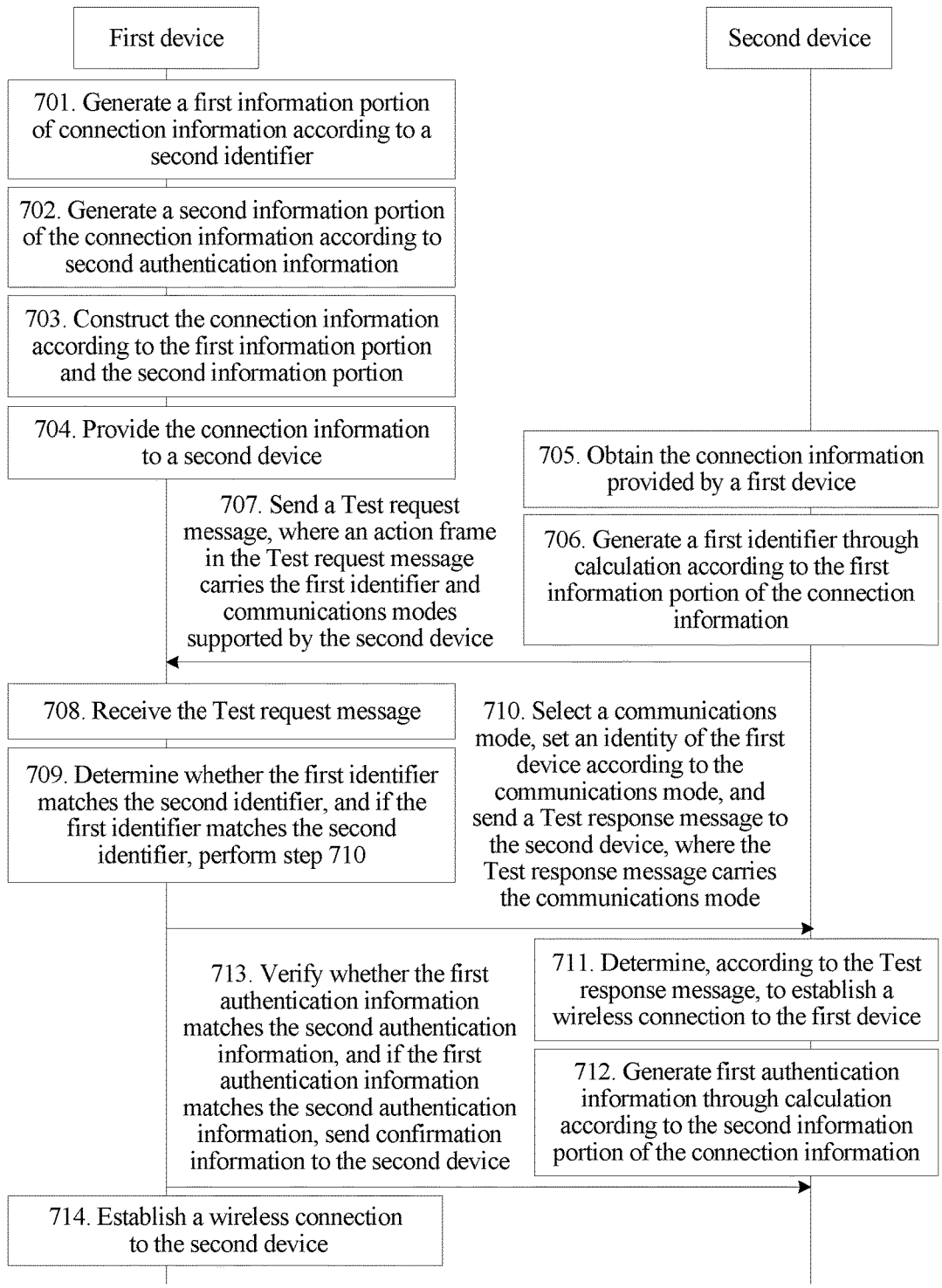
Figure 8:
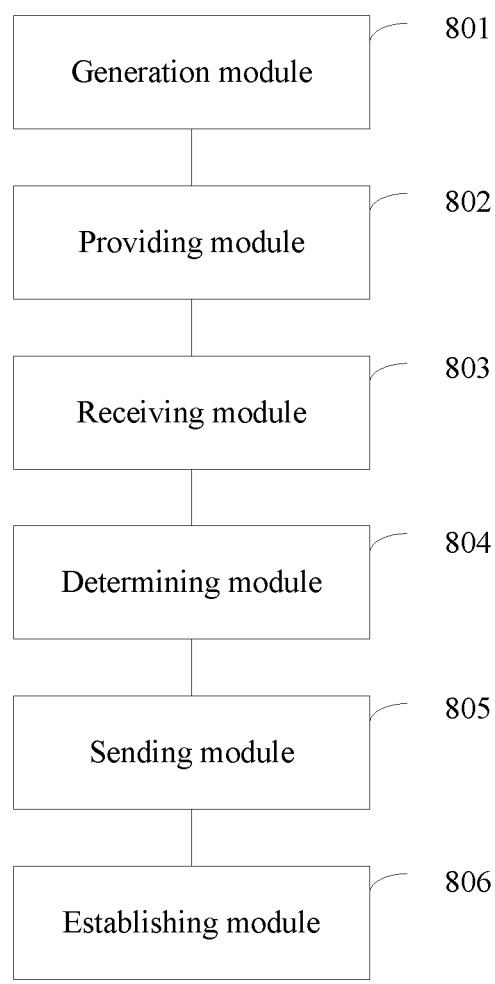
Figure 9:
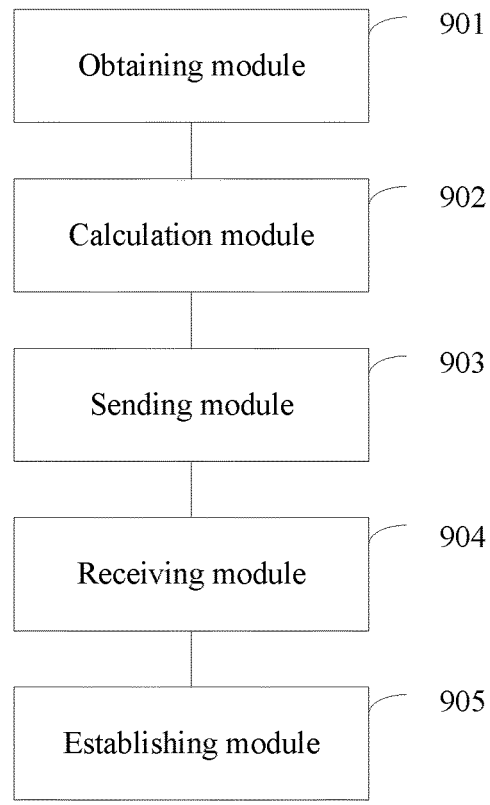
Figure 10:
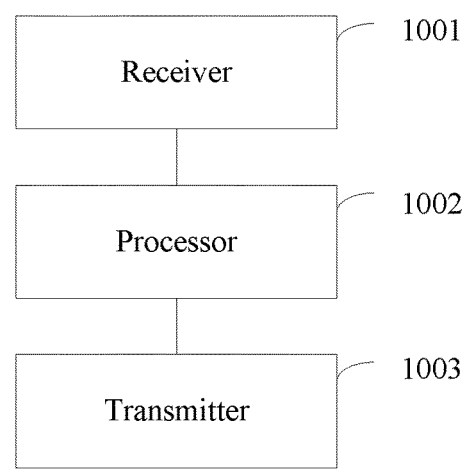

Referring to FIG. 10, an embodiment of the present disclosure provides a device, where the device is a first device and is configured to establish a wireless connection to a second device, and the first device includes a receiver 1001, a processor 1002, and a transmitter 1003, where the processor 1002 is configured to: after an operation instruction of a first user is received, generate connection information according to the operation instruction, and provide the connection information to the second device near the first device, so that the second device obtains a first identifier through calculation according to a first information portion of the connection information by using a preset algorithm, where the first information portion is a portion or all of the connection information;

the receiver 1001 is configured to receive a first message that is sent by the second device according to the connection information, where the first message carries the first identifier;

the processor 1002 is further configured to determine whether the first identifier received by the receiver matches a second identifier of the first device, where the second identifier is equal to or corresponds to a result that is generated through calculation according to the first information portion;

the transmitter 1003 is configured to send a second message to the second device if a result determined by the processor is a match, where the second message is a response message for the first message; and the processor 1002 is further configured to establish a wireless connection to the second device.

Further, the first device further includes a touch display. The first device receives an operation instruction corresponding to an operation of the user on the touch display, and generates connection information according to the operation instruction.

Further, the processor 1002 is further configured to generate the second identifier of the first device through calculation according to the first information portion of the connection information by using the preset algorithm.

Preferably, the operation of generating the second identifier of the first device by the processor 1002 through calculation according to the first information portion of the connection information includes:

performing a hash operation on the first information portion of the connection information to obtain a first hash result, and generating the second identifier of the first device according to the first hash result; or adding first preset information to the first information portion of the connection information to obtain first construction information, and generating the second identifier of the first device according to the first construction information.

Preferably, the operation of determining, by the processor 1002, whether the first identifier received by the receiver matches a second identifier of the first device, includes:

if the first identifier is equal to the second identifier of the first device or the first identifier corresponds to the second identifier of the first device, determining that the first identifier matches the second identifier of the first device.

Preferably, the operation of providing the connection information by the processor 1002 to the second device includes:

displaying or playing the connection information, so that a user inputs the connection information to the second device; or generating, according to the connection information, a graphic code including the connection information, and displaying the graphic code, so that the second device scans the graphic code and obtains the connection information; or establishing a short-range communications connection to the second device, and sending the connection information to the second device by using the short-range communications connection.

The first message is a probe request Probe request message, and a service set identifier SSID field in the Probe request message carries the first identifier, or a reserved field in the Probe request message carries the first identifier; or the first message is a test request Test request message, and an action frame Action Frame in the Test request message carries the first identifier.

Further, the processor 1002 is further configured to set a module, and configured to set an identity of the first device as an access point AP, and then perform an operation of receiving a Probe request message sent by the second device.

Preferably, the operation of establishing a wireless connection by the processor 1002 to the second device includes:

verifying whether first authentication information of the second device matches second authentication information of the first device, where the first authentication information is generated by the second device through calculation according to a second information portion of the connection information, the second information portion is a portion or all of the connection information, and the second authentication information is equal to or corresponds to a result generated through calculation according to the second information portion; and if it is verified that the first authentication information matches the second authentication information, sending confirmation information to the second device, and establishing the wireless connection to the second device, where the confirmation information is used by the second device to determine to establish the wireless connection to the first device.

Preferably, the operation of verifying, by the processor 1002, whether first authentication information of the second device matches second authentication information of the first device, includes:

determining that the second authentication information of the first device is a PMK of a 4-way handshake authentication mode, and verifying, according to the PMK by using the 4-way handshake authentication mode, whether the first authentication information of the second device matches the second authentication information of the first device; or determining that the second authentication information of the first device is a PIN of a Wireless Fidelity protected setup WPS authentication mode, and verifying, according to the PIN by using the WPS authentication mode, whether the first authentication information of the second device matches the second authentication information of the first device.

Further, the processor 1002 is further configured to generate the second authentication information of the first device through calculation according to the second information portion of the connection information.

Preferably, the operation of generating the second authentication information of the first device by the processor 1002 through calculation according to the second information portion of the connection information includes:

performing a hash operation on the second information portion of the connection information to obtain a second hash result, and generating the second authentication information of the first device according to the second hash result; or adding second preset information to the second information portion of the connection information to obtain second construction information, and generating the second authentication information of the first device according to the second construction information.

Further, the processor 1002 is further configured to: generate the first information portion of the connection information according to the second identifier of the first device; generate the second information portion of the connection information according to the second authentication information of the first device; and construct the connection information according to the first information portion and the second information portion.

Preferably, the operation of generating the first information portion of the connection information by the processor 1002 according to the second identifier of the first device includes:

performing truncation on the second identifier of the first device to obtain an information portion, and determining that the information portion is the first information portion of the connection information; or performing first operation processing on the second identifier of the first device to obtain the first information portion of the connection information, where the first operation processing is an operation inverse to that of generating the second identifier.

Preferably, the operation of generating the second information portion of the connection information by the processor 1002 according to the second authentication information of the first device includes:

performing truncation on the second authentication information of the first device to obtain an information portion, and determining that the information portion is the second information portion of the connection information; or performing second operation processing on the second authentication information of the first device to obtain the second information portion of the connection information, where the second operation processing is an operation inverse to that of generating the first authentication information.

Preferably, the operation of establishing a wireless connection by the processor 1002 to the second device includes:

performing open authentication with the second device, and establishing the wireless connection to the second device after the authentication is successful.

The wireless connection is a Wireless Fidelity Wi-Fi connection or a Bluetooth connection.

In the embodiment of the present disclosure, a first device generates connection information, and provides the connection information to a second device; the second device generates a first identifier according to the connection information, and sends a first message carrying the first identifier to the first device; the first device generates a second identifier according to the connection information, and if the first identifier matches the second identifier, establishes a wireless connection to the second device. In this way, a user does not need to select a device from a large quantity of search results, efficiency of establishing a wireless connection is improved, and efficiency of data transmission is improved.

Embodiment 11

Figure 11:
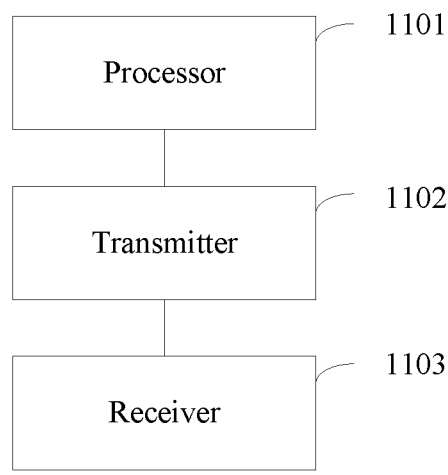
FIG. 11 is a second schematic structural diagram of a device according to an embodiment of the present disclosure.

Referring to FIG. 11, an embodiment of the present disclosure provides a device, where the device is a second device and is configured to establish a wireless connection to a first device, and the second device includes a processor 1101, a transmitter 1102, and a receiver 1103, where the processor 1101 is configured to obtain connection information provided by the first device near the second device, where the connection information is generated by the first device according to an operation instruction of a first user after the first device receives the operation instruction, and the first user is a user corresponding to the first device, and generate a first identifier through calculation according to a first information portion of the connection information, where the first information portion is a portion or all of the connection information;

the transmitter 1102 is configured to send a first message to the first device, where the first message carries the first identifier generated by the processor, so that the first device determines whether the first identifier matches a second identifier, where the second identifier is equal to or corresponds to a result that is generated through calculation according to the first information portion;

the receiver 1103 is configured to receive a second message sent by the first device when the first identifier matches the second identifier, where the second message is a response message for the first message; and the processor 1101 is further configured to establish a wireless connection to the first device.

Preferably, the operation of generating a first identifier by the processor 1101 through calculation according to a first information portion of the connection information includes:

performing a hash operation on the first information portion of the connection information to obtain a first hash result, and generating the first identifier according to the first hash result; or adding first preset information to the first information portion of the connection information to obtain first construction information, and generating the first identifier according to the first construction information.

Preferably, the operation of establishing a wireless connection by the processor 1101 to the first device includes:

performing verification with the first device, so that the first device determines whether first authentication information of the second device matches second authentication information of the first device, where the first authentication information is generated through calculation according to a second information portion of the connection information, and the second authentication information is equal to or corresponds to a result generated through calculation according to the second information portion of the connection information;

receiving confirmation information sent by the first device when the first device verifies that the first authentication information matches the second authentication information; and establishing the wireless connection to the first device according to the confirmation information.

Preferably, the operation of performing verification by the processor 1101 with the first device includes:

determining that the first authentication information is a PMK of a 4-way handshake authentication mode, and performing verification with the first device according to the PMK by using the 4-way handshake authentication mode; or determining that the first authentication information is a PIN of a Wireless Fidelity protected setup WPS authentication mode, and performing verification with the first device according to the PIN by using the WPS authentication mode.

Further, the processor 1101 is further configured to generate the first authentication information through calculation according to the second information portion of the connection information.

Preferably, the operation of generating the first authentication information by the processor 1101 through calculation according to the second information portion of the connection information includes:

performing a hash operation on the second information portion of the connection information to obtain a second hash result, and generating the first authentication information according to the second hash result; or adding second preset information to the second information portion of the connection information to obtain second construction information, and generating the first authentication information according to the second construction information.

Preferably, the operation of obtaining, by the processor 1101, connection information provided by the first device, includes:

receiving the connection information of the first device that is input by a user; or scanning a graphic code displayed by the first device, and obtaining the connection information of the first device that is included in the graphic code; or establishing a short-range communications connection to the first device, and receiving, by using the short-range communications connection, the connection information sent by the first device.

The first message is a probe request Probe request message, and a service set identifier SSID field in the Probe request message carries the first identifier, or a reserved field in the Probe request message carries the first identifier; or the first message is a test request Test request message, and an action frame Action Frame in the Test request message carries the first identifier.

Preferably, the operation of establishing a wireless connection by the processor 1101 to the first device includes:

performing open authentication with the first device, and establishing the wireless connection to the first device after the authentication is successful.

The wireless connection is a Wireless Fidelity Wi-Fi connection or a Bluetooth connection.

In the embodiment of the present disclosure, a second device obtains connection information provided by a first device, generates a first identifier according to the connection information, and sends a first message carrying the first identifier to the first device, so that the first device determines whether the first identifier matches a second identifier of the first device; and if the first identifier matches the second identifier, the second device establishes a wireless connection to the first device. In this way, a user does not need to select a device from a large quantity of search results, efficiency of establishing a wireless connection is improved, and efficiency of data transmission is improved.

Embodiment 12

Figure 13:
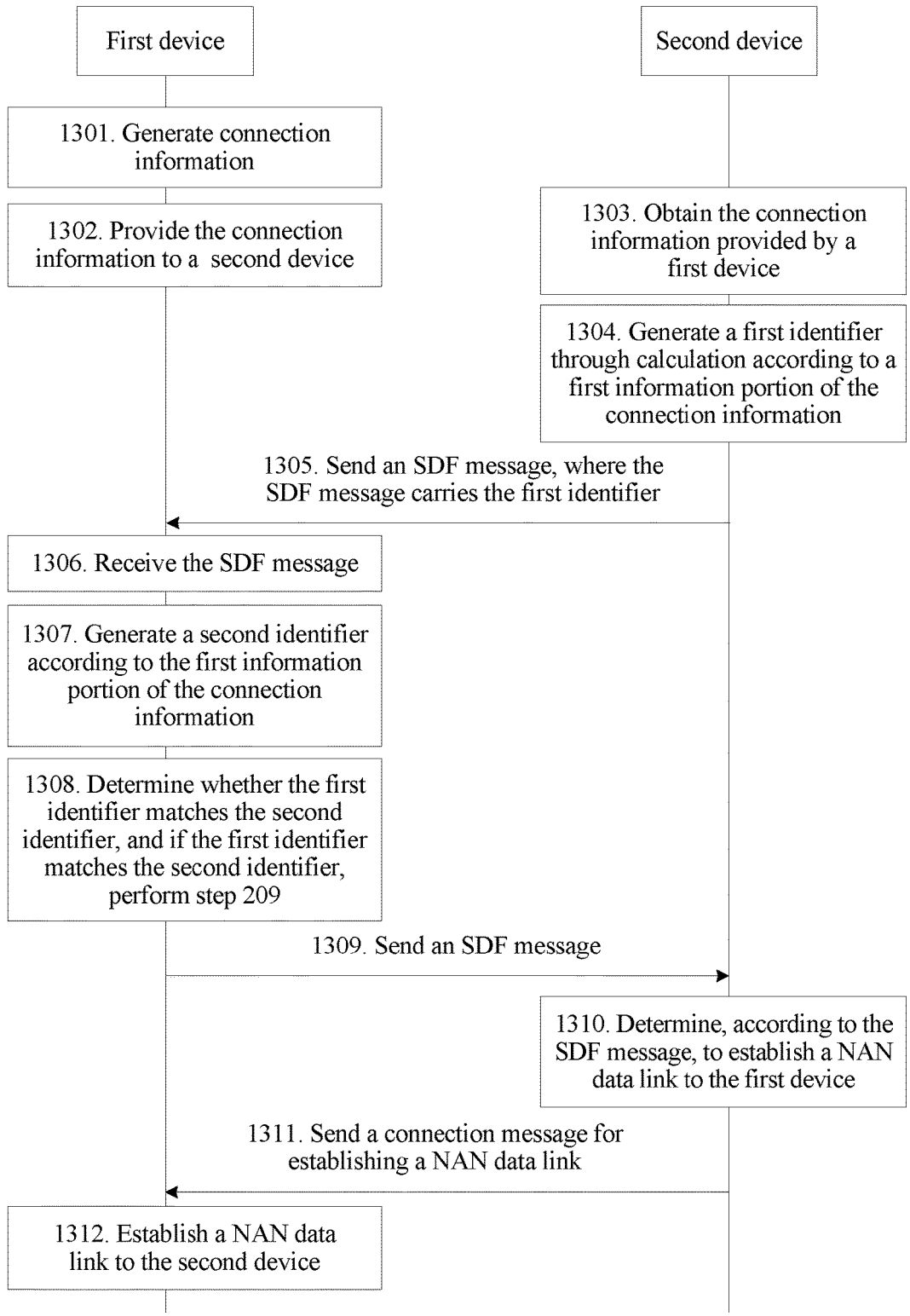
FIG. 13 is a flowchart of another method for establishing a wireless connection according to an embodiment of the present disclosure.

As shown in FIG. 13, an embodiment of the present disclosure provides a method for establishing a wireless connection. In the embodiment of the present disclosure, a first device and a second device are NAN devices. After generating connection information, the first device provides the connection information to the second device. The second device sends an SDF message carrying a first identifier that is obtained based on a first information portion of the connection information. After receiving the SDF message, the first device determines whether the first identifier in the SDF message matches a second identifier obtained by the first device. The first device may further determine whether a service requirement of the second device matches a service of the first device. If the service requirement of the second device matches the service of the first device, the first device responds to the second device with an SDF message. Afterward, the first device performs a process of establishing a NAN data link to the second device. Referring to FIG. 13, the method includes the following steps.

Step 1301: The first device generates connection information.

The connection information may be a character string. Content of the connection information may be numerals, letters, or other characters, or may be any combination of multiple characters of numerals, letters, and other characters. The first device may generate a character string randomly, and use the generated character string as the connection information.

Supplement: The connection information may be generated by a software module of an upper layer application, or after a user inputs a character string to the device by using an interface, the device generates the connection information according to the character string.

In the embodiment of the present disclosure, the first device may generate connection information when triggered by a first user corresponding to the first device. Trigger manners thereof are similar to various manners described in Embodiment 2, and are not further described in this embodiment.

Step 1302: The first device provides the connection information to the second device.

Step 1303: The second device obtains the connection information provided by the first device.

Step 1304: The second device generates a first identifier through calculation according to a first information portion included in the connection information, where the first information portion is a portion or all of the connection information.

Processes of step 1302 to step 1305 are similar to processes described in Embodiment 2, and are not further described in this embodiment.

Step 1305: The second device sends an SDF message, where the SDF message carries the first identifier.

The SDF message may be an SDF subscription message, or may be an SDF publish message. A person skilled in the art may understand that, when the second device intends to use a certain service, the SDF message needs to be an SDF subscription message; when the second device intends to provide a certain service, the SDF message is an SDF publish message. Correspondingly, the first device may respond with an SDF publish message or an SDF follow-up message. For ease of description, in this embodiment, assuming that the second device needs to use a certain service, the second device sends an SDF subscription message carrying the first identifier. More specifically, the second device may add, to the SDF subscription message, information of a service that the second device needs to subscribe to, for example, the second device may add an SDA (service descriptor attribute) to the SDF subscription information, and add, to the SDA, a service identifier of the service to be used and information indicating that the service supports establishment of a NAN data link. The SDF subscription message is generally sent in a DW (discovery window), or may be sent in another time period in which both the first device and the second device work simultaneously.

Step 1306: The first device receives the SDF subscription message.

Specifically, after receiving the SDF subscription message, the first device determines, according to the service identifier in the SDF subscription message, whether the service identifier matches a service identifier of a service provided by the first device, and if the service identifier matches the service identifier of the service provided by the first device, determines that the service that the second device subscribes to can be provided. According to the indication information in the SDF subscription message, it is determined that the first device may attempt to establish a connection to the second device.

Step 1307: The first device generates a second identifier according to the first information portion of the connection information, where the first device uses the second identifier as its own identifier.

Step 1308: The first device determines whether the first identifier matches the second identifier, and if the first identifier matches the second identifier, performs step 1309.

Implementation processes of step 1307 to step 1308 are similar to steps described in Embodiment 2, and are not further described in this embodiment.

Step 1309: The first device sends an SDF publish message to the second device, where the SDF publish message is used by the second device to determine to establish a NAN data link to the first device.

When the first device determines that the first identifier matches the second identifier, the first device preliminarily determines that the second device has successfully obtained the connection information of the first device, and therefore sends an SDF publish message as a response to the second device, to notify the second device that the first device agrees to establish a NAN data link to the second device. In the SDF publish message, the first device may add the service identifier of the service provided by the first device and information indicating that the first device determines to support establishment of a NAN data link. Further, the first device may add the second identifier to the SDF publish message.

Step 1310: The second device receives the SDF publish message, determines, according to the SDF publish message, to establish a NAN data link to the first device, and performs step 1311.

Specifically, the second device determines, according to the service identifier in the SDF publish message, that the first device can provide the service that the second device needs to use, and determines, according to the indication information in the SDF publish message, that the second device can establish a NAN data link to the first device. Further, the second device may determine, by determining the first identifier, to establish a NAN data link to the first device.

Step 1311: The second device sends, to the first device, a connection message for establishing a NAN data link, so as to initiate a process of establishing a data link to the first device.

Specifically, the second device may send a Data Request message to the first device, for exchanging critical parameters for establishing a NAN data link with the first device.

Further, the second device may request to establish a NAN data link requiring link layer security protection to the first device, or request to establish a NAN data link not requiring link layer security protection to the first device.

The second device may further send, to the first device, a message for negotiating time-frequency resources for establishing a data link, so as to trigger the first device to perform negotiation about time-frequency resources with the second device, and therefore determine information of a time period for establishing a data link and channel information.

Step 1312: The first device establishes a NAN data link to the second device.

Specifically, after receiving the connection message sent by the second device, the first device performs a subsequent process of establishing a NAN data link to the second device. For example, when the first device receives the Data Request message sent by the second device, the second device responds with a Data Response message, and indicates, in the Data Response message, that a status of data link establishment is a success state. Subsequently, the first device and the second device may begin to perform data communication. When the first device receives the message, sent by the second device, for negotiating time-frequency resources for establishing a data link, the first device responds according to its own time-frequency resources, so as to determine final time-frequency resources. Afterward, the second device and the first device exchange Data Request and Data Response messages to establish the data link.

Further, when the first device and the second device establish a NAN data link requiring link layer security protection, the second device and the first device may further generate first authentication information and second authentication information respectively according to a second information portion of the connection information, and use the first authentication information and the second authentication information as initial key materials shared between the second device and the first device. A shared key may be generated by using the initial key materials in combination with other information. The shared key may be an encryption key for encrypting data transmitted between the second device and the first device, or may be input information for generating the encryption key. For example, both the second device and the first device use the shared key to generate PMKs, further use the PMKs to generate PTKs, and use the PTKs to encrypt data transmitted between the second device and the first device. Alternatively, based on the shared key, data encryption key information exchanged between the second device and the first device is encrypted. For example, the shared key is used to encrypt a PMK generated by one party, or is directly used as an encryption Key for data encryption. Alternatively, an asymmetric key exchanged between the second device and the first device is encrypted by using the shared key. For example, when the second device and the first device establish security authentication and key establishment by using DPP, at least one piece of ECDH public key information exchanged between the second device and the first device is encrypted by using the shared key. Alternatively, the shared key may be further used for authentication based on the shared key between the second device and the first device, so that the two devices determine that they have a same key, and therefore a trust relationship between the second device and the first device is established. For one of the authentication modes, reference may be made to step 211 to step 213 in Embodiment 2, and details are not further described in this embodiment. After establishment of a data transmission key is complete, the first device and the second device begin to transmit data encrypted based on the data transmission key.

A sequence of each step in the present disclosure may be not limited to the sequence described in each embodiment, so long as a final effect of the present disclosure can be achieved logically.

Calculation involved in the present disclosure and performed according to a certain element indicates that an input of the operation includes at least the element but is not limited to only the element. In a practical application, another element may also be added for calculation together. An operation process involved in the present disclosure may be a process implemented by one step, or may be a process implemented by multiple steps of operations, which is not limited in the present disclosure.

It should be noted that, mutual reference may be made between the embodiments of the present disclosure. In an apparatus embodiment, an apparatus is used to implement a method embodiment. Therefore, the apparatus embodiment may be understood by referring to a corresponding method embodiment. Likewise, in an apparatus claim, an apparatus is used to implement a solution provided by a method claim. Therefore, the apparatus claim may also be understood by referring to a corresponding method claim.

In the embodiments of the present disclosure, the disclosed first device and second device are both electronic devices. The electronic device may be used as a separate device, or integrated in various display apparatuses, for example, a set-top box, a mobile phone, a tablet computer, a laptop computer, a multimedia player, a digital camera, a personal digital assistant (PDA), a navigation apparatus, a mobile Internet device (MID), or a wearable device. Structures of the first device and the second device are not limited to structures shown in the drawings in the embodiments of the present disclosure.

Figure 12:
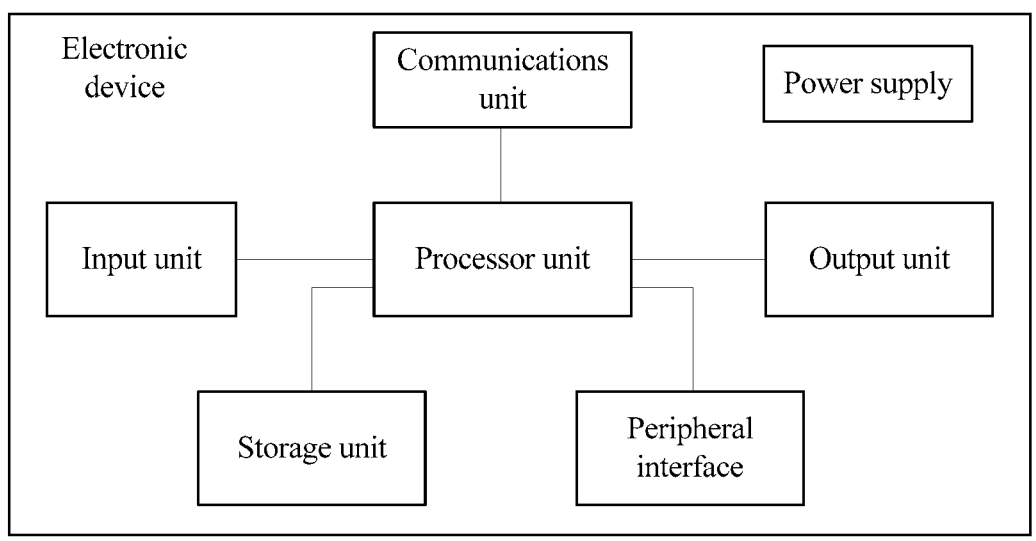
FIG. 12 is a schematic structural diagram of an electronic device according to an embodiment of the present disclosure.

For apparatus diagrams of the first device and the second device, reference may be made to FIG. 12. FIG. 12 shows an electronic device according to a specific implementation manner of the present disclosure. The electronic device includes components such as an input unit, a processor unit, an output unit, a communications unit, a storage unit, and a peripheral unit. The components perform communication by using one or more buses. A person skilled in the art may understand that, the structure of the electronic device in the figure does not constitute a limitation on the present disclosure. The structure may be a bus structure, or may be a star structure, or may further include parts more than or less than those shown in the figure, or a combination of some parts, or different arrangements of parts. In the implementation manner of the present disclosure, the electronic device may be any mobile or portable electronic device, including but not limited to a mobile phone, a mobile computer, a tablet computer, a personal digital assistant (PDA), a media player, a smart television, or a combination of two or more thereof.

The input unit is configured to exchange information between a user and the electronic device and/or input information to the electronic device. For example, the input unit may receive numeral or character information input by the user, to generate a signal input related to a user setting or function control. In a specific implementation manner of the present disclosure, the input unit may be a touch panel, or may be another human-machine interaction interface, for example, a physical input key or a microphone, or may be other external information acquisition apparatuses such as a camera. The touch panel, also referred to as a touchscreen, may collect operation actions of the user touching or approaching the touch panel. For example, the user performs an operation action on the touch panel or a position near the touch panel by using any proper object or accessory such as a finger or a stylus, and drives a corresponding connection apparatus according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts it into touch point coordinates, and sends the touch point coordinates to the processing unit. The touch controller may further receive and execute a command sent by the processing unit. In addition, the touch panel may be implemented by using multiple types such as resistive, capacitive, infrared, and surface acoustic wave. In other implementation manners of the present disclosure, the physical input key used by the input unit may include but is not limited to one or more of a physical keyboard, a function key (such as a volume control button and a power on/off button), a trackball, a mouse, a joystick, or the like. The input unit in a microphone form may capture a speech input by the user or an environment, and convert the speech into a command in an electrical signal form and executable by the processing unit.

In other implementation manners of the present disclosure, the input unit may also be various sensors, for example, a Hall component configured to sense a physical quantity of the electronic device, for example, force, torque, pressure, stress, position, displacement, speed, acceleration, angle, angular velocity, revolutions, rotational speed, and time at which a working status changes, and convert the physical quantity into electric energy for performing detection and control. Other sensors may further include a gravity sensor, a tri-axis accelerometer, a gyroscope, and the like.

The processor unit is a control center of the electronic device. The processor unit uses various interfaces and lines to connect each part of the whole electronic device, and by running or executing a software program and/or a module stored in the storage unit, and invoking data stored in the storage unit, executes various functions of the electronic device and/or data processing. The processor unit may include an integrated circuit (IC), for example, may include a single packaged IC, or may include multiple interconnected packaged ICs that have same functions or different functions. For example, the processor unit may include only a central processing unit (CPU), or may be a combination of a GPU (graphics processing unit), a digital signal processor (DSP), and a control chip (for example, a baseband chip) in the communications unit. In an implementation manner of the present disclosure, the CPU may be a single operation core, or may include multiple operation cores.

The communications unit is configured to establish a communications channel, so that the first device connects to the second device by using the communications channel. The communications unit may include a communications module such as a wireless local area network (wireless LAN or WLAN) module, a Bluetooth module, or a baseband module, and a radio frequency (RF) circuit corresponding to the communications module, and is configured to perform wireless local area network communication, Bluetooth communication, infrared communication, and/or communication of a cellular communications system, for example, Wideband Code Division Multiple Access (W-CDMA), and/or High Speed Downlink Packet Access (HSDPA). The communications module is configured to control communication of each component in the electronic device, and may support direct memory access.

In different implementation manners of the present disclosure, each communications module in the communications unit generally exists in a form of an integrated circuit chip, and a combination of the communications modules may be selected, without necessarily including all communications modules and corresponding antenna groups. For example, the communications unit may include only a baseband chip, a radio frequency chip, and a corresponding antenna to provide a communications function in a cellular communications system. For a wireless communications connection established by using the communications unit, for example, wireless local area network access or WCDMA access, the electronic device may connect to a cellular network or the Internet. In some optional implementation manners of the present disclosure, the communications module in the communications unit, for example, the baseband module, may be integrated in the processor unit, typically, for example, an APQ+MDM series platform provided by Qualcomm Incorporated.

The radio frequency circuit is configured receive or transmit information or receive or transmit a signal in a call process. For example, the radio frequency circuit transmits a transport stream of screen data processed by the first device to the second device, and receives a touch event returned by the second device. Generally, the radio frequency circuit includes well-known circuits for executing these functions, including but not limited to an antenna system, a radio frequency transceiver, one or more amplifiers, a tuner, one or more oscillators, a digital signal processor, a codec chip set, a subscriber identity module (SIM), a memory, and the like. In addition, the radio frequency circuit may further communicate with a network and other devices through wireless communication. The wireless communication may use any communications standard or protocol, including but not limited to GSM (Global System for Mobile communication), GPRS (General Packet Radio Service), CDMA (Code Division Multiple Access), WCDMA (Wideband Code Division Multiple Access), High Speed Uplink Packet Access technology (HSUPA), LTE (Long Term Evolution), email, SMS (short message service), and the like.

The output unit includes but is not limited to an image output unit and an audio output unit. The image output unit is configured to output a text, an image, and/or a video. The image output unit may include a display panel, for example, a display panel configured in a form of an LCD (liquid crystal display), an OLED (organic light-emitting diode), or a field emission display (FED). Alternatively, the image output unit may include a reflective display, for example, an electrophoretic display, or a display using an interferometric modulation of light technology. The image output unit may include a single display or multiple displays of different sizes. In a specific implementation manner of the present disclosure, the touch panel used by the foregoing input unit may also be used as a display panel of the output unit. For example, the touch panel displays a current display picture, and may simultaneously receive an instruction in a user-defined secret area. Although the input unit and the output unit are used as two independent parts for implementing input and output functions of the electronic device in the structural diagram, in some embodiments, the touch panel and the display panel may be integrated for implementing the input and output functions of the electronic device. For example, the image output unit may display various graphical user interfaces (GUIs) as virtual control components, including but not limited to a window, a scroll bar, an icon, and a clipbook for the user to perform an operation in a touch manner.

In a specific implementation manner of the present disclosure, the image output unit includes a filter and an amplifier, which are configured to filter and amplify a video output by the processing unit. The audio output unit includes a digital-to-analog converter, configured to convert an audio signal output by the processing unit from a digital format to an analog format.

The storage unit may be configured to store a software program and a module. By running the software program and module stored in the storage unit, the processing unit executes various function applications of the electronic device and implements data processing. The storage unit mainly includes a program storage area and a data storage area. The program storage area may store an operating system, an application program required by at least one function, such as an audio playing program and an image playing program. The data storage area may store data (such as audio data and a phone book) that is created according to use of the electronic device, and the like. In a specific implementation manner of the present disclosure, the storage unit may include a volatile memory, for example, a nonvolatile dynamic random access memory (NVRAM), a phase change random access memory (PRAM), or a magnetoresistive random access memory (MRAM), and may further include a nonvolatile memory, for example, at least one disk storage device, an electrically erasable programmable read-only memory (EEPROM), or a flash device such as a NOR flash memory or a NAND flash memory. The nonvolatile memory stores the operating system and an application program executed by the processing unit. The processing unit loads a running program and data from the nonvolatile memory to memory and stores digital content in a mass storage apparatus. The operating system includes various components and/or drivers that are configured to control and manage routine system tasks, for example, memory management, storage device control, power management, and the like, and are helpful for communication between software and hardware. In the implementation manner of the present disclosure, the operating system may be an Android system of Google Inc., an iOS system developed by Apple Inc., a Windows operating system developed by Microsoft Corporation, or the like, or is an embedded operating system like Vxworks.

The application program includes any application installed on the electronic device, including but not limited to a browser, email, instant messaging service, text processing, keyboard virtualization, widget, encryption, digital rights management, speech recognition, speech replication, positioning (for example, a function provided by a global positioning system), music playing, and the like.

A power source is configured to supply power to different components of the electronic device to keep the components running. A general understanding is that the power source may be a built-in battery, for example, a common lithium-ion battery or a common NiMH battery, and also includes an external power source directly supplying power to the electronic device, for example, an AC adapter. In some embodiments of the present disclosure, the power source may be defined more extensively, for example, may further include a power management system, a recharge system, a power failure detection circuit, a power converter or inverter, and a power status indicator (such as a light emitting diode), and any other component associated with electric energy generation, management, and distribution.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disc, or an optical disc.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for establishing a wireless connection between a first device and a second device, comprising:
   receiving, by the first device, an operation instruction of a first user;
   generating, by the first device, connection information according to the operation instruction, wherein the first user is a user corresponding to the first device, wherein the operation instruction of the first user is an instruction of the first user for triggering the first device to: perform media sharing with another device, or perform network sharing with another device, or perform multi-screen interaction with another device, or perform a multi-player game with another device, or establish a service connection to another device; and
   wherein the another device is one or more devices that can meet a service requirement of the first device; and
   providing the connection information to the second device near the first device, so that the second device obtains a first identifier through calculation according to at least a first information portion of the connection information by using a preset algorithm, wherein the first information portion is a portion or all of the connection information, wherein the providing, by the first device, the connection information to the second device, comprises:
      displaying or playing, by the first device, the connection information, so that the second device receives the connection information input by a user to the second device; or generating, by the first device according to the connection information, a graphic code comprising the connection information, and displaying the graphic code, so that the second device scans the graphic code and obtains the connection information; or establishing, by the first device, a short-range communications connection to the second device, and sending the connection information to the second device by using the short-range communications connection;
      receiving, by the first device, a first message that is sent by the second device according to the connection information, wherein the first message carries the first identifier;
      obtaining, by the first device, a second identifier through calculation according to at least the first information portion of the connection information by using the preset algorithm;
      determining, by the first device, whether the first identifier matches the second identifier; and
      in response to determining that the first identifier matches the second identifier, sending, by the first device, a second message to the second device, and establishing a wireless connection to the second device, wherein the second message is a response message for the first message, wherein the establishing the wireless connection to the second device comprises:

verifying whether first authentication information of the second device matches second authentication information of the first device, wherein the first authentication information is generated by the second device through calculation according to at least a second information portion of the connection information, the second information portion is a portion or all of the connection information, and the second authentication information is generated by the first device through calculation according to at least the second information portion of the connection information; and in response to determining that the first authentication information matches the second authentication information, sending confirmation information to the second device, and establishing the wireless connection to the second device, wherein the confirmation information is used by the second device to determine to establish the wireless connection to the first device;

wherein the verifying whether first authentication information of the second device matches the second authentication information of the first device comprises:

determining that the second authentication information of the first device is a pairwise master key (PMK) of a 4-way handshake authentication mode, and verifying, according to the PMK by using the 4-way handshake authentication mode, whether the first authentication information of the second device matches the second authentication information of the first device; or determining that the second authentication information of the first device is a personal identification number (PIN) of a Wireless Fidelity protected setup (WPS) authentication mode, and verifying, according to the PIN by using the WPS authentication mode, whether the first authentication information of the second device matches the second authentication information of the first device.

2. The method according to claim 1, wherein the obtaining the second identifier through calculation according to at least the first information portion of the connection information by using the preset algorithm comprises:

performing a conversion operation on the first information portion of the connection information by using the preset algorithm, to obtain a first conversion result, and obtaining the second identifier according to the first conversion result; or adding first preset information to the first information portion of the connection information to obtain first construction information, and obtaining the second identifier according to the first construction information.

3. The method according to claim 1, wherein
the first device is a wireless access device, the second device is a wireless terminal, the first message is a Probe Request message, and a service set identifier (SSID) field in the Probe Request message carries the first identifier, or a reserved field in the Probe Request message carries the first identifier.

4. The method according to claim 1, wherein
the first device is a wireless terminal, the second device is a wireless access device, the first message is a Beacon message or a Probe Response message, and a service set identifier (SSID) field in the Beacon message or the Probe Response message carries the first identifier, or a reserved field in the Beacon message carries the first identifier.

5. The method according to claim 1, wherein
the first device and the second device are peer-to-peer (P2P) devices, the first message is a Probe Request message, and a P2P IE field in the Probe Request message carries the first identifier, or a service set identifier (SSID) field in the Probe Request message carries the first identifier, or a reserved field in the Probe Request message carries the first identifier.

6. The method according to claim 1, wherein
the first device and the second device are NAN, neighbor awareness network, devices, and the first message is a service discovery function (SDF) message.

7. A method for establishing a wireless connection between a first device and a second device, comprising:

obtaining, by the second device, connection information provided by the first device near the second device, wherein the connection information is generated by the first device according to an operation instruction of a first user after the first device receives the operation instruction, and the first user is a user corresponding to the first device;

wherein the operation instruction of the first user is an instruction of the first user for triggering the first device to: perform media sharing with another device, or perform network sharing with another device, or perform multi-screen interaction with another device, or perform a multi-player game with another device, or establish a service connection to another device; and wherein the another device is a device that can meet a service requirement of the first device, wherein the another device is one or more devices;

wherein the obtaining connection information provided by the first device near the second device comprises:

receiving the connection information of the first device that is input by a user; or scanning a graphic code displayed by the first device, and obtaining the connection information of the first device that is comprised in the graphic code; or establishing a short-range communications connection to the first device, and receiving, by using the short-range communications connection, the connection information sent by the first device;

obtaining, by the second device, a first identifier through calculation according to at least a first information portion of the connection information by using a preset algorithm, wherein the first information portion is a portion or all of the connection information;

sending, by the second device, a first message to the first device, wherein the first message carries the first identifier, so that the first device determines whether the first identifier matches a second identifier, wherein the second identifier is obtained by the first device through calculation according to at least the first information portion of the connection information by using the preset algorithm; and receiving, by the second device, a second message sent by the first device when the first device determines that the first identifier matches the second identifier, and establishing a wireless connection to the first device, wherein the second message is a response message for the first message, wherein the establishing the wireless connection to the first device comprises:
performing verification with the first device, so that the first device determines whether first authentication information of the second device matches second authentication information of the first device, wherein the first authentication information is generated through calculation according to at least a second information portion of the connection information, and the second authentication information is generated by the first device through calculation according to at least the second information portion of the connection information;
receiving confirmation information sent by the first device when the first device verifies that the first authentication information matches the second authentication information; and
establishing the wireless connection to the first device according to the confirmation information;
wherein the performing verification with the first device comprises:
determining that the first authentication information is a pairwise master key (PMK) of a 4-way handshake authentication mode, and performing verification with the first device according to the PMK by using the 4-way handshake authentication mode; or
determining that the first authentication information is a personal identification number (PIN) of a Wireless Fidelity protected setup (WPS) authentication mode, and performing verification with the first device according to the PIN by using the WPS authentication mode.

8. The method according to claim 7, wherein the obtaining the first identifier through calculation according to at least the first information portion of the connection information by using the preset algorithm comprises:
performing a conversion operation on the first information portion of the connection information by using the preset algorithm, to obtain a first conversion result, and obtaining the first identifier according to the first conversion result; or
adding first preset information to the first information portion of the connection information to obtain first construction information, and obtaining the first identifier according to the first construction information.

9. The method according to claim 7, wherein before the performing verification with the first device, the method further comprises:
generating the first authentication information through calculation according to the second information portion of the connection information.

10. The method according to claim 9, wherein the generating the first authentication information through calculation according to the second information portion of the connection information comprises:
performing a hash operation on the second information portion of the connection information to obtain a second hash result, and obtaining the first authentication information according to the second hash result; or
adding second preset information to the second information portion of the connection information to obtain second construction information, and obtaining the first authentication information according to the second construction information.

11. The method according to claim 7, wherein
the first device is a wireless access device, the second device is a wireless terminal, the first message is a Probe Request message, and a service set identifier (SSID) field in the Probe Request message carries the first identifier, or a reserved field in the Probe Request message carries the first identifier; or
the first device is a wireless terminal, the second device is a wireless access device, the first message is a beacon frame message or a Probe Response message, and a service set identifier (SSID) field in the beacon frame message or the Probe Response message carries the first identifier, or a reserved field in the beacon frame message carries the first identifier; or
the first device and the second device are peer-to-peer (P2P) devices, the first message is a Probe Request message, and a P2P IE field in the Probe Request message carries the first identifier, or a service set identifier (SSID) field in the Probe Request message carries the first identifier, or a reserved field in the Probe Request message carries the first identifier; or
the first device and the second device are NAN devices, and the first message is a service discovery function (SDF) message.

12. A device for establishing a wireless connection, wherein the device is a first device and is configured to establish a wireless connection to a second device, and the first device comprises a receiver, a processor, and a transmitter, wherein:
the processor is configured to: after an operation instruction of a first user is received, generate connection information according to the operation instruction, and provide the connection information to the second device near the first device, so that the second device obtains a first identifier through calculation according to a first information portion of the connection information by using a preset algorithm, wherein the first information portion is a portion or all of the connection information;
the receiver is configured to receive a first message that is sent by the second device according to the connection information, wherein the first message carries the first identifier;
the processor is further configured to determine whether the first identifier received by the receiver matches a second identifier of the first device, wherein the second identifier is equal to or corresponds to a result that is generated through calculation according to the first information portion;
the transmitter is configured to send a second message to the second device if a result determined by the processor is a match, wherein the second message is a response message for the first message; and
the processor is further configured to establish a wireless connection to the second device;
wherein the operation instruction of the first user is an instruction of the first user for triggering the first device to: perform media sharing with another device, or perform network sharing with another device, or perform multi-screen interaction with another device, or a multi-player game with another device, or establish a service connection to another device, and the another device is a device that can meet a service requirement of the first device;
wherein the another device is one or more devices;
wherein the processor providing the connection information to the second device comprises:

controlling a display or a speaker to display or play the connection information, so that the second device receives the connection information input by a user to the second device; or generating, according to the connection information, a graphic code comprising the connection information, and controlling a display to display the graphic code, so that the second device scans the graphic code and obtains the connection information; or controlling the first device to establish a short-range communications connection to the second device, and sending the connection information to the second device by using the transmitter and the short-range communications connection wherein the establishing the wireless connection to the second device comprises:

verifying whether first authentication information of the second device matches second authentication information of the first device, wherein the first authentication information is generated by the second device through calculation according to at least a second information portion of the connection information, the second information portion is a portion or all of the connection information, and the second authentication information is generated by the first device through calculation according to at least the second information portion of the connection information; and in response to determining that the first authentication information matches the second authentication information, sending confirmation information to the second device, and establishing the wireless connection to the second device, wherein the confirmation information is used by the second device to determine to establish the wireless connection to the first device; and wherein the verifying whether first authentication information of the second device matches the second authentication information of the first device comprises:

determining that the second authentication information of the first device is a pairwise master key (PMK) of a 4-way handshake authentication mode, and verifying, according to the PMK by using the 4-way handshake authentication mode, whether the first authentication information of the second device matches the second authentication information of the first device; or determining that the second authentication information of the first device is a personal identification number (PIN) of a Wireless Fidelity protected setup (WPS) authentication mode, and verifying, according to the PIN by using the WPS authentication mode, whether the first authentication information of the second device matches the second authentication information of the first device.

13. A device for establishing a wireless connection, wherein the device is a second device and is configured to establish a wireless connection to a first device, and the second device comprises a processor, a transmitter, and a receiver, wherein:

the processor is configured to obtain connection information provided by the first device near the second device, wherein the connection information is generated by the first device according to an operation instruction of a first user after the first device receives the operation instruction, and the first user is a user corresponding to the first device, and generate a first identifier through calculation according to a first information portion of the connection information, wherein the first information portion is a portion or all of the connection information;

the transmitter is configured to send a first message to the first device, wherein the first message carries the first identifier generated by the processor, so that the first device determines whether the first identifier matches a second identifier, wherein the second identifier is equal to or corresponds to a result that is generated through calculation according to the first information portion;

the receiver is configured to receive a second message sent by the first device when the first identifier matches the second identifier, wherein the second message is a response message for the first message; and the processor is further configured to establish a wireless connection to the first device;

wherein the operation instruction of the first user is an instruction of the first user for triggering the first device to: perform media sharing with another device, or perform network sharing with another device, or perform multi-screen interaction with another device, or perform a multi-player game with another device, or establish a service connection to another device;

wherein the another device is a device that can meet a service requirement of the first device, and the another device is one or more devices;

wherein the processor obtaining the connection information provided by the first device near the second device comprises:

receiving the connection information of the first device that is input by a user; or scanning, by using a camera, a graphic code displayed by the first device, and obtaining the connection information of the first device that is comprised in the graphic code; or establishing a short-range communications connection to the first device, and controlling the receiver to receive, by using the short-range communications connection, the connection information sent by the first device, wherein the establishing the wireless connection to the first device comprises:

performing verification with the first device, so that the first device determines whether first authentication information of the second device matches second authentication information of the first device, wherein the first authentication information is generated through calculation according to at least a second information portion of the connection information, and the second authentication information is generated by the first device through calculation according to at least the second information portion of the connection information;

receiving confirmation information sent by the first device when the first device verifies that the first authentication information matches the second authentication information; and establishing the wireless connection to the first device according to the confirmation information; and wherein the performing verification with the first device comprises:

determining that the first authentication information is a pairwise master key (PMK) of a 4-way handshake authentication mode, and performing verification with the first device according to the PMK by using the 4-way handshake authentication mode; or determining that the first authentication information is a personal identification number (PIN) of a Wireless Fidelity protected setup (WPS) authentication mode, and performing verification with the first device according to the PIN by using the WPS authentication mode.

\* \* \* \* \*